United States Patent
Witte et al.

(10) Patent No.: US 10,836,472 B2
(45) Date of Patent: *Nov. 17, 2020

(54) ONE-PIECE COMPOSITE BIFURCATED WINGLET

(71) Applicant: The Boeing Company, Chicago, IL (US)

(72) Inventors: Philipp Witte, Seattle, WA (US); Stanley Warren Stawski, Camano Island, WA (US); Fedor A. Kleshchev, Seattle, WA (US); Joshua William Zarfos, Renton, WA (US); Parth R. Naidu, Seattle, WA (US)

(73) Assignee: The Boeing Company, Chicago, IL (US)

( * ) Notice: Subject to any disclaimer, the term of this patent is extended or adjusted under 35 U.S.C. 154(b) by 783 days.

This patent is subject to a terminal disclaimer.

(21) Appl. No.: 15/344,581

(22) Filed: Nov. 6, 2016

(65) Prior Publication Data

US 2017/0050723 A1 Feb. 23, 2017

Related U.S. Application Data

(63) Continuation-in-part of application No. 14/097,413, filed on Dec. 5, 2013.

(51) Int. Cl.
*B64C 23/06* (2006.01)
*B29C 70/44* (2006.01)
(Continued)

(52) U.S. Cl.
CPC .......... *B64C 23/069* (2017.05); *B29C 70/345* (2013.01); *B29C 70/44* (2013.01);
(Continued)

(58) Field of Classification Search
CPC .......... B64C 23/065; B64C 5/06; B64C 5/08; B29C 70/44; B29C 70/345; B29C 70/24; B29C 70/22; B32B 5/02; B32B 27/08
See application file for complete search history.

(56) References Cited

U.S. PATENT DOCUMENTS 4,365,773 A * 12/1982 Wolkovitch .......... B64C 39/068
244/123.7
4,605,183 A * 8/1986 Gabriel ................ A63H 27/007
244/46

(Continued)

FOREIGN PATENT DOCUMENTS

| CN | 103359277 B | 10/2013 |
| RU | 2481242 C1 | 5/2013 |
| WO | WO2012171023 A1 | 12/2012 |

OTHER PUBLICATIONS

Owen Zupp, "TBT—Looking Back on the Development of the Boeing 737 Max", Australian Avaiation website, Nov. 1, 2018; accessible from https://australianaviation.com.au/2018/11/looking-back-on-the-development-of-the-boeing-737-max/; accessed Aug. 15, 2019 (Year: 2018).*

(Continued)

*Primary Examiner* — Philip J Bonzell
(74) *Attorney, Agent, or Firm* — Yee & Associates, P.C.

(57) ABSTRACT

A manufacture and process for a winglet formed as a unitary structure by laying up and co-curing three ply-sets in a bifurcated configuration, without metal and fasteners, comprising three continuous surfaces: a first ply-set comprising a first continuous surface forming: an outboard surface of an upper blade; an outboard portion of a root region; and an outboard surface of a lower blade; a second ply-set forming a second continuous surface forming an inboard surface of the upper blade and an upper skin of the root region; and a third ply-set forming a third continuous surface forming an (Continued)

inboard surface of the lower blade and a lower skin of the root region . . . continuous surface. The root region being integral in the bifurcated configuration, matching a shape of an airfoil of a tip of a wing, and comprising two supports that comprise an additional ply-set shaped to receive an attachment system.

20 Claims, 35 Drawing Sheets

(51) Int. Cl.
| | | |
|---|---|---|
| *B64F 5/10* | (2017.01) | |
| *B64C 5/08* | (2006.01) | |
| *B64D 45/02* | (2006.01) | |
| *B29C 70/34* | (2006.01) | |
| *B32B 5/02* | (2006.01) | |
| *B32B 27/08* | (2006.01) | |
| *B29K 105/08* | (2006.01) | |
| *B29K 307/04* | (2006.01) | |
| *B29L 31/30* | (2006.01) | |

(52) U.S. Cl.
CPC ............ *B32B 5/02* (2013.01); *B32B 27/08* (2013.01); *B64C 5/08* (2013.01); *B64D 45/02* (2013.01); *B64F 5/10* (2017.01); *B29K 2105/0872* (2013.01); *B29K 2307/04* (2013.01); *B29L 2031/3085* (2013.01); *B32B 2262/106* (2013.01); *B32B 2605/18* (2013.01); *Y02T 50/164* (2013.01); *Y02T 50/43* (2013.01)

(56) References Cited

U.S. PATENT DOCUMENTS

| | | | | |
|---|---|---|---|---|
| 5,348,253 | A | 9/1994 | Gratzer | |
| 5,407,153 | A | 4/1995 | Kirk et al. | |
| 6,234,423 | B1 * | 5/2001 | Hirahara | B64C 3/18 244/123.7 |
| 6,474,604 | B1 * | 11/2002 | Carlow | B64C 39/062 244/198 |
| 6,743,504 | B1 | 6/2004 | Allen et al. | |
| 7,625,618 | B1 * | 12/2009 | Allen | B29C 70/44 428/36.91 |
| 8,951,375 | B2 * | 2/2015 | Havens | B29C 33/00 156/165 |
| 9,738,375 | B2 * | 8/2017 | Witte | B29C 70/44 |
| 2002/0056788 | A1 * | 5/2002 | Anderson | B29C 33/505 244/119 |
| 2003/0106961 | A1 | 6/2003 | Wyrembek et al. | |
| 2009/0224107 | A1 * | 9/2009 | McLean | B64F 5/00 244/199.4 |
| 2009/0283639 | A1 | 11/2009 | Ackermann et al. | |
| 2009/0302167 | A1 * | 12/2009 | Desroche | B64C 3/58 244/199.4 |
| 2011/0168324 | A1 * | 7/2011 | Ender | B29C 33/301 156/243 |
| 2011/0174571 | A1 * | 7/2011 | Pacary | B32B 1/00 181/284 |
| 2012/0049010 | A1 | 3/2012 | Speer | |
| 2012/0112005 | A1 * | 5/2012 | Chaussee | B64C 23/072 244/123.1 |
| 2012/0312928 | A1 | 12/2012 | Gratzer | |
| 2013/0099062 | A1 * | 4/2013 | Seack | B23P 11/00 244/213 |
| 2013/0256460 | A1 * | 10/2013 | Roman | B64C 5/10 244/199.4 |
| 2016/0009379 | A1 | 1/2016 | Witte et al. | |

OTHER PUBLICATIONS

CompositesWorld, "Boeing's 737 Max to feature new winglet design," May 7, 2012; accessible from https://www.compositesworld.com/news/boeings-737-max-to-feature-new-winglet-design; accessed Aug. 15, 2019 (Year: 2012).*

State Intellectual Property Office of PRC Notification of First Office Action, dated Mar. 2, 2018, regarding Application No. 201410730016.8, 15 pages.

Final Office Action, dated Nov. 17, 2016 regarding U.S. Appl. No. 14/097,413, 25 pages.

"Configuration walk-round," 2013, The Boeing Company, 1 page.

* cited by examiner

ONE-PIECE COMPOSITE BIFURCATED WINGLET

CROSS REFERENCE TO PARENT APPLICATION

This application is a continuation-in-part of, and claims priority to, application Ser. No. 14/097,413 filed on Dec. 5, 2013 and issued as U.S. Pat. No. 9,738,375 on Aug. 22, 2017, the entire contents of which are incorporated herein by reference.

BACKGROUND INFORMATION

1. Field

The present disclosure relates generally to an aircraft, and in particular, to composite structures for the aircraft. Still more particularly, the present disclosure relates to a method and apparatus for a one-piece composite bifurcated winglet for the aircraft.

2. Background

Aircraft are being designed and manufactured with greater and greater percentages of composite materials. Composite materials are used in aircraft to decrease the weight of the aircraft. This decreased weight improves performance characteristics such as payload capacities and fuel efficiencies. Further, composite materials provide longer service life for various components in the aircraft.

Composite materials are tough, lightweight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

In manufacturing composite structures, layers of composite material are typically laid up on a tool. The layers may be comprised of fibers in sheets. These sheets may take the form of fabrics, tape, tows, or other suitable forms. In some cases, resin may be pre-impregnated into the sheets. These types of sheets are commonly referred to as prepreg.

The different layers of prepreg may be laid up in different orientations and different numbers of layers may be used depending on the thickness of the composite structure being manufactured. These layers may be laid up by hand or by using automated lamination equipment, such as a tape laminating machine or a fiber placement system.

After the different layers of composite material have been laid up on the tool, the layers of composite material may be consolidated and cured upon exposure to temperature and pressure, thus forming the final composite structure. Thereafter, the composite structure may be inspected to determine whether inconsistencies are present, and if no inconsistencies are identified, the composite structure may be put in service.

Composite materials are used for winglets on an aircraft. The use of composite materials in winglets may reduce the weight of the aircraft as compared to using metal materials for the winglets.

In this illustrative example, a "winglet" refers to an angled extension of a wingtip of the aircraft. The angle, shape, and size of a winglet are unique to the application of the aircraft. Some winglets may be bifurcated winglets. In this illustrative example, a "bifurcated winglet" is a winglet that has two blades arranged at an angle relative to one another.

In some cases, however, winglets may be more complicated and costly to manufacture than desired. Moreover, as the complexity of composite winglets increases, the assembly and maintenance time for an aircraft also increases. Therefore, it would be desirable to have a method and apparatus that take into account at least some of the issues discussed above, as well as other possible issues.

SUMMARY

In one illustrative embodiment, a composite winglet for an aircraft comprises a first blade, a second blade, and a root region. The first blade includes a first leading edge and a first trailing edge. The second blade includes a second leading edge and a second trailing edge. The second blade is positioned at an angle to the first blade. The root region is co-cured with the first blade and the second blade to form the composite winglet. The root region is configured to receive an attachment system for attaching the composite winglet to a wing of the aircraft.

In another illustrative embodiment, a tool for forming a composite winglet comprises a first part, a second part, and a third part. The first part includes an upper portion with a first cavity and a lower portion with a second cavity. The lower portion is arranged at an angle to the upper portion and connected to the upper portion at a transition region. The second part is configured to be placed over the first cavity of the upper portion. The third part is configured to be placed over the second cavity of the lower portion. The first part, the second part, and the third part are configured to receive a number of plies of composite material to form a composite winglet for an aircraft.

In yet another illustrative embodiment, a method for forming a composite winglet for an aircraft is provided. A number of plies of composite material are laid up on a tool. The tool comprises a first part, a second part, and a third part. The first part includes an upper portion with a first cavity and a lower portion with a second cavity. The lower portion is positioned at an angle to the upper portion and connected to the upper portion at a transition region. The second part is configured to be placed over the first cavity of the upper portion. The third part is configured to be placed over the second cavity of the lower portion. A group of spacers is positioned within the first cavity and the second cavity of the tool. The spacers are configured to form a number of chambers within the composite winglet. The second part is placed over the first cavity and the third part over the second cavity. The number of plies of composite material is cured to form the composite winglet for an aircraft as a single part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to provide a winglet for an aircraft that generates a desired level of fuel efficiency for the aircraft. The illustrative embodiments recognize and take into account that winglets may be beneficial for aircraft for a number of different reasons. For example, winglets may convert some of the energy wasted in the wingtip vortex into thrust, reduce drag and vortex interference with airflow near the wingtips, and increase the overall performance of the aircraft during flight.

The illustrative embodiments recognize and take into account, however, that some winglets for aircraft are manufactured in a number of parts including composite blades with metal fasteners, support ribs, and caps, among other components. These parts are then assembled to form a winglet for the aircraft. With this type of winglet, the cost to manufacture and assemble the parts may be more than desired.

The illustrative embodiments also recognize and take into account that with a winglet with a number of assembled parts, the performance of the winglet may be reduced at the interfaces between parts. For example, the structural integrity at the interface of a fastener and a composite blade may be less than desired. As a result, more layers of composite material may be needed to compensate for reduced strength.

Consequently, a desired level of aerodynamic performance, cost savings, or manufacturing efficiency may not be realized.

Thus, the illustrative embodiments provide a method, apparatus, and tool for forming a composite winglet for an aircraft. The composite winglet comprises a first blade, a second blade, and a root region. The first blade includes a first leading edge and a first trailing edge. The second blade includes a second leading edge and a second trailing edge. The second blade is positioned at an angle to the first blade. The root region is co-cured with the first blade and the second blade to form the composite winglet. The root region is configured to receive an attachment system for attaching the composite winglet to a wing of the aircraft.

Figure 1:
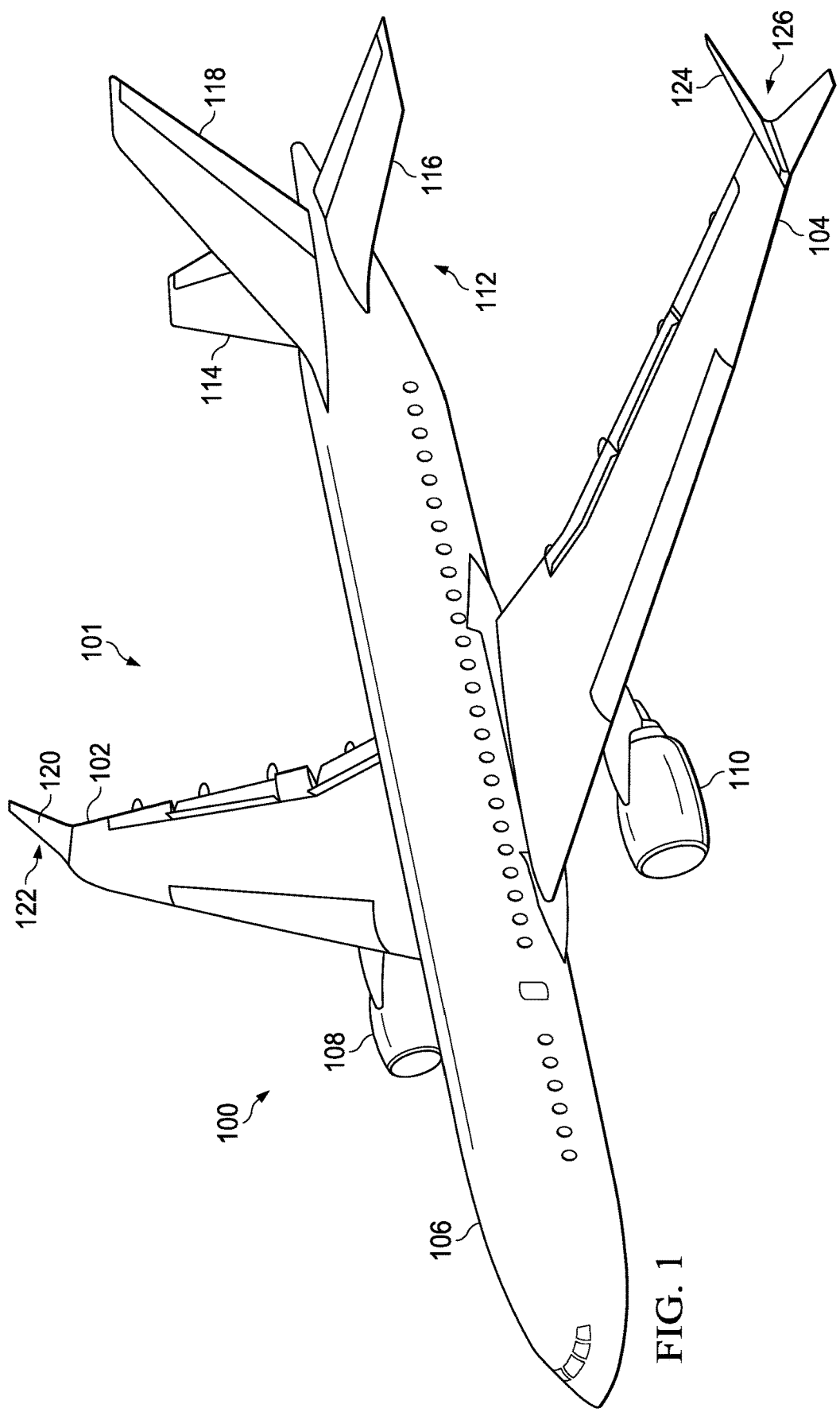
FIG. 1 is an illustration of an aircraft in accordance with an illustrative embodiment.

Referring now to the figures and, in particular, with reference to FIG. 1, an illustration of an aircraft is depicted in accordance with an illustrative embodiment. In this illustrative example, aircraft 100 has number of airfoil structures 101.

As used herein, "a number of" items may be one or more items. For example, "a number of airfoil structures" means one or more airfoil structures.

In this illustrative example, number of airfoil structures 101 may include various types of airfoil structures. For example, without limitation, airfoil structures in number of airfoil structures 101 may be selected from at least one of a wingtip, a winglet, a wing, a horizontal stabilizer, a vertical stabilizer, an airbrake, a control surface, a rudder, a flap, a spoiler, an aileron, or a slat.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As illustrated, number of airfoil structures 101 includes wing 102, wing 104, horizontal stabilizer 114, horizontal stabilizer 116, vertical stabilizer 118, and other suitable airfoil structures. In this illustrative example, wing 102 and wing 104 are attached to body 106. Engine 108 is attached to wing 102 and engine 110 is attached to wing 104. Body 106 has tail section 112. Horizontal stabilizer 114, horizontal stabilizer 116, and vertical stabilizer 118 are attached to body 106.

In the depicted example, wing 102 includes winglet 120. Winglet 120 may have number of blades 122. When winglet 120 has more than one blade, those blades may be arranged at an angle with respect to one another.

In this illustrative example, winglet 120 is a bifurcated winglet. As depicted, a bifurcated winglet has two blades arranged at an angle relative to each other. Winglet 120 is attached to the tip of wing 102 in these illustrative examples.

In a similar fashion, wing 104 includes winglet 124. Winglet 124 may include number of blades 126 arranged at an angle relative to one another. In this illustrative example, winglet 124 is also a bifurcated winglet. Winglet 124 is attached to the tip of wing 104 in these illustrative examples.

Aircraft 100 is an example of an aircraft in which a one-piece bifurcated composite winglet may be implemented in accordance with an illustrative embodiment. In this illustrative example, the one-piece bifurcated composite winglet may be attached to a wing of aircraft 100 during manufacturing of aircraft 100, retro-fitted for use on aircraft 100, or added to aircraft 100 during various stages of the service life of aircraft 100.

The illustration of aircraft 100 in FIG. 1 is not meant to imply physical or architectural limitations to the manner in which an illustrative embodiment may be implemented. For example, although aircraft 100 is shown as a commercial aircraft, aircraft 100 also may be a military aircraft, a rotorcraft, a helicopter, an unmanned aerial vehicle, or any other suitable aircraft that may employ winglets.

Figure 2:
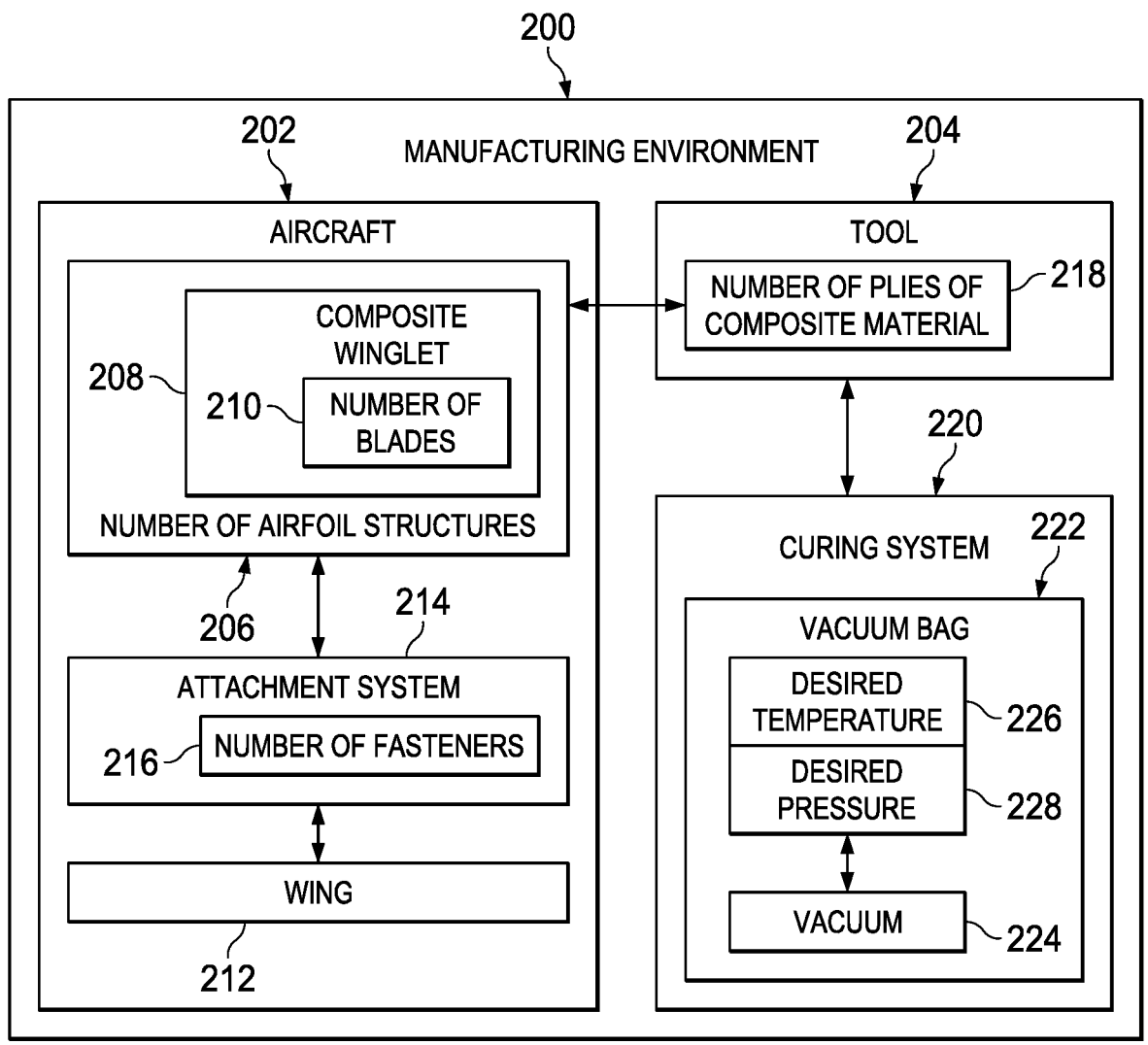
FIG. 2 is an illustration of a block diagram of an aircraft manufacturing environment in accordance with an illustrative embodiment.

With reference next to FIG. 2, an illustration of a block diagram of an aircraft manufacturing environment is depicted in accordance with an illustrative embodiment. In this depicted example, aircraft manufacturing environment 200 includes aircraft 202 and tool 204. Aircraft 100 in FIG. 1 is an example of one implementation for aircraft 202 shown in this figure.

As illustrated, aircraft 202 comprises number of airfoil structures 206. Number of airfoil structures 101 in FIG. 1 is an example of one implementation for number of airfoil structures 206 shown in this figure.

An airfoil structure in number of airfoil structures 206 may take various forms. For example, without limitation, one of number of airfoil structures 206 may be selected from at least one of a wingtip, a wing, a horizontal stabilizer, a vertical stabilizer, an airbrake, a control surface, a rudder, a flap, a spoiler, an aileron, a slat, or other suitable types of airfoil structures.

In this illustrative example, number of airfoil structures 206 includes composite winglet 208. Composite winglet 208 is an angled extension of a wingtip of aircraft 202. In the illustrative example, composite winglet 208 is a structure comprised of composite materials cured to form composite winglet 208. The angle, shape, and size of composite winglet 208 are unique to the application of aircraft 202. Winglet 120 and winglet 124 in FIG. 1 may be examples of implementations for composite winglet 208 shown in block form in this figure.

In this illustrative example, composite winglet 208 comprises number of blades 210. Composite winglet 208 is a bifurcated winglet and comprises two blades arranged at an angle relative to one another in this illustrative example.

In other illustrative examples, composite winglet 208 may have more or fewer blades, depending on the particular implementation. For example, number of blades 210 in composite winglet 208 may include one blade, three blades, five blades, or any other suitable number of blades, depending on the particular implementation.

Composite winglet 208 may be comprised of a number of different types of material. For example, without limitation, composite winglet 208 may be comprised of a carbon fiber reinforced polymer, fiberglass, an aramid fiber, nylon, and other suitable types of materials.

In this illustrative example, composite winglet 208 is associated with wing 212 of aircraft 202. As used herein, when one component is "associated" with another component, the association is a physical association in the depicted examples. For example, a first component, such as composite winglet 208, may be considered to be associated with a second component, such as wing 212, by at least one of being secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by at least one of being formed as part of or as an extension of the second component.

As illustrated, composite winglet 208 is attached to wing 212 of aircraft 202 using attachment system 214. Attachment system 214 may be configured to be placed inside of composite winglet 208 and attached to wing 212 of aircraft 202 using number of fasteners 216. In other illustrative examples, attachment system 214 may be secured to composite winglet 208 using at least one of an adhesive, a weld, a bond, or some other suitable attachment mechanism.

As depicted, number of fasteners 216 may include various types of fasteners. For example, number of fasteners 216 may include screws, clips, bolts, hinges, welds, flanges, anchors, rivets, pins, and other suitable types of fasteners.

Number of fasteners 216 is configured to attach composite winglet 208 to wing 212 to provide a desired level of aerodynamic performance and a desired level of structural stability. This desired level of aerodynamic performance, desired level of structural stability, or both may be selected based on the type of aircraft selected for aircraft 202, the parameters of operation of aircraft 202, or a combination thereof.

As an example, larger aircraft with greater wingspans may use more fasteners or stronger fasteners to offset higher speeds and wing loads. Moreover, these larger aircraft may have larger dimensions for composite winglet 208 than smaller aircraft. Conversely, composite winglet 208 for smaller aircraft configured to carry lighter loads and have shorter wingspans, may have fewer of number of fasteners 216 attaching composite winglet 208 to wing 212 as compared to larger aircraft.

In this illustrative example, composite winglet 208 is manufactured using tool 204. In particular, number of plies of composite material 218 are laid up on tool 204 to form composite winglet 208.

In this illustrative example, a "ply" is a layer of fibrous composite material and may have resin infused within the layer. When resin is infused within the layer, the ply may be referred to as prepreg.

In some illustrative examples, the ply does not have resin infused within it. In this case, resin may be infused within the material prior to or during curing, using commonly known impregnation methods. In the instant case, one of number of plies of composite material 218 may be selected from at least one of a fabric, a cloth, tape, tows, or other suitable configurations of composite material.

As depicted, curing system 220 is configured to cure number of plies of composite material 218 on tool 204 to form composite winglet 208. In this illustrative example, vacuum bag 222 is placed around tool 204 with number of plies of composite material 218.

Vacuum 224 is then applied to tool 204 with number of plies of composite material 218 and cured using desired temperature 226 and desired pressure 228. After a period of time, composite winglet 208 may then be removed from tool 204 and attached to wing 212 of aircraft 202 in these illustrative examples.

Figure 3:
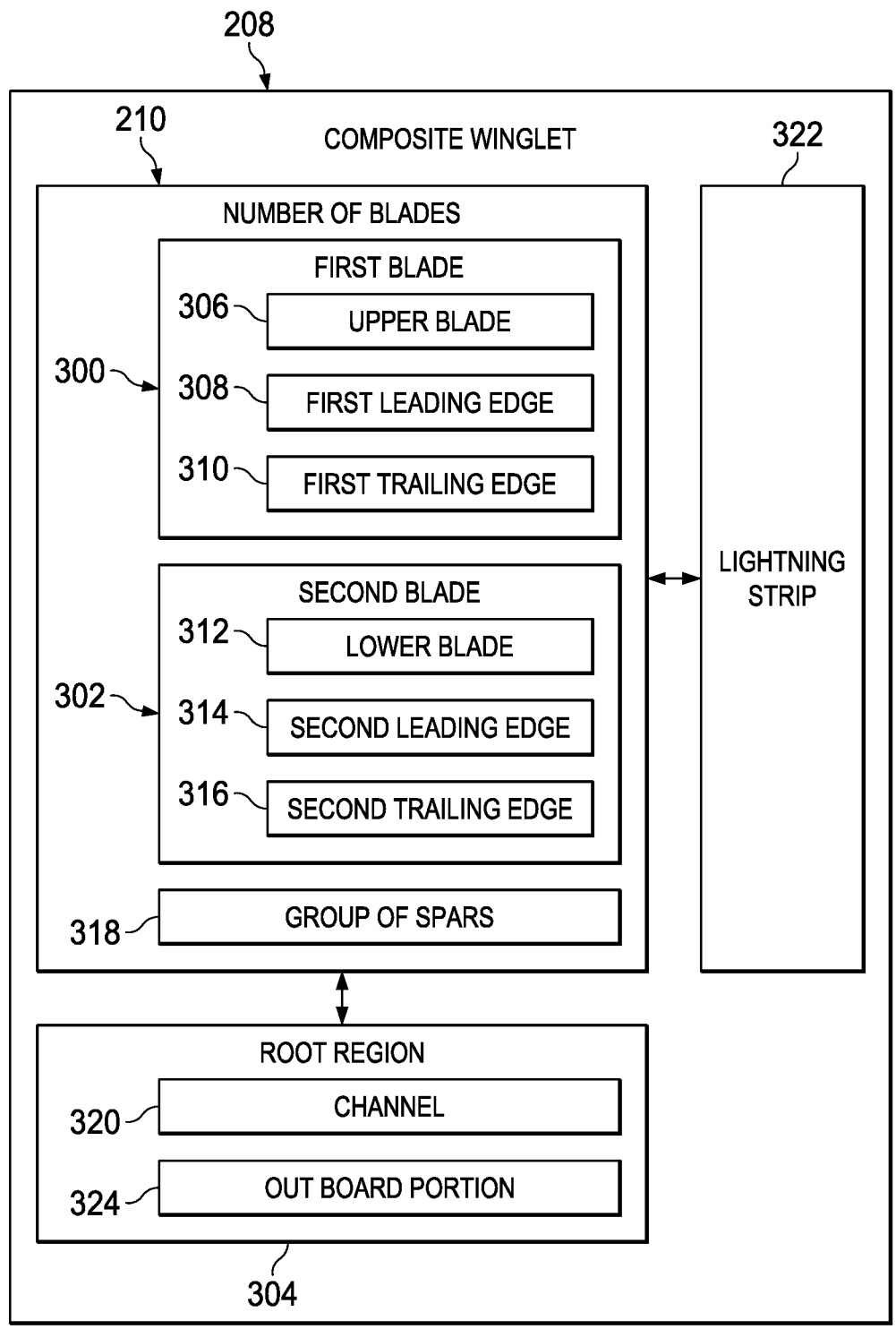
FIG. 3 is an illustration of a block diagram of a composite winglet in accordance with an illustrative embodiment.

Turning next to FIG. 3, an illustration of a block diagram of a composite winglet is depicted in accordance with an illustrative embodiment. In this illustrative example, a more detailed illustration of composite winglet 208 with number of blades 210 from FIG. 2 is shown.

As illustrated, composite winglet 208 comprises first blade 300, second blade 302, and root region 304. First blade 300 may be upper blade 306 and includes first leading edge 308 and first trailing edge 310 in this illustrative example.

In this depicted example, first leading edge 308 is the portion of first blade 300 of composite winglet 208 that first contacts the air when aircraft 202 of FIG. 2 is in operation. In other words, first leading edge 308 of first blade 300 is the foremost edge of first blade 300. First trailing edge 310 of first blade 300 of composite winglet 208 is the rearmost edge of first blade 300, where airflow separated by first leading edge 308 rejoins.

As depicted, second blade 302 of composite winglet 208 includes second leading edge 314, and second trailing edge 316. Second blade 302 may take the form of lower blade 312 in this illustrative example.

Second leading edge 314 of second blade 302 is the foremost edge of second blade 302, while second trailing edge 316 is the rearmost edge of second blade 302. Second blade 302 is positioned at an angle relative to first blade 300 in this depicted example.

In this illustrative example, first blade 300 and second blade 302 may have a similar shape and similar dimensions. In one example, the dimensions of first blade 300 and second blade 302 may be substantially the same. In other illustrative examples, however, first blade 300 may have a different shape, different dimensions, or both from second blade 302. For instance, first blade 300 may be longer than second blade 302.

As illustrated, group of spars 318 is associated with number of blades 210. For example, group of spars 318 may be positioned within number of blades 210. In one example, one of number of spars 318 is positioned within each of number of blades 210. In other illustrative examples, more than one of number of spars 318 may be positioned within each of number of blades 210, depending on the particular implementation.

In this depicted example, root region 304 is co-cured with first blade 300 and second blade 302. In particular, root region 304 connects first blade 300 with second blade 302.

In this illustrative example, "co-curing" refers to the act of curing one uncured composite part to another uncured composite part or to a core material at substantially the same time. The core material may be selected from one of a balsa, a honeycomb, or a foam core. When co-curing parts, all adhesives and resins are cured during the same process.

As depicted, root region 304 comprises channel 320. Channel 320 may be configured to receive attachment system 214 in FIG. 2. For instance, root region 304 may receive attachment system 214 in channel 320 of root region 304 and may be secured to attachment system 214 using number of fasteners 216 in FIG. 2.

In this depicted example, first blade 300, second blade 302, or both first blade 300 and second blade 302 may be associated with lightning strip 322. Lightning strip 322 is a lightning diverting device configured to protect composite winglet 208 from damage caused by an electromagnetic event, such as a lightning strike. In particular, lightning strip 322 is configured to dissipate electricity from an electromagnetic event.

As depicted, at least one of first trailing edge 310 of first blade 300 or second trailing edge 316 of second blade 302 is associated with lightning strip 322. Lightning strip 322 may extend along the entire surface of first trailing edge 310 or second trailing edge 316.

In some illustrative examples, lightning strip 322 is co-cured with composite winglet 208 when composite winglet 208 is cured. In particular, lightning strip 322 is co-cured with first blade 300, second blade 302, and root region 304 of composite winglet 208. In other illustrative examples, lightning strip 322 may be connected to composite winglet 208 in some other suitable manner.

Figure 4:
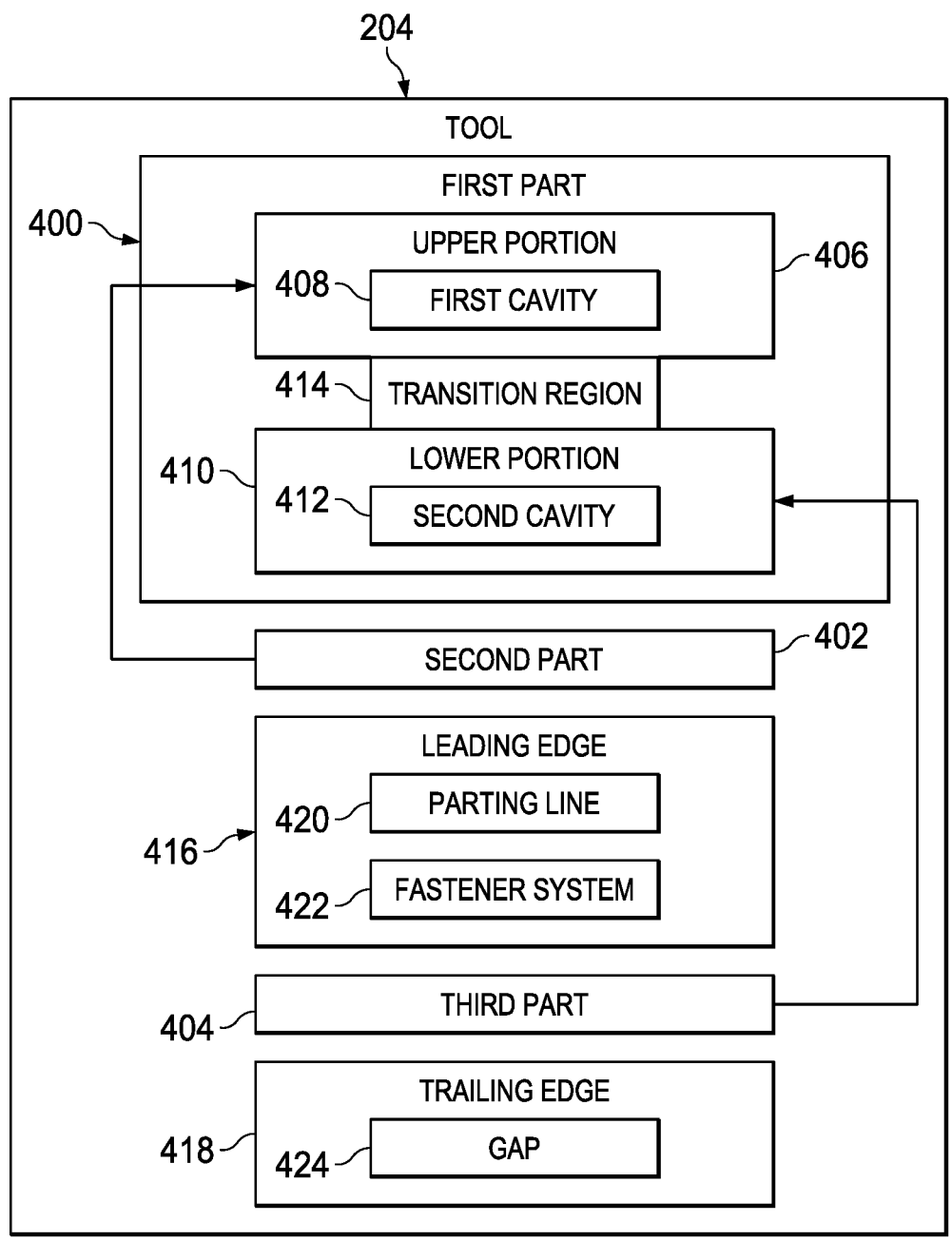
FIG. 4 is an illustration of a block diagram of a tool for forming a composite winglet in accordance with an illustrative embodiment.

In FIG. 4, an illustration of a block diagram of a tool for forming a composite winglet is depicted in accordance with an illustrative embodiment. In this depicted example, a more detailed illustration of tool 204 from FIG. 2 is shown.

As illustrated, tool 204 includes first part 400, second part 402, and third part 404. First part 400, second part 402, and third part 404 are configured to receive number of plies of composite material 218 to form composite winglet 208 for aircraft 202 shown in block form in FIG. 2 in this illustrative example.

In this depicted example, first part 400 includes upper portion 406 with first cavity 408 and lower portion 410 with second cavity 412. Upper portion 406 is associated with lower portion 410 in this illustrative example. In particular, upper portion 406 and lower portion 410 are welded together to form first part 400. Lower portion 410 is connected to upper portion 406 at transition region 414.

As depicted, lower portion 410 is arranged at an angle to upper portion 406. The angle may be selected based on a desired level of aerodynamic performance for composite winglet 208 of FIG. 2.

As illustrated, first part 400 of tool 204 is configured to form an outboard skin of composite winglet 208. In other words, number of plies of composite material 218 is positioned in first part 400 of tool 204 to form the outboard skin of composite winglet 208 once cured.

A number of plies of composite material are laid up on upper portion 406 of first part 400 to form the outboard skin of upper blade 306 of composite winglet 208 from FIG. 3, while lower portion 410 of first part 400 is configured to form the outboard skin of lower blade 312 of composite winglet 208 from FIG. 3. In this illustrative example, an "outboard skin" is the skin of composite winglet 208 that faces outwardly away from the body of the aircraft.

In this illustrative example, a number of plies of composite material are laid up on transition region 414 to form part of root region 304 in FIG. 3. Transition region 414 forms the outboard portion 324 of root region 304 in this illustrative example.

As illustrated, second part 402 is configured to be placed over first cavity 408 of upper portion 406 of first part 400 of tool 204. In a similar fashion, third part 404 is configured to be placed over second cavity 412 of lower portion 410 of first part 400 of tool 204.

A number of plies of composite material may be laid up on second part 402 to form an inboard skin of first blade 300, and third part 404 may form an inboard skin of second blade 302 in this illustrative example. In this illustrative example, an "inboard skin" is the skin of composite winglet 208 that faces inwardly toward the body of the aircraft.

In this depicted example, tool 204 may be comprised of a number of different types of material. For instance, tool 204 may be comprised of one or more materials selected from at least one of a metal, a metal alloy, a wood, a foam, a steel, a poly(methyl methacrylate), an aluminum, nickel, an aluminum-nickel alloy, or some other type of suitable material.

In some illustrative examples, tool 204 may be comprised of a material with a coefficient of thermal expansion that is similar to that of the material selected for number of plies of composite material 218 in FIG. 2. Moreover, depending on the curing conditions, and the heat and pressure applied to tool 204, various materials may be selected to form an illustrative embodiment in a desired manner. Tool 204 may be fabricated using well-known tool fabrication techniques.

As depicted, tool 204 comprises leading edge 416 and trailing edge 418 opposite leading edge 416. In this illustrative example, leading edge 416 of tool 204 corresponds to first leading edge 308 of first blade 300 and second leading edge 314 of second blade 302 of composite winglet 208 in FIG. 3. In a similar fashion, trailing edge 418 of tool 204 corresponds to first trailing edge 310 of first blade 300 and second trailing edge 316 of second blade 302 of composite winglet 208 in FIG. 3.

Parting line 420 is arranged along leading edge 416 of tool 204 in this illustrative example. Parting line 420 is the portion of tool 204 where second part 402 and third part 404 may be attached to first part 400 of tool 204.

At least one of second part 402 or third part 404 may be attached to upper portion 406 and lower portion 410 of first part 400, respectively, using fastener system 422 in this illustrative example. Fastener system 422 may include at least one of nuts, bolts, screws, clips, anchors, adhesives, or other suitable types of fasteners.

As illustrated, tool 204 also comprises gap 424 in trailing edge 418 of tool 204. Gap 424 is configured to form a thin trailing edge for composite winglet 208. A number of additional gaps also may be present in tool 204 in other illustrative examples.

Figure 5:
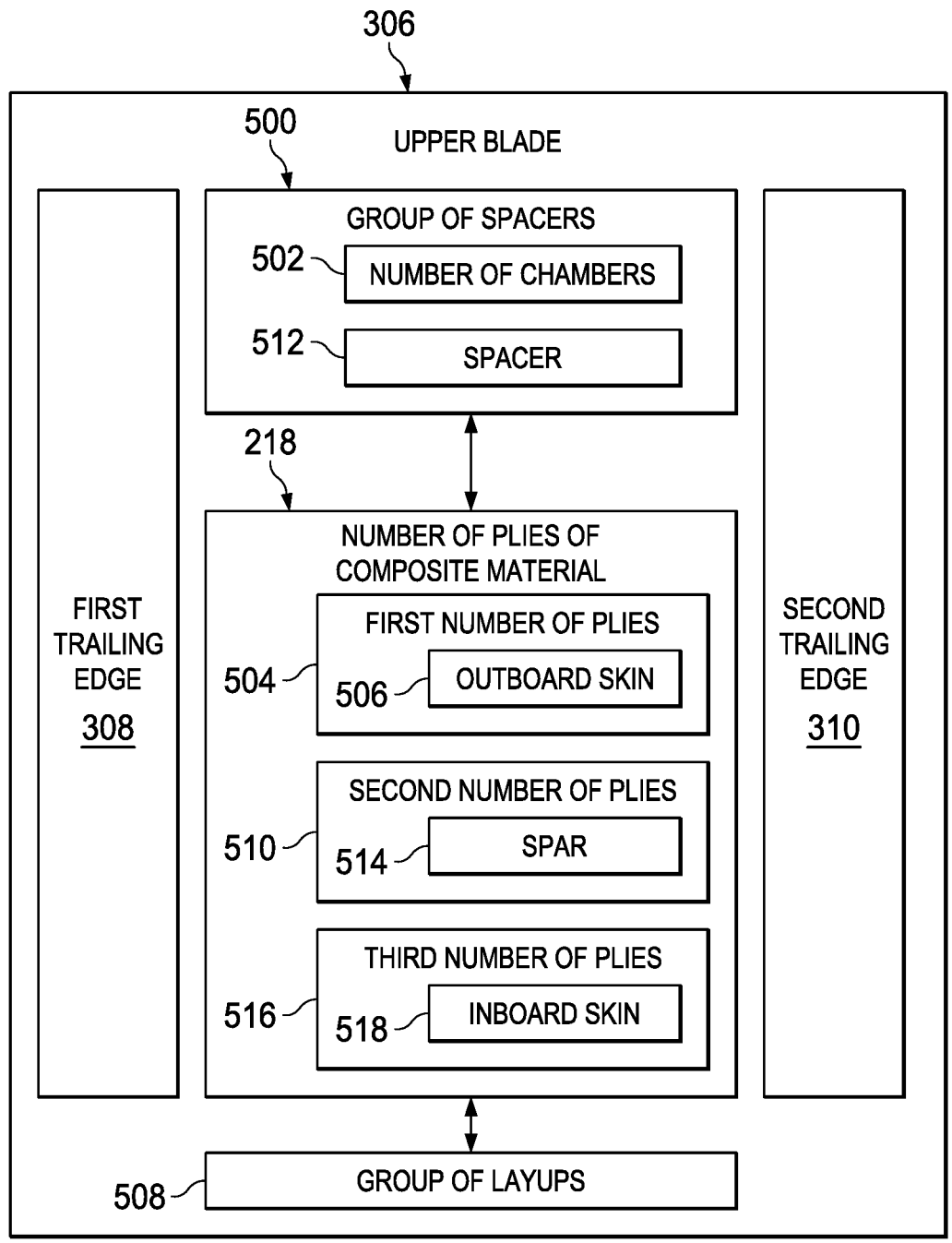
FIG. 5 is an illustration of a block diagram of an upper blade of a composite winglet in accordance with an illustrative embodiment.

Referring now to FIG. 5, an illustration of a block diagram of an upper blade of a composite winglet is depicted in accordance with an illustrative embodiment. In this depicted example, a more detailed illustration of upper blade 306 of composite winglet 208 from FIG. 3 is shown.

As depicted, upper blade 306 is formed using number of plies of composite material 218 and group of spacers 500. Group of spacers 500 forms number of chambers 502 within the interior of upper blade 306.

In this illustrative example, one of group of spacers 500 is selected from at least one of a caul plate, a bag, a bag carrier, a mandrel, or some other type of suitable spacer.

Group of spacers 500 may be comprised of a material selected from one of an aluminum, a foam, a cork, a water-soluble powder, a carbon, or other types of suitable materials. These materials may be selected to be flexible such that group of spacers 500 may be extracted from composite winglet 208 of FIG. 2 after curing. In some cases, the group of spacers 500 may have to be segmented in addition to being flexible, in order to be extracted through constrictions in the cured part.

Group of spacers 500 may be positioned within tool 204 to form number of chambers 502 within the interior of upper blade 306 when upper blade 306 is cured. In some illustrative examples, group of spacers 500 are inflated prior to curing of composite winglet 208 to exert pressure on the inner skin of upper blade 306.

As illustrated, first number of plies 504 is laid up on tool 204 to form outboard skin 506 of upper blade 306. As one illustrative example, first number of plies 504 may include two plies of carbon fiber reinforced polymer material. In other illustrative examples, first number of plies 504 may include more or fewer than two plies.

Group of layups 508 may then be placed on tool 204. Group of layups 508 comprises second number of plies 510 covering spacer 512 to form spar 514 to provide support in the interior of upper blade 306.

One or more additional spacers in group of spacers 500 may be positioned in tool 204 to form number of chambers 502. Third number of plies 516 is then positioned over spar 514 and group of spacers 500 to form inboard skin 518 of upper blade 306.

Second number of plies 510 and third number of plies 516 may also comprise two plies in some illustrative examples. Other suitable configurations of plies may be implemented in other illustrative examples.

Although the components described herein are in reference to upper blade 306, lower blade 312 may also include the same components. In other illustrative examples, lower blade 312 includes components in addition to or in place of the ones illustrated for upper blade 306.

The illustrations of composite winglet 208 and the components within composite winglet 208 in FIGS. 2-5 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For instance, in some illustrative examples, composite winglet 208 may have only one blade arranged at an angle relative to a wing of the aircraft. As an example, the blade may be angled upward from the wing of the aircraft.

In other illustrative examples, tool 204 may be used to form another type of airfoil structure, such as a horizontal stabilizer or a vertical stabilizer. In this illustrative example, the number of spacers and configurations of plies of composite material may be different than described above.

Figure 6:
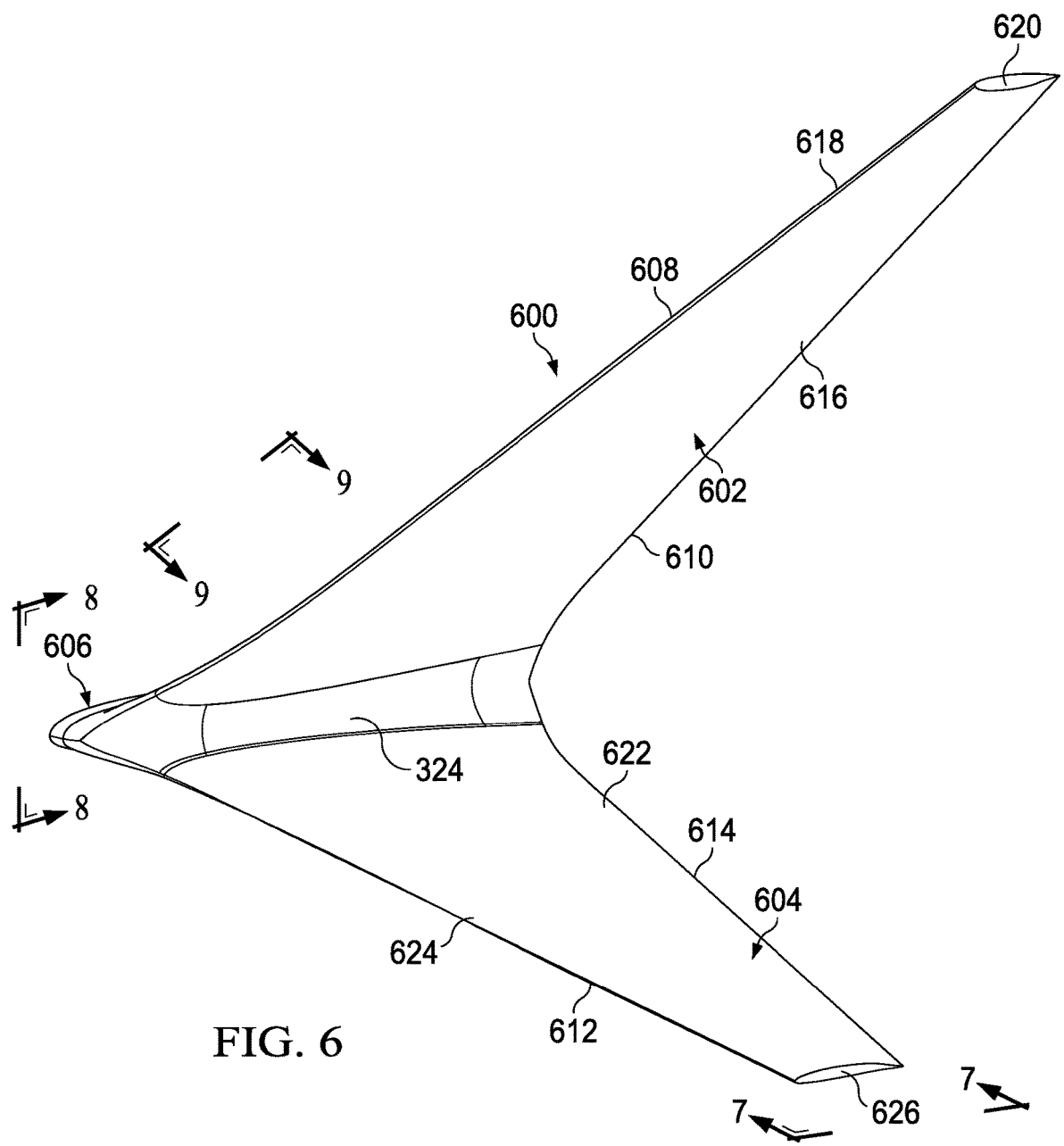
FIG. 6 is an illustration of a perspective view of a composite winglet in accordance with an illustrative embodiment.

Turning now to FIG. 6, an illustration of a perspective view of a composite winglet is depicted in accordance with an illustrative embodiment. In this illustrative example, composite winglet 600 is an example of one implementation for composite winglet 208 shown in block form in FIGS. 2-3.

Composite winglet 600 is a one-piece bifurcated winglet in this illustrative example. In other words, the components within composite winglet 600 have been co-cured to form a single part. As a result, fasteners or other components are not needed to connect one portion of composite winglet 600 to other portions of composite winglet 600. Composite winglet 600 has a smooth surface in this illustrative example.

As depicted, composite winglet 600 comprises upper blade 602, lower blade 604, and root region 606. Upper blade 602, lower blade 604, and root region 606 are examples of implementations for first blade 300, second blade 302, and root region 304 in FIG. 3, respectively. Outboard portion 324 of root region 304 is seen as the seamless transition of outboard skin 616 from upper blade 602 to outboard skin 622 of lower blade 604.

In this illustrative example, upper blade 602 is longer than lower blade 604. In some illustrative examples, upper blade 602 and lower blade 604 may be the same length. In other illustrative examples, lower blade 604 may be longer than upper blade 602.

As illustrated, upper blade 602 includes leading edge 608 and trailing edge 610, while lower blade 604 includes leading edge 612 and trailing edge 614. Upper blade 602 has outboard skin 616, inboard skin 618, and opening 620. In a similar fashion, lower blade 604 has outboard skin 622, inboard skin 624, and opening 626.

Opening 620 and opening 626 may be configured to receive caps in this illustrative example. The caps may seal opening 620 and opening 626. After curing composite winglet 208, opening 620 and opening 626 may be used to remove group of spacers 500 in FIG. 5 from the interior of composite winglet 208 before the caps are placed on opening 620 and opening 626.

Figure 7:
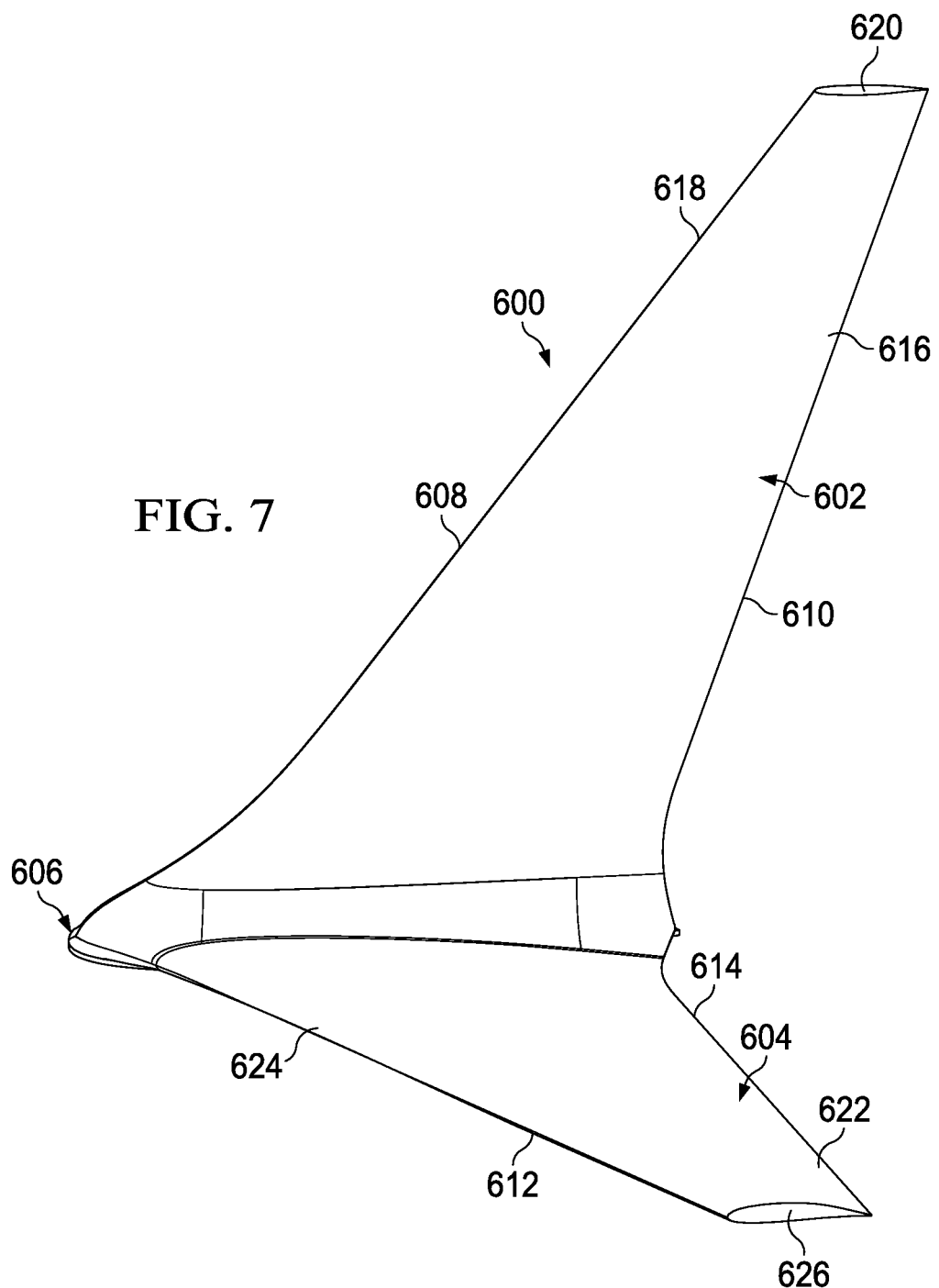
FIG. 7 is an illustration of a side view of a composite winglet in accordance with an illustrative embodiment.

In FIG. 7, an illustration of a side view of a composite winglet is depicted in accordance with an illustrative embodiment. In this illustrative example, composite winglet 600 is shown in the direction of view lines 7-7 in FIG. 6.

Figure 8:
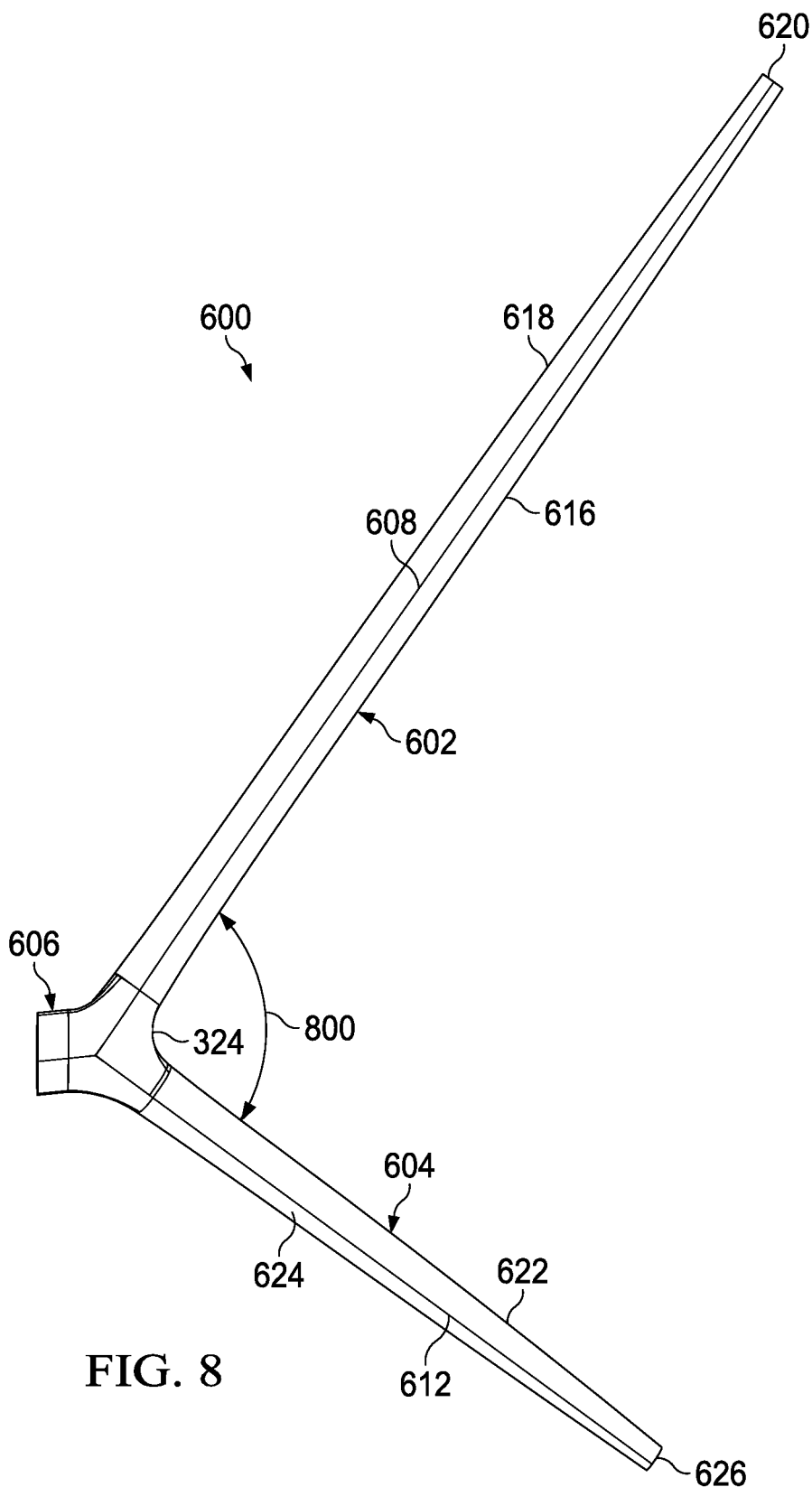
FIG. 8 is an illustration of a front view of a composite winglet in accordance with an illustrative embodiment.

With reference next to FIG. 8, an illustration of a front view of a composite winglet is depicted in accordance with an illustrative embodiment. In this view, composite winglet 600 is shown in the direction of view lines 8-8 in FIG. 6.

As illustrated, upper blade 602 and lower blade 604 are positioned at angle 800 with respect to one another. Angle 800 may be measured by an intersection of a line of leading edge 608 of upper blade 602 and a line of leading edge 612 in lower blade 604. Angle 800 may be selected to achieve a desired level of aerodynamic performance for composite winglet 600. Accordingly, outboard portion 324 of root region 606 is formed with a continuous outer surface that is not angular itself, but instead may be shaped to provide at least a desired (without limitation): reliability, durability, flexibility, stiffness, aerodynamic, load, stress, and/or strain performance.

Figure 9:
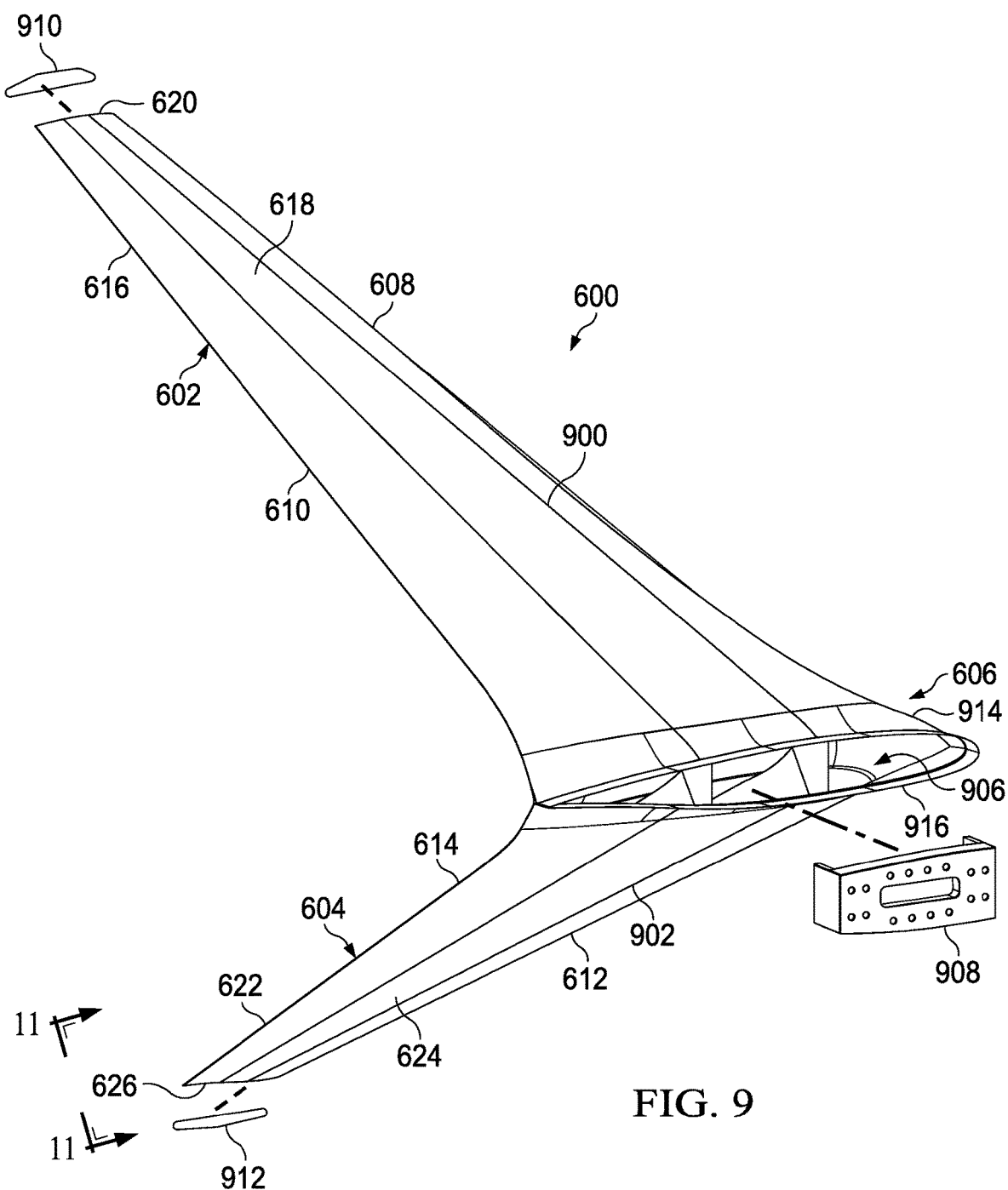
FIG. 9 is an illustration of a perspective view of a composite winglet in accordance with an illustrative embodiment.

Turning now to FIG. 9, an illustration of a perspective view of a composite winglet is depicted in accordance with an illustrative embodiment. In this illustrative example, composite winglet 600 is shown in the direction of view lines 9-9 in FIG. 6.

As illustrated, spar 900 and spar 902 are shown in phantom in this figure. Spar 900 is configured to provide support for upper blade 602, while spar 902 is configured to provide support for lower blade 604. Spar 900 and spar 902 may be examples of implementations of spar 514 in FIG. 5.

In this illustrative example, root region 606 of composite winglet 600 comprises upper skin 914, lower skin 916, and channel 906. Channel 906 is configured to receive attachment system 908 to attach composite winglet 600 to a wing of an aircraft. Cap 910 and cap 912 are also present in this illustrative example.

Cap 910 is configured to seal opening 620 in upper blade 602 after group of spacers 500 shown in block form in FIG. 5 is removed from upper blade 602. Cap 910 seals opening 620 in upper blade 602, such that a fluid does not pass between the interface of cap 910 and the inner skin of upper blade 602. This fluid may be air, water, or some other type of fluid in the environment around composite winglet 600.

As illustrated, cap 912 is configured to seal opening 626 in lower blade 604 after group of spacers 500 is removed from lower blade 604. Cap 912 seals opening 626 in lower blade 604 such that fluid does not pass between the interface of cap 912 and the inner skin of lower blade 604.

Figure 10:
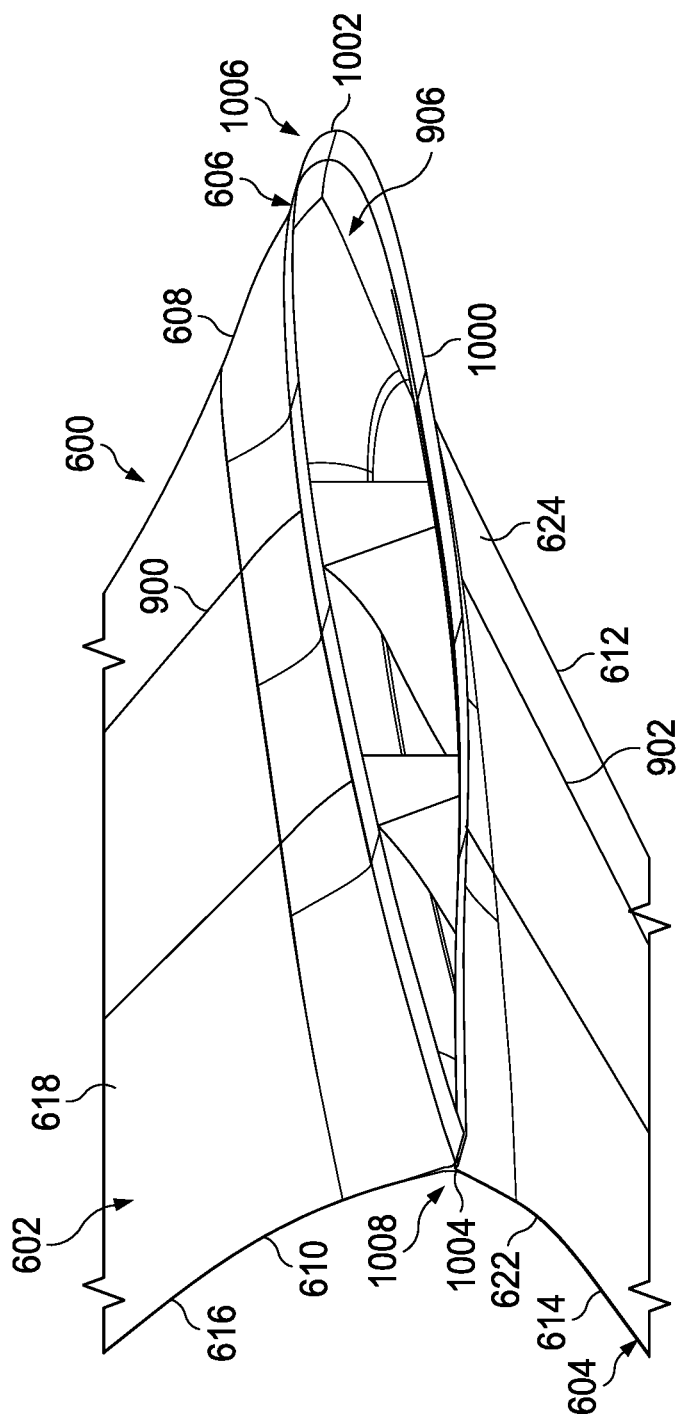
FIG. 10 is an illustration of a root region in accordance with an illustrative embodiment.

In FIG. 10, an illustration of a root region is depicted in accordance with an illustrative embodiment. In this depicted example, a closer view of root region 606 is shown.

As depicted, root region 606 has shape 1000. Shape 1000 is configured to provide a desired level of aerodynamic performance for composite winglet 600. Root region 606 has leading edge 1002 and trailing edge 1004. Leading edge 1002 is a location where leading edge 608 of upper blade 602 and leading edge 612 of lower blade 604 meet. In a similar fashion, trailing edge 1004 is a location where trailing edge 610 of upper blade 602 and trailing edge 614 of lower blade 604 meet.

In this illustrative example, leading edge 1002 of root region 606 has curved shape 1006, while trailing edge 1004 of root region 606 has pointed shape 1008. In some illustrative examples, the shape of leading edge 1002 and trailing edge 1004 may be different than shown in this figure, depending on the functionality of composite winglet 600. Shape 1000 of root region 606 may be formed to match a shape of an airfoil at the tip of a wing that composite winglet 600 will be attached to, without limitation, via attachment system 908 as shown in FIG. 9.

Figure 11:
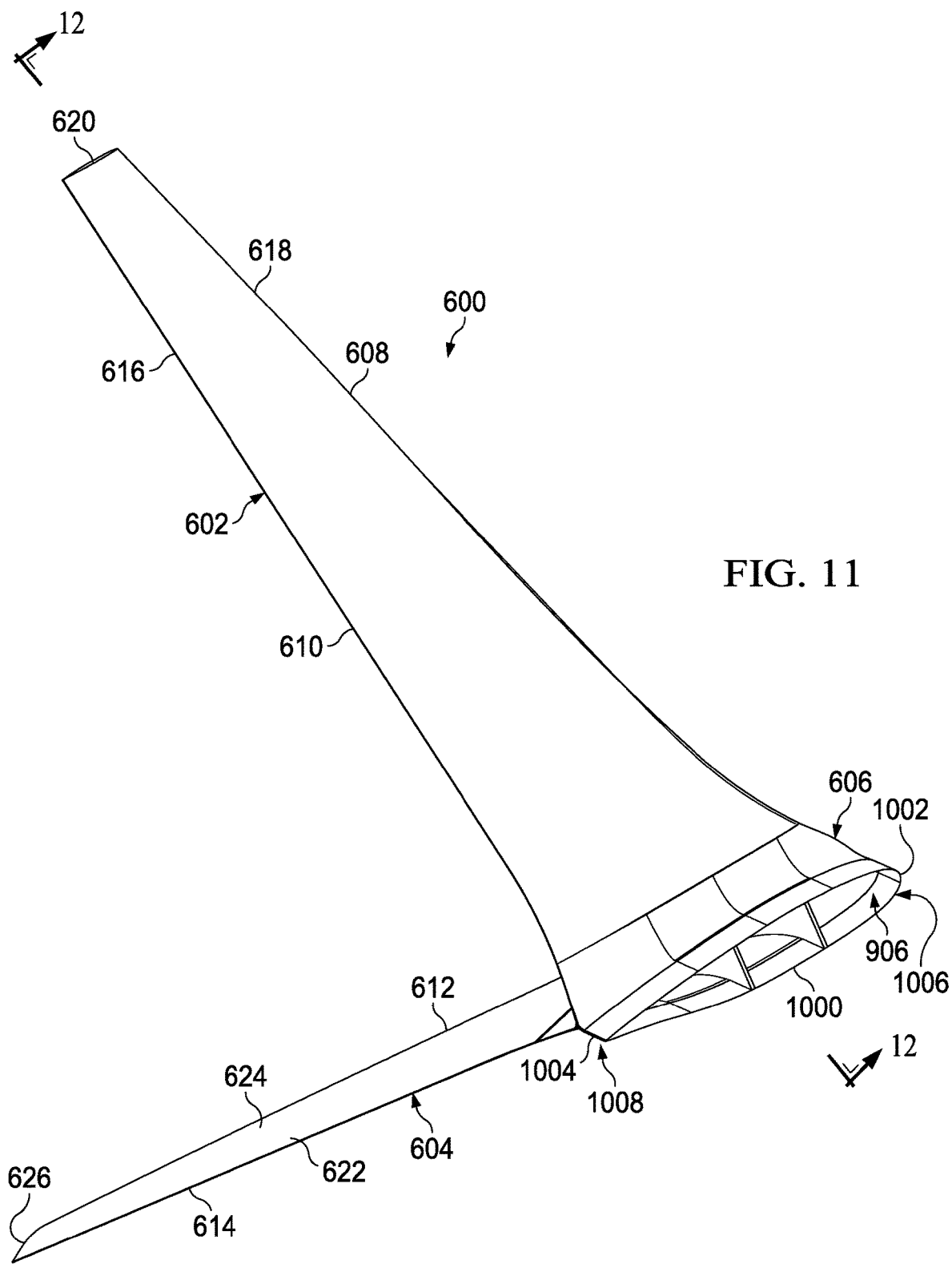
FIG. 11 is an illustration of a back view of a composite winglet in accordance with an illustrative embodiment.

Referring now to FIG. 11, an illustration of a back view of a composite winglet is depicted in accordance with an illustrative embodiment. In this illustrative example, composite winglet 600 is shown in the direction of view lines 11-11 in FIG. 9.

Figure 12:
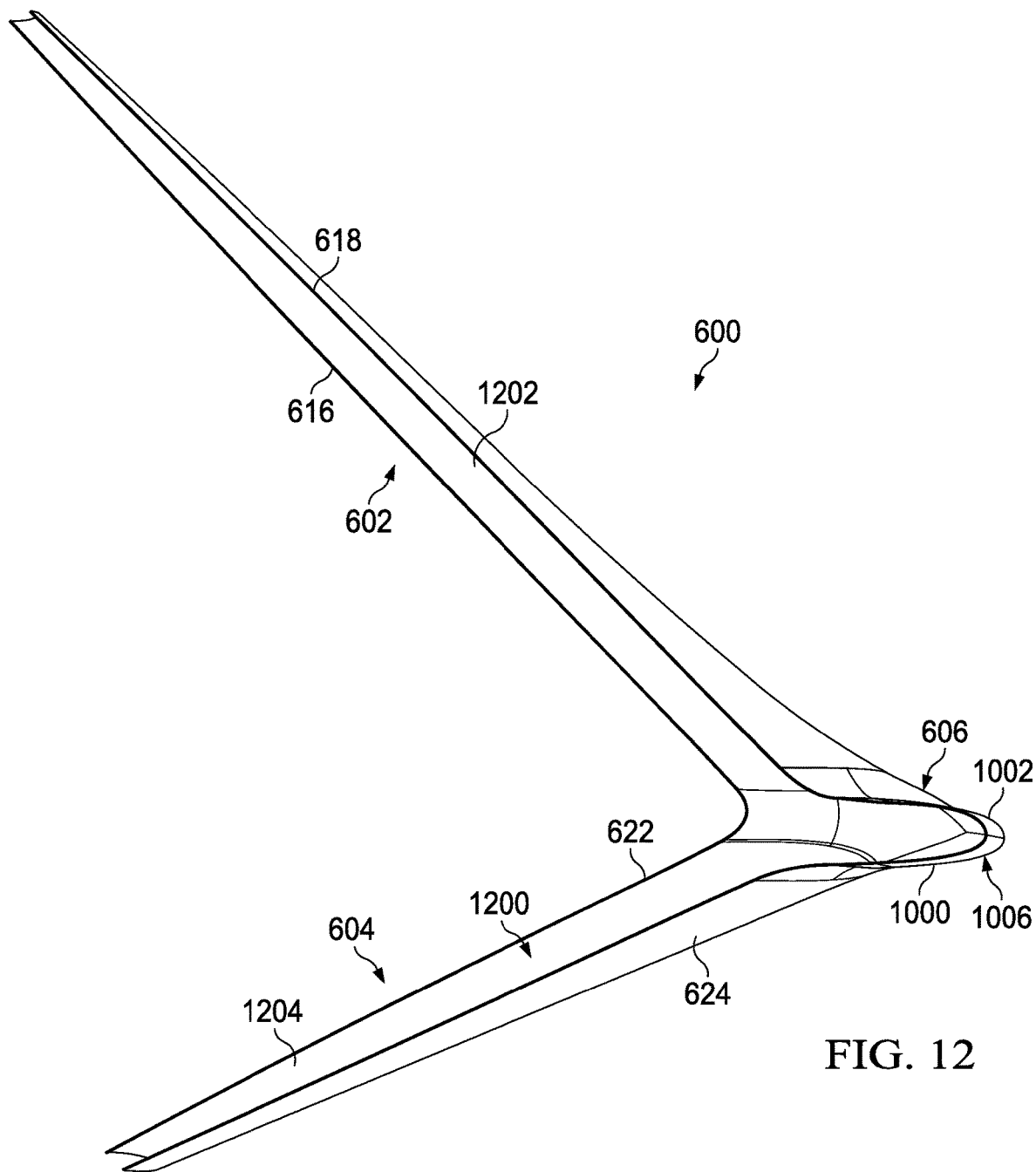
FIG. 12 is an illustration of a cross-sectional view of a composite winglet in accordance with an illustrative embodiment.

Turning next to FIG. 12, an illustration of a cross-sectional view of a composite winglet is depicted in accordance with an illustrative embodiment. In this illustrative example, a cross-sectional view of composite winglet 600 is shown taken along lines 12-12 in FIG. 11.

As depicted, composite winglet 600 includes number of chambers 1200. Number of chambers 1200 is an example of one implementation for number of chambers 502 shown in block form in FIG. 5.

In this illustrative example, upper blade 602 includes chamber 1202, and lower blade 604 includes chamber 1204. Chamber 1202 and chamber 1204 may be formed using spacers during curing of composite winglet 600.

Figure 13:
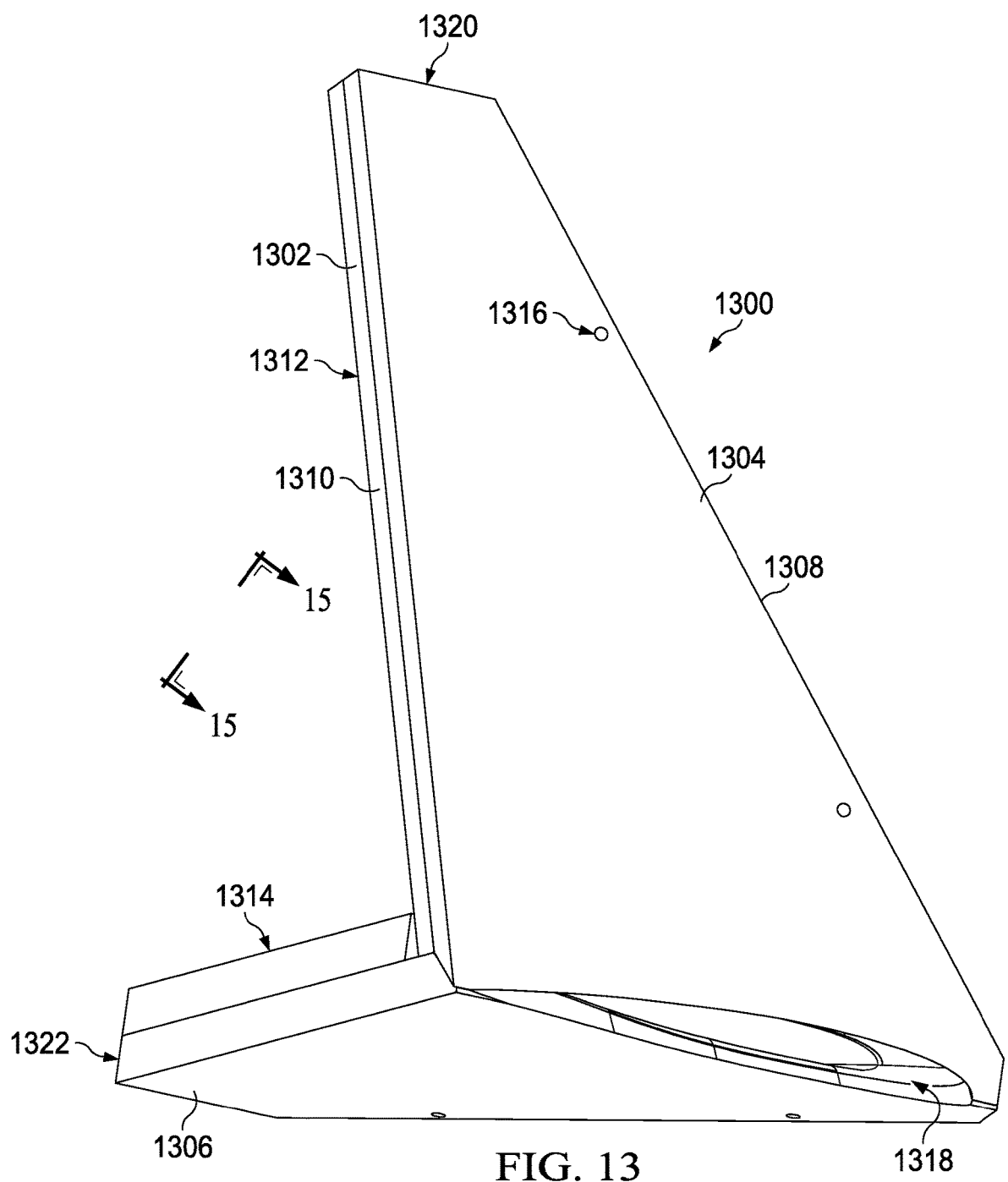
FIG. 13 is an illustration of a perspective view of a tool for forming a composite winglet in accordance with an illustrative embodiment.

In FIG. 13, an illustration of a perspective view of a tool for forming a composite winglet is depicted in accordance with an illustrative embodiment. In this illustrative example, tool 1300 is an example of one implementation for tool 204 shown in block form in FIG. 2.

As depicted, tool 1300 includes first part 1302, second part 1304, and third part 1306. Tool 1300 has leading edge 1308 and trailing edge 1310 in this illustrative example. Each part of tool 1300 may be machined from a single piece of material. The material may be a metal. The material may be aluminum. The material may be a square shape with a certain thickness determined by a desired thickness of a blade of composite winglet 600. In an illustrative embodiment, the desired thickness may be no more than 1 inch thick.

As illustrated, first part 1302 of tool 1300 includes upper portion 1312 and lower portion 1314. Tool 1300 includes a number of openings 1316 in leading edge 1308 of tool 1300. The number of openings 1316 is configured to receive a fastener system (not shown in this view) to seal tool 1300.

In this illustrative example, gap 1318 is also present in tool 1300. Gap 1318 is used to form the shape of a root region of a composite winglet in this depicted example. For example, gap 1318 may form shape 1000 of root region 606 shown in FIG. 10.

In some illustrative examples, a number of additional gaps may be present in tool 1300. For instance, gaps may be present in at least one of tip 1320 or tip 1322 of tool 1300.

Tool 1300 may be used to form composite winglet 600 shown in FIG. 6. In particular, upper portion 1312 of first part 1302 and second part 1304 may be used to form upper blade 602 of composite winglet 600, while lower portion 1314 of first part 1302 and third part 1306 may be configured to form lower blade 604 of composite winglet 600.

Figure 14:
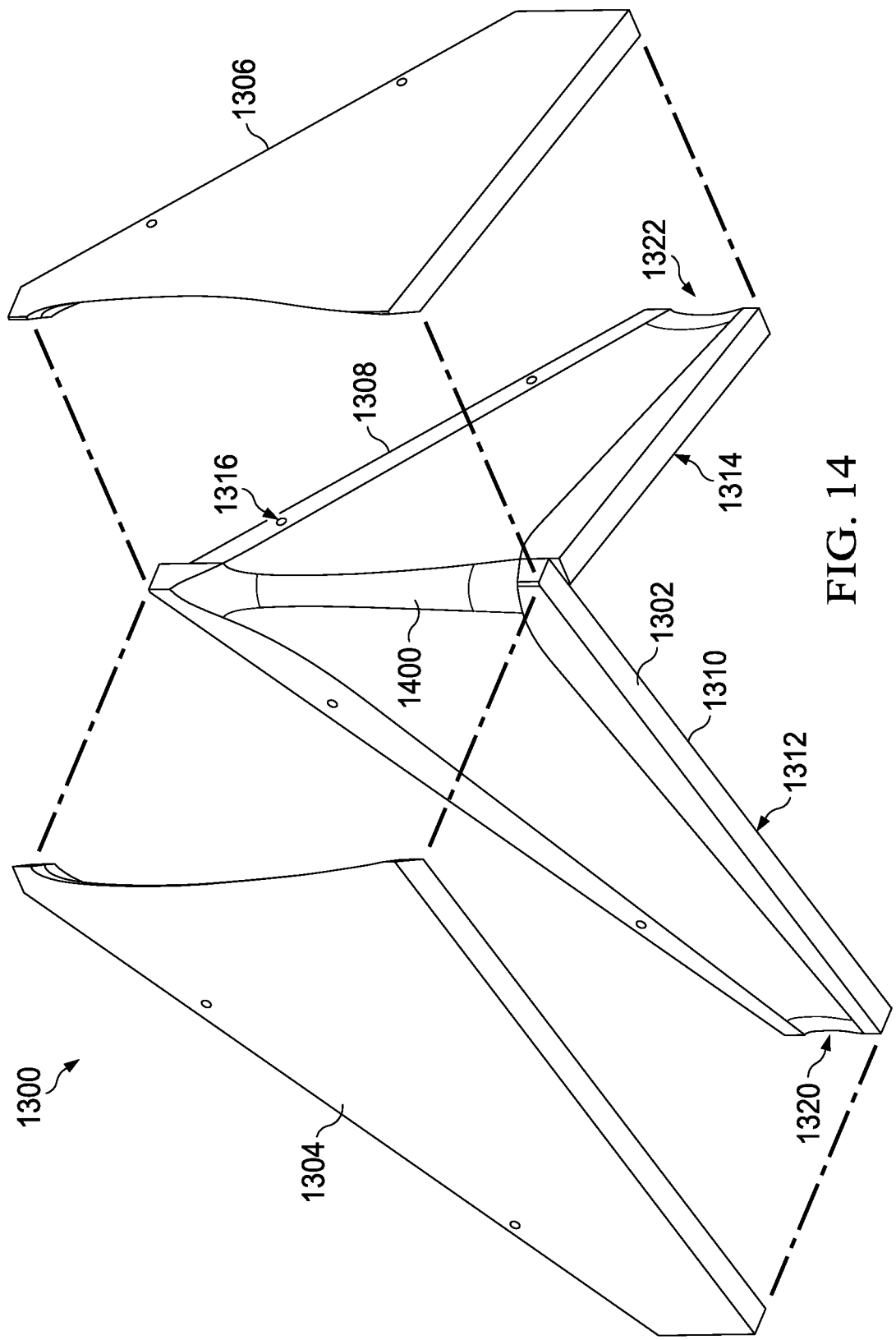
FIG. 14 is an illustration of an exploded view of a tool for forming a composite winglet in accordance with an illustrative embodiment.

With reference next to FIG. 14, an illustration of an exploded view of a tool for forming a composite winglet is depicted in accordance with an illustrative embodiment. In this depicted example, an exploded view of tool 1300 from FIG. 13 is shown.

As illustrated, upper portion 1312 and lower portion 1314 of first part 1302 of tool 1300 are connected at transition region 1400. Transition region 1400 is a region where upper portion 1312 and lower portion 1314 are welded together.

Figure 15:
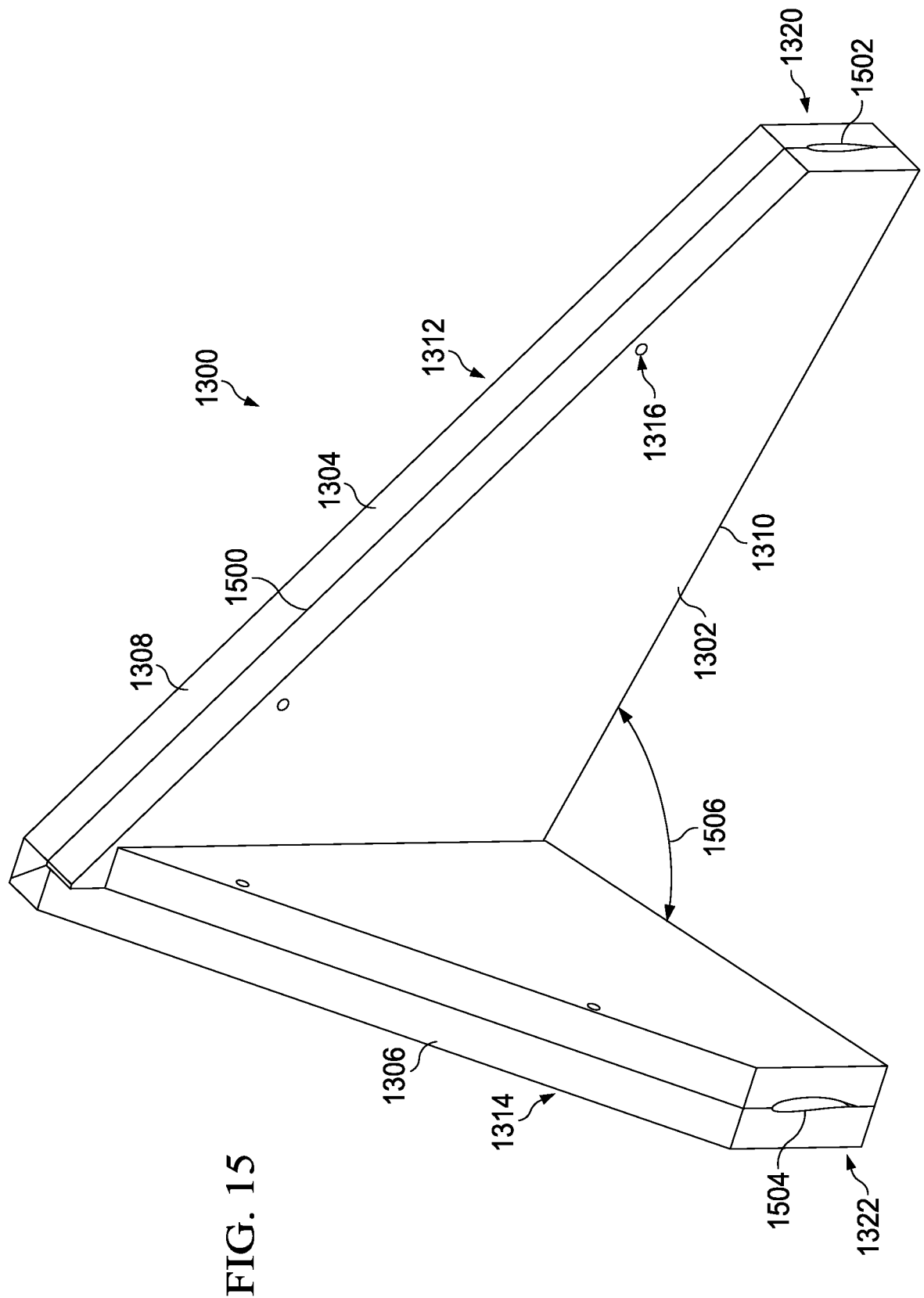
FIG. 15 is an illustration of a tool for forming a composite winglet in accordance with an illustrative embodiment.

Turning now to FIG. 15, an illustration of a tool for forming a composite winglet is depicted in accordance with an illustrative embodiment. In this depicted example, tool 1300 is shown in the direction of view lines 15-15 in FIG. 13.

As illustrated, tool 1300 has parting line 1500 in leading edge 1308. Parting line 1500 is the portion of tool 1300 where second part 1304 and third part 1306 may be attached to first part 1302 of tool 1300.

In the depicted example, gap 1502 in tip 1320 of tool 1300 and gap 1504 in tip 1322 of tool 1300 may be seen more clearly. Gap 1502 and gap 1504 may be configured to form opening 620 and opening 626, respectively, in composite winglet 600 in FIG. 6.

In this illustrative example, upper portion 1312 of first part 1302 and second part 1304 are arranged at angle 1506 relative to lower portion 1314 of first part 1302 and third part 1306. Angle 1506 may be selected to form a desired angle for the composite winglet. For instance, angle 1506 may be selected to form angle 800 for composite winglet 600 as shown in FIG. 8.

Figure 16:
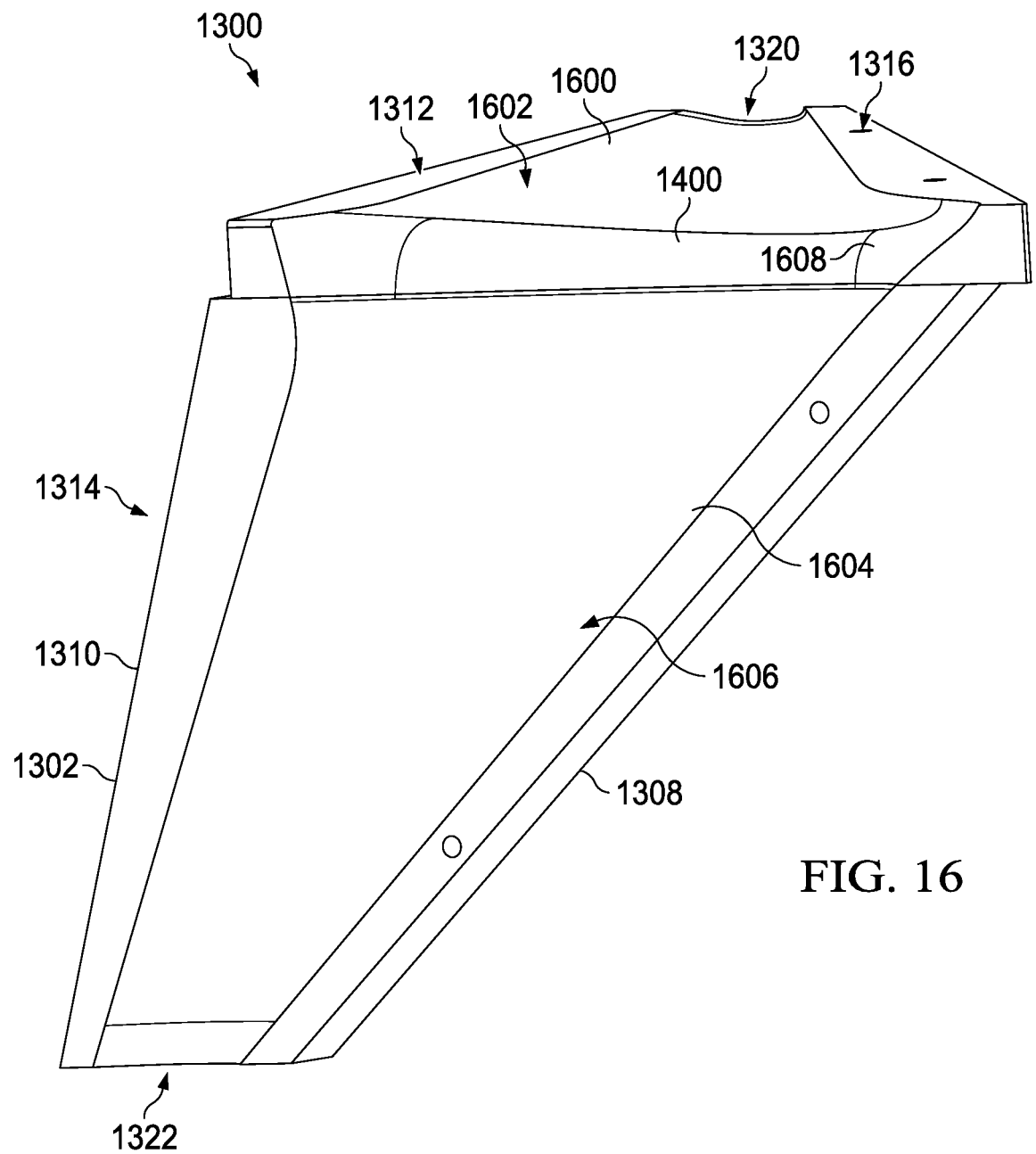
FIG. 16 is an illustration of a first part of a tool for forming an outboard skin of a composite winglet in accordance with an illustrative embodiment.

In FIG. 16, an illustration of a first part of a tool for forming an outboard skin of a composite winglet is depicted in accordance with an illustrative embodiment. In this depicted example, a more-detailed view of first part 1302 is shown.

As depicted, inner surface 1604 of lower portion 1314 of first part 1302 forms cavity 1606. In this illustrative example, cavity 1606 is used to form the shape of a lower blade of a composite winglet. For instance, cavity 1606 may form lower blade 604 of composite winglet 600 in FIG. 6.

In this depicted example, inner surface 1600 of upper portion 1312 of first part 1302 has cavity 1602 used to form the shape of an upper blade of a composite winglet. For example, cavity 1602 may form upper blade 602 of composite winglet 600 in FIG. 6.

As illustrated, lip 1608 is seen in upper portion 1312. Lip 1608 in upper portion 1312 of first part 1302 of tool 1300 is configured to form a leading edge of an upper blade of a winglet. For instance, lip 1608 may be configured to form leading edge 608 of upper blade 602 of composite winglet 600 in FIG. 6.

Lower portion 1314 also includes a lip (not shown in this view) configured to form a leading edge of a lower blade of a composite winglet. For example, the lip may form leading edge 612 of lower blade 604 of composite winglet 600 in FIG. 6.

In this illustrative example, the shape of inner surface 1600 and inner surface 1604 may be selected to form a desired shape of the outboard skin of a composite winglet. In a similar fashion, although not shown in this view, the inner surface of second part 1304 and third part 1306 also may be selected to form a desired shape of the inboard skin of a composite winglet. As a result, the composite winglet may be designed to have a smooth surface, which increases the aerodynamic performance and the strength of the composite winglet.

FIGS. 17-22 illustrate one example of a process used for forming a composite winglet. In this illustrative example, FIGS. 17-22 show different steps in a process for forming composite winglet 2400 shown in FIG. 24.

Figure 17:
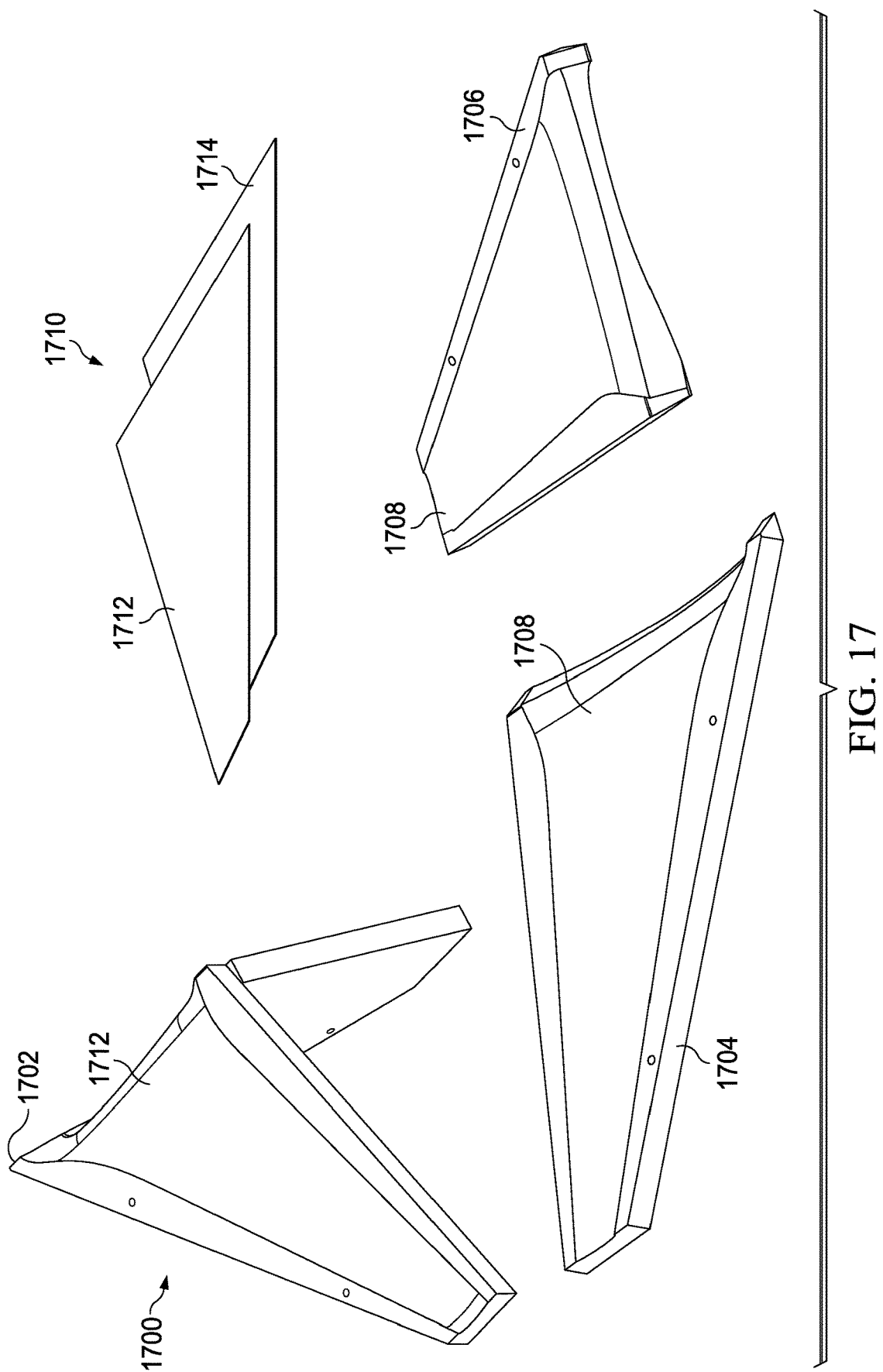
FIG. 17 is an illustration of a tool for forming a composite winglet in accordance with an illustrative embodiment.

Referring to FIG. 17, an illustration of a tool for forming a composite winglet is depicted in accordance with an illustrative embodiment. In this depicted example, tool 1700 is shown with first part 1702, second part 1704, and third part 1706.

In this illustrative example, tool 1700 may be coated with coating material 1708. Coating material 1708 may be a mold release agent that is configured to coat the inner surfaces of tool 1700, such that the composite winglet may be more easily separated from tool 1700 after curing the composite winglet.

As depicted, number of plies of composite material 1710 may be cut and placed into first part 1702 of tool 1700. Number of plies of composite material 1710 form the outboard skin of composite winglet 2400 in FIG. 24. In particular, first number of plies 1712 forms the outboard skin of an upper blade of composite winglet 2400, while second number of plies 1714 forms the outboard skin of a lower blade of composite winglet 2400 of FIG. 24 in these illustrative examples.

Figure 18:
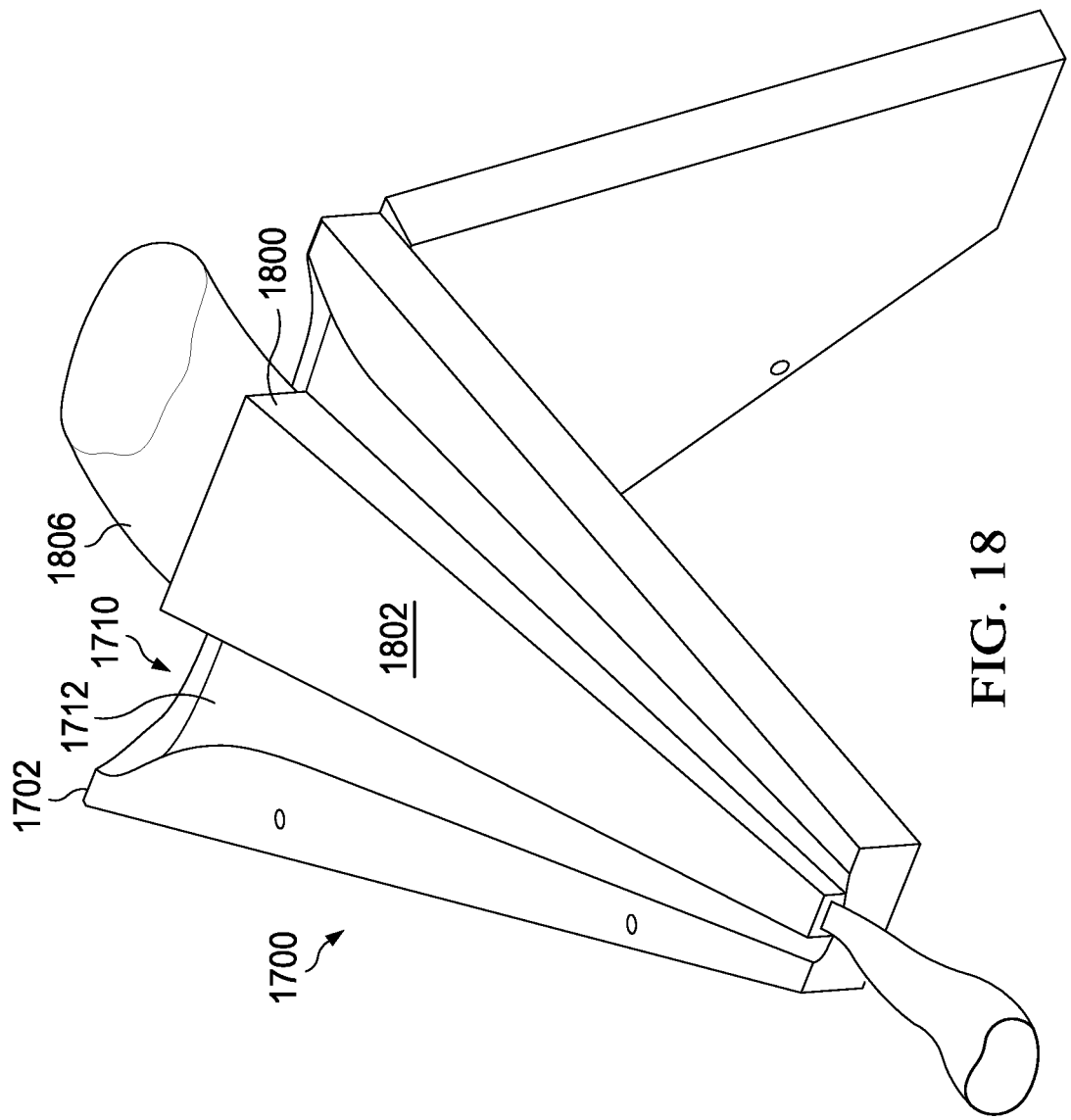
FIG. 18 is an illustration of a tool with a group of layups in accordance with an illustrative embodiment.

In FIG. 18, an illustration of a tool with a group of layups is depicted in accordance with an illustrative embodiment. In this depicted example, layup 1800 has been positioned in tool 1700.

As illustrated, layup 1800 may be comprised of third number of plies 1802 of composite material wrapped around spacer 1804 (hidden by plies 1802). In this illustrative example, spacer 1804 is made of a bag carrier (not shown) positioned within bag 1806. In other illustrative examples, layup 1800 may be formed in some other manner, depending on the particular implementation.

Figure 19:
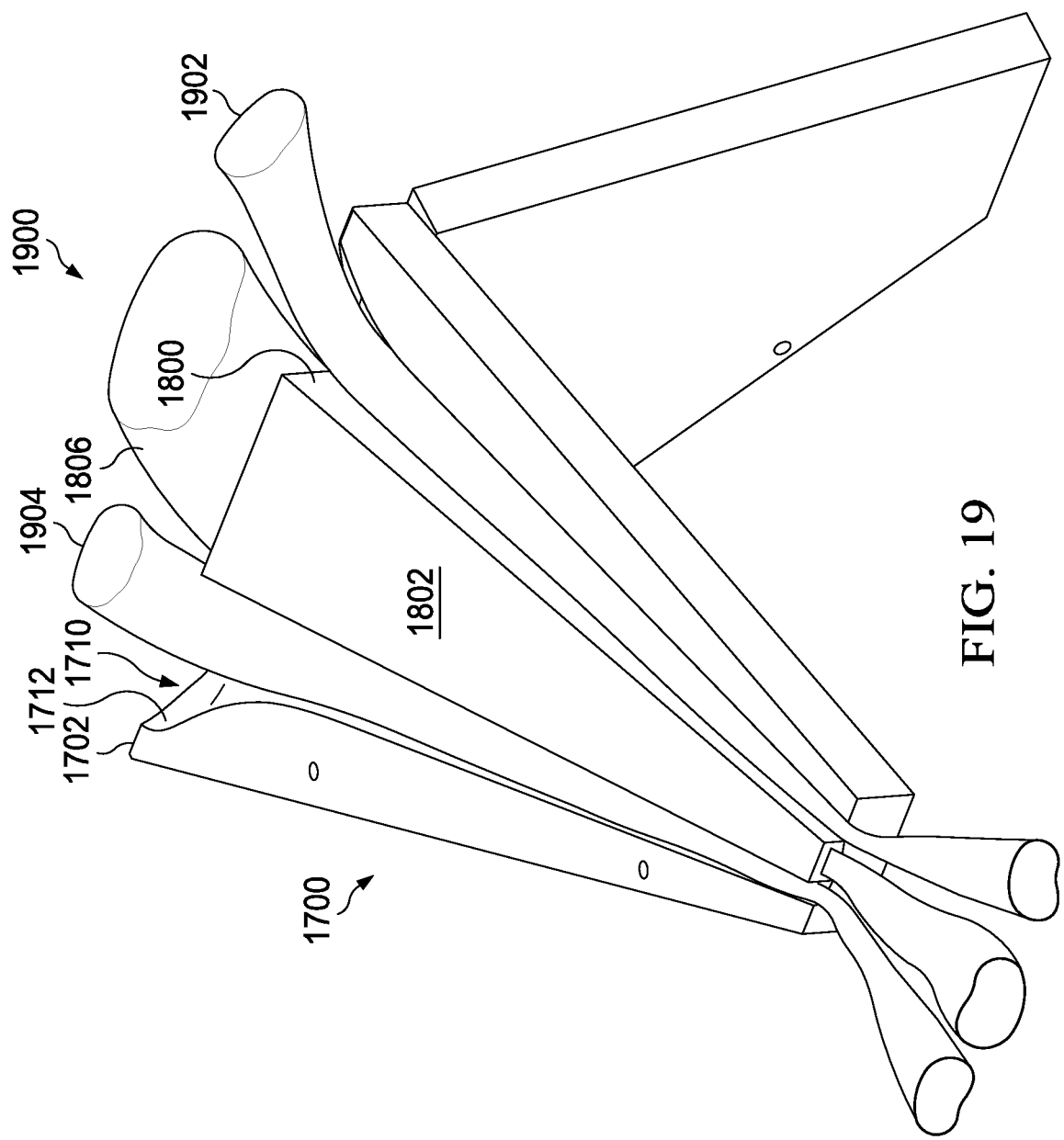
FIG. 19 is an illustration of a tool with a number of spacers in accordance with an illustrative embodiment.

With reference next to FIG. 19, an illustration of a tool with a number of spacers is depicted in accordance with an illustrative embodiment. In this depicted example, number of spacers 1900 is positioned in tool 1700.

As illustrated, number of spacers 1900 includes bag 1902 and bag 1904. Bag 1902, bag 1904, and bag 1806 are configured to be inflated to form chambers within composite winglet 2400 in FIG. 24. In other illustrative examples, number of spacers 1900 may include different types of spacers other than bags, depending on the functionality involved.

Figure 20:
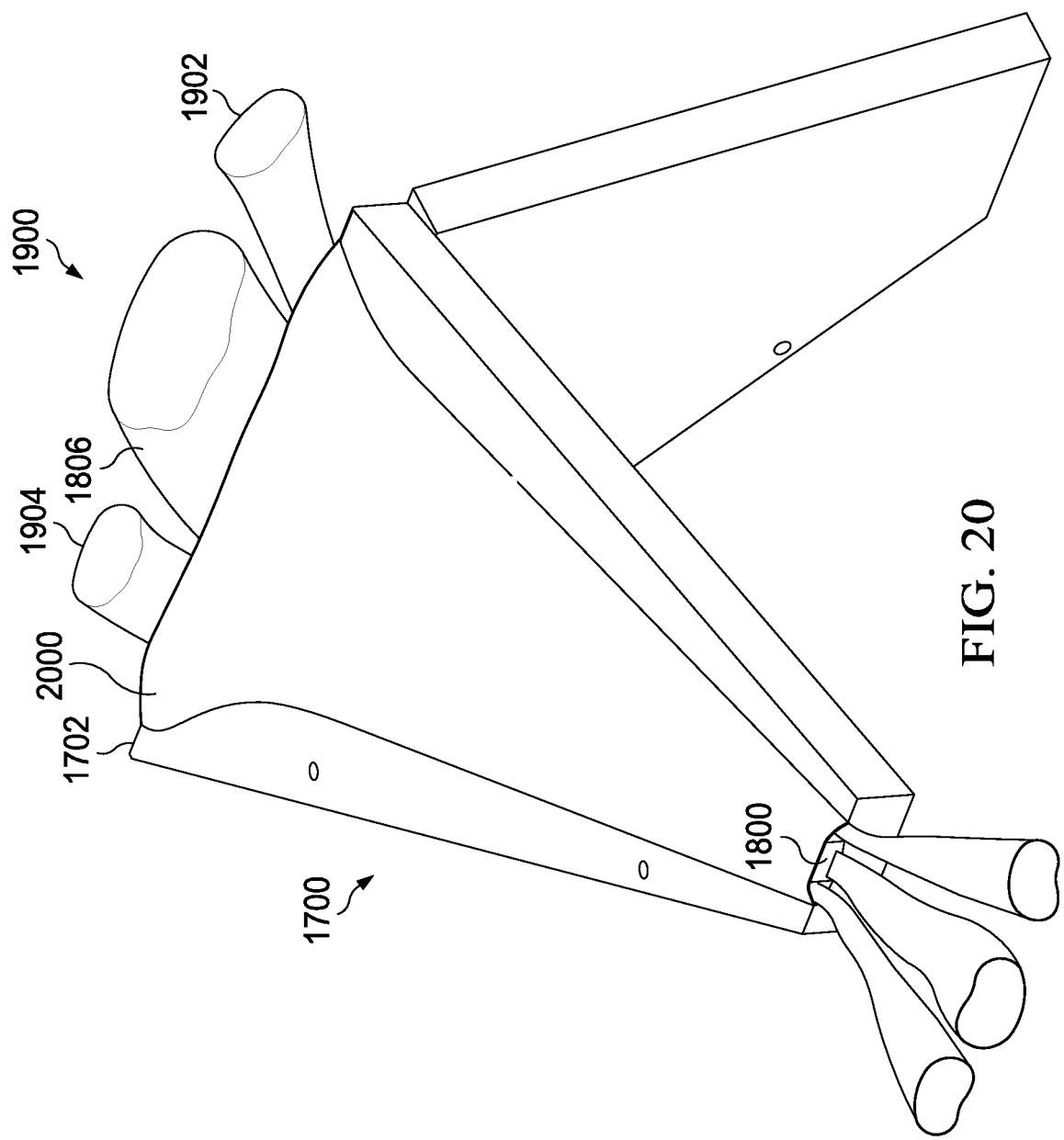
FIG. 20 is an illustration of a tool for forming a composite winglet in accordance with an illustrative embodiment.

Turning now to FIG. 20, an illustration of a tool for forming a composite winglet is depicted in accordance with an illustrative embodiment. In this illustrative example, fourth number of plies 2000 of composite material has been positioned on top of layup 1800 of FIG. 18. Fourth number of plies 2000 forms the inboard skin of the upper blade of composite winglet 2400 in FIG. 24.

Figure 21:
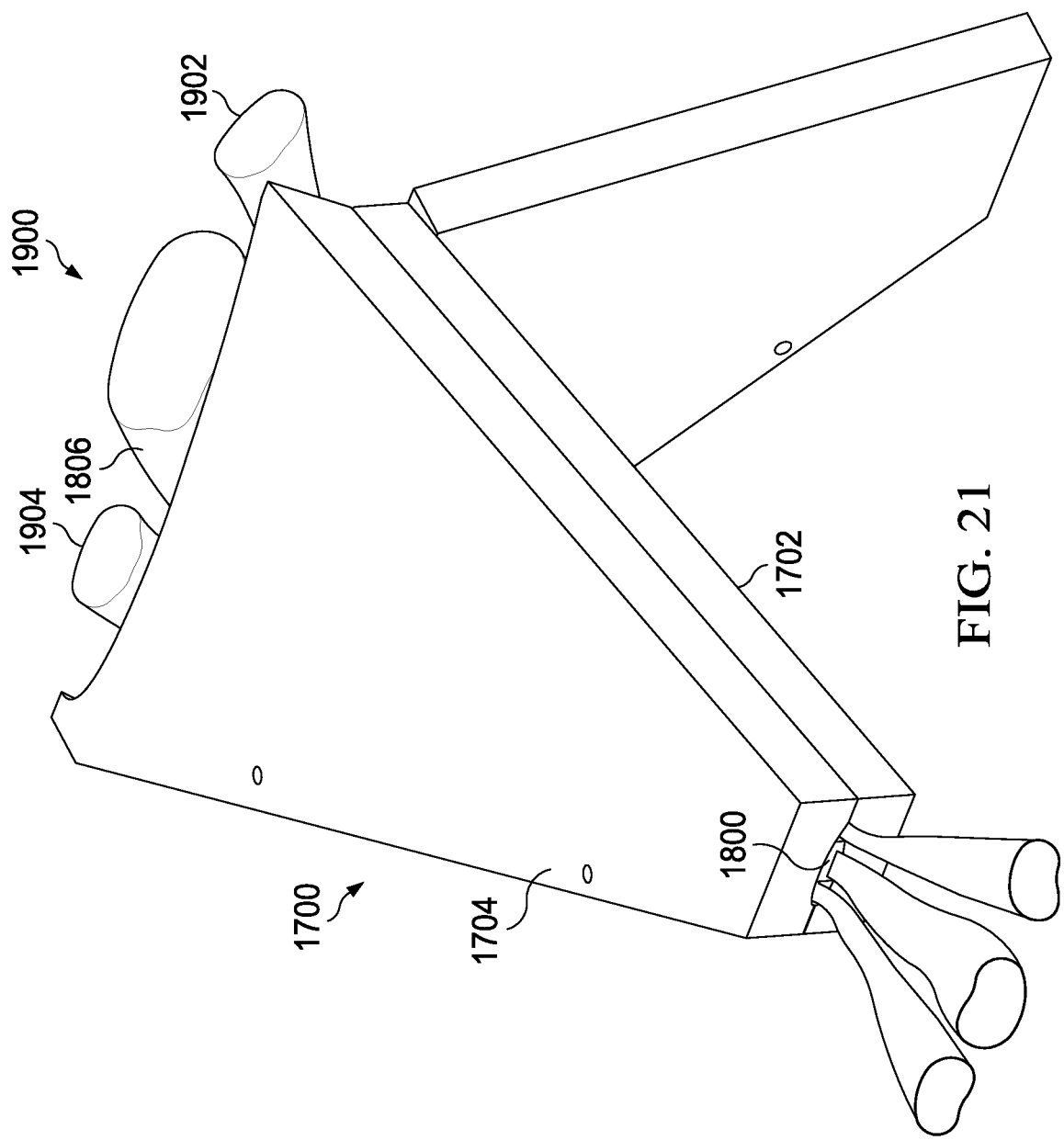
FIG. 21 is an illustration of another tool for forming a composite winglet in accordance with an illustrative embodiment.

In FIG. 21, another illustration of a tool for forming a composite winglet is depicted in accordance with an illustrative embodiment. In this illustrative example, second part 1704 of tool 1700 has been positioned over first number of plies 1712 (not seen in this view), layup 1800, and third number of plies 2000 (not seen in this view).

As illustrated, second part 1704 may be attached to first part 1702 of tool 1700 using a fastener system. In some cases, second part 1704 may be attached to first part 1702 of tool 1700 using a fastener system and then further sealed with tape.

Figure 22:
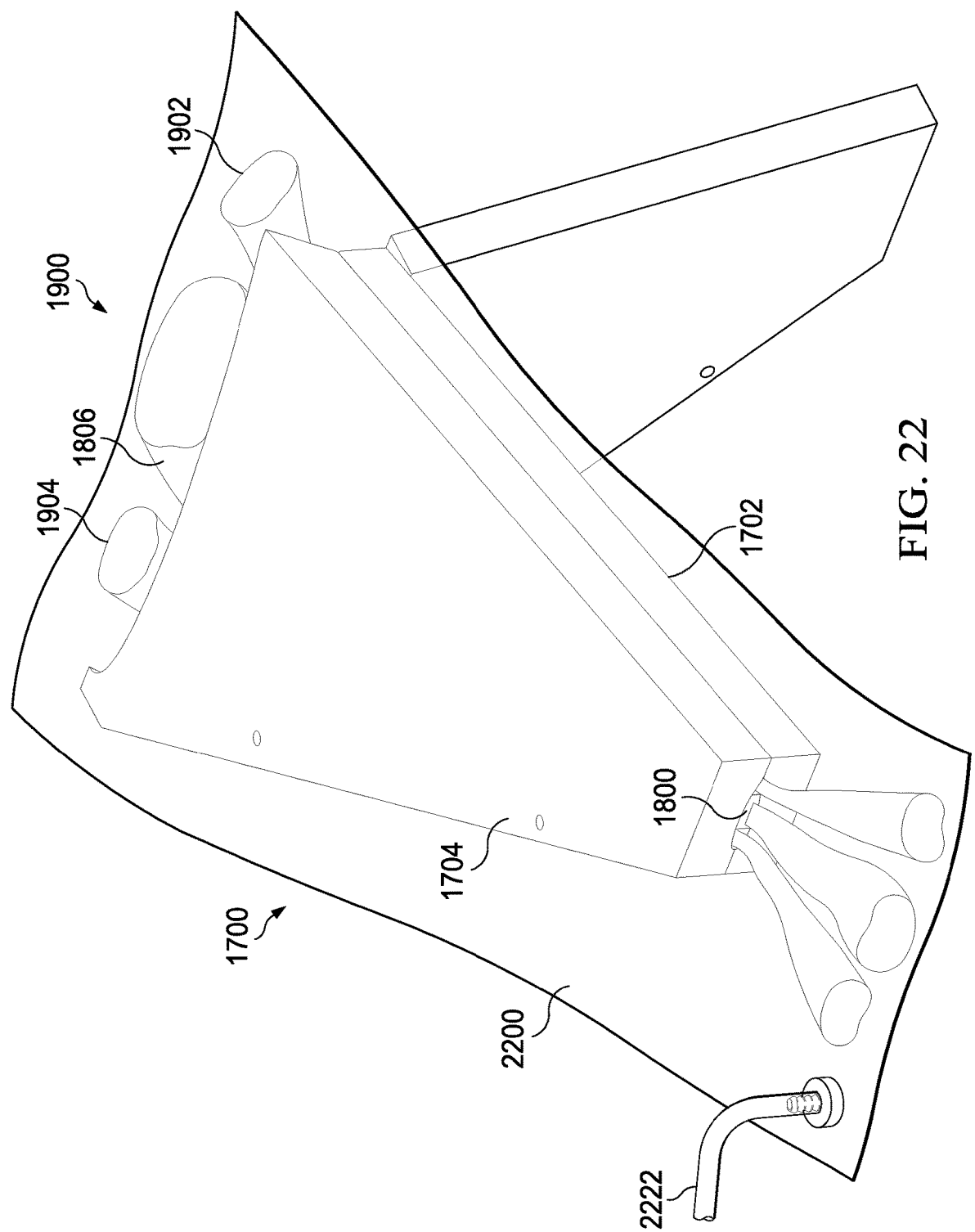
FIG. 22 is an illustration of yet another tool for forming a composite winglet in accordance with an illustrative embodiment.

Referring next to FIG. 22, yet another illustration of a tool for forming a composite winglet is depicted in accordance with an illustrative embodiment. In this depicted example, vacuum bag 2200 has been placed over tool 1700.

As illustrated, vacuum bag 2200 may be sealed and attached to hose 2222. Hose 2222 is connected to a vacuum source (not shown) to pull a vacuum on tool 1700 to cure composite winglet 2400 in FIG. 24. Tool 1700 is exposed to a desired temperature and pressure during the curing process.

Figure 23:
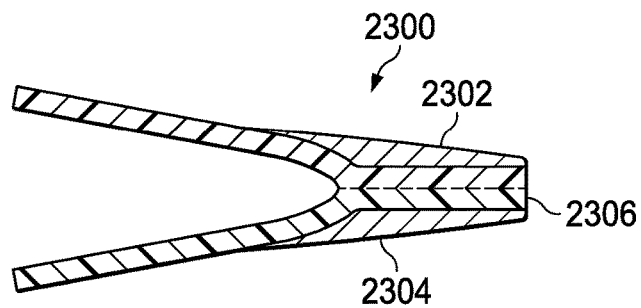
FIG. 23 is an illustration of a lightning strip co-cured with a composite winglet in accordance with an illustrative embodiment.

In FIG. 23, an illustration of a lightning strip co-cured with a composite winglet is depicted in accordance with an illustrative embodiment. In this illustrative example, lightning strip 2300 has been co-cured with composite winglet 2400. In particular, lightning strip 2300 has been co-cured with composite winglet 2400.

As depicted, lightning strip 2300 may be added to the composite winglet during one of the steps described with reference to FIGS. 17-21, prior to placing vacuum bag 2200 over tool 1700 and curing the composite winglet.

In this depicted example, lightning strip 2300 is configured to dissipate electricity and prevent damage to the composite winglet. Lightning strip 2300 has first portion 2302 and second portion 2304 attached to number of plies of composite material 2306.

Lightning strip 2300 is attached to the composite winglet on the trailing edge of the composite winglet in this illustrative example. In other illustrative examples, lightning strip 2300 may be attached to another portion of the composite winglet or may have a different shape, depending on the particular implementation.

Although the illustrative examples in FIGS. 17-23 are shown with reference to forming an upper blade of a composite winglet, the lower blade of the composite winglet may be formed in a similar manner and at the same time as the upper blade. In some illustrative examples, it may be desirable to form the lower blade and upper blade at different times.

The illustrations in FIGS. 17-23 only show some of the operations or stages for forming a composite winglet. Other components, operations, and stages may be present in addition to or in place of the ones depicted in FIGS. 17-23. For example, a release layer may be used in addition to or in place of coating material 1708 on tool 1700.

In some illustrative examples, a number of additional spars may be positioned in tool 1700. In other illustrative examples, tool 1700 or a portion of tool 1700 and the process described with reference to any one of FIGS. 17-23 may be used to rework composite winglet 2400, rather than manufacture composite winglet 2400 in FIG. 24.

Figure 24:
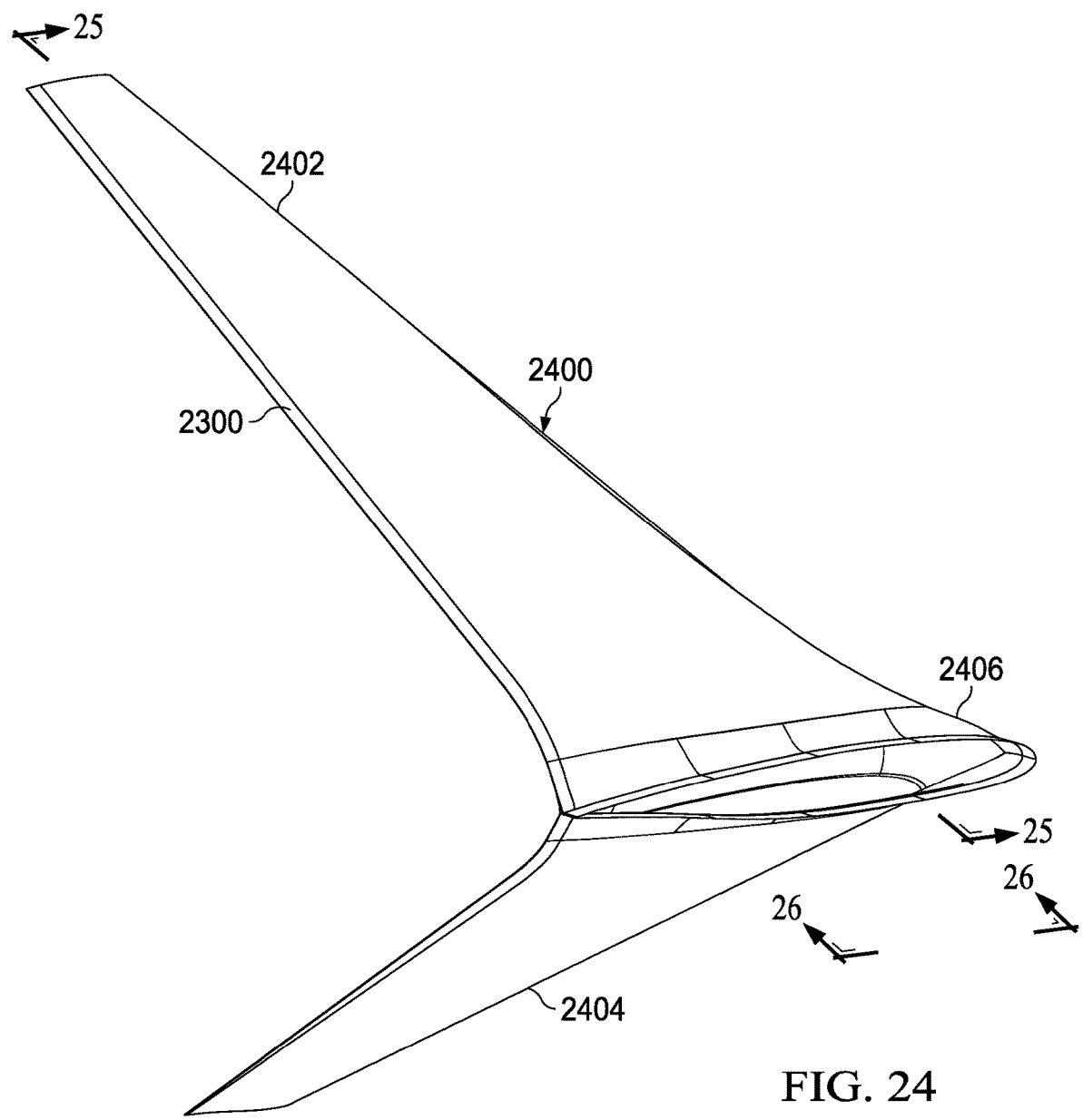
FIG. 24 is an illustration of a composite winglet with a lightning strip in accordance with an illustrative embodiment.

Turning now to FIG. 24, an illustration of a composite winglet with a lightning strip is depicted in accordance with an illustrative embodiment. In this depicted example, composite winglet 2400 with lightning strip 2300 is formed using the process described with reference to FIGS. 17-23.

As illustrated, composite winglet 2400 includes upper blade 2402, lower blade 2404, and root region 2406. Number of spacers 1900 in FIG. 19 and spacer 1804 in FIG. 18, are still present within composite winglet 2400 at this time.

Figure 25:
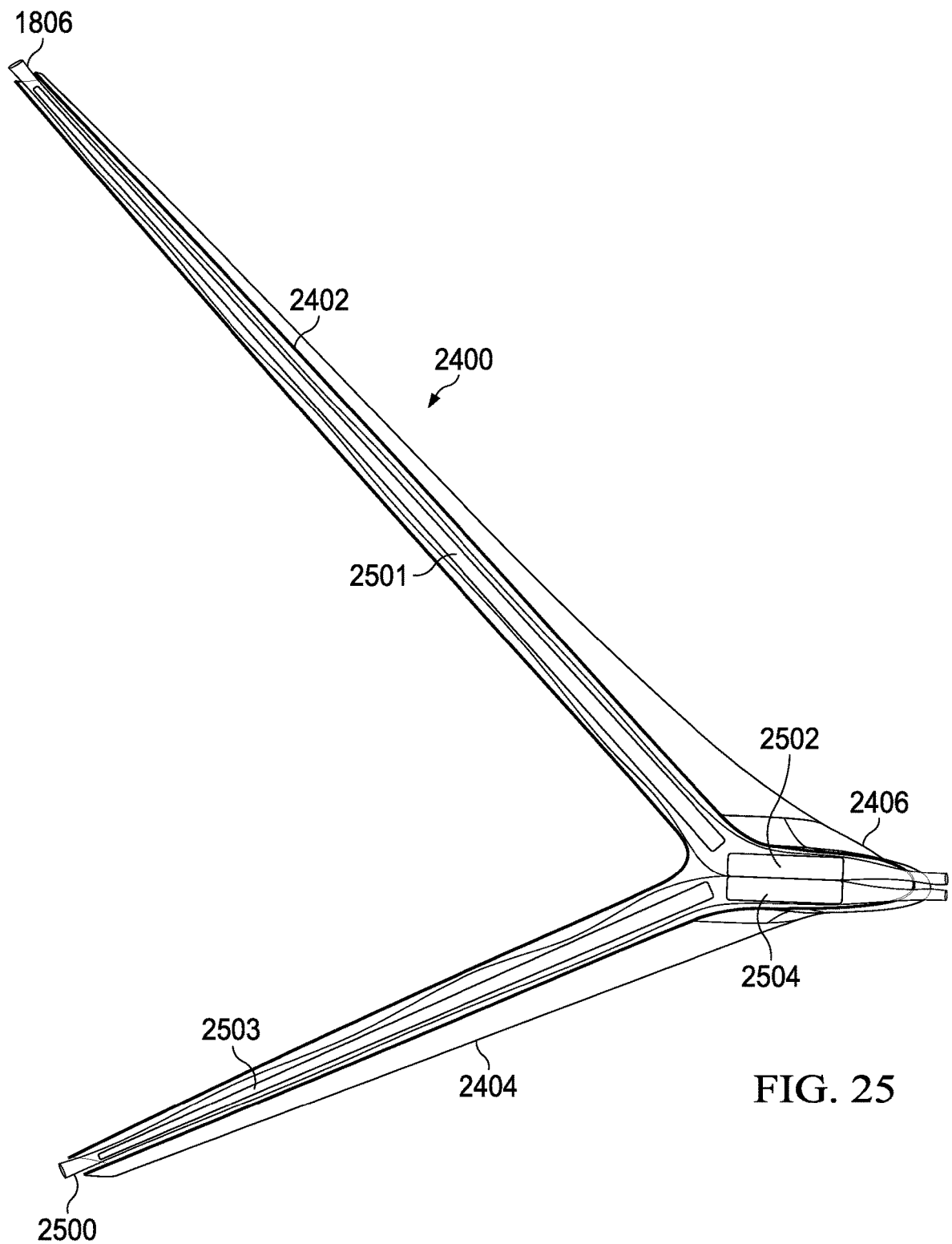
FIG. 25 is an illustration of a cross-sectional view of a composite winglet in accordance with an illustrative embodiment.

Referring to FIG. 25, a cross-sectional view of a composite winglet is depicted in accordance with an illustrative embodiment. In this depicted example, a cross-sectional view of composite winglet 2400 taken along lines 25-25 in FIG. 24 is shown.

As depicted, bag 1806 is seen around spacer 2501 inside upper blade 2402 of composite winglet 2400, while bag 2500 is shown around spacer 2503 inside lower blade 2404 of composite winglet 2400. Spacer 2502 and spacer 2504 form a channel in root region 2406 of composite winglet 2400. Spacer 2501 may be an example of an embodiment of spacer 1804 not shown in FIG. 18.

In some illustrative examples, a number of additional spacers may be positioned within composite winglet 2400 to provide additional support or pressure during curing. For instance, caul plates may be positioned against the side surfaces of layup 1800 in FIGS. 18-22 to form straighter spars for composite winglet 2400.

In other examples, caul plates may be used to form straighter spars within root region 2406 of composite winglet 2400. These additional spacers may be removed with the bags after curing composite winglet 2400.

Figure 26:
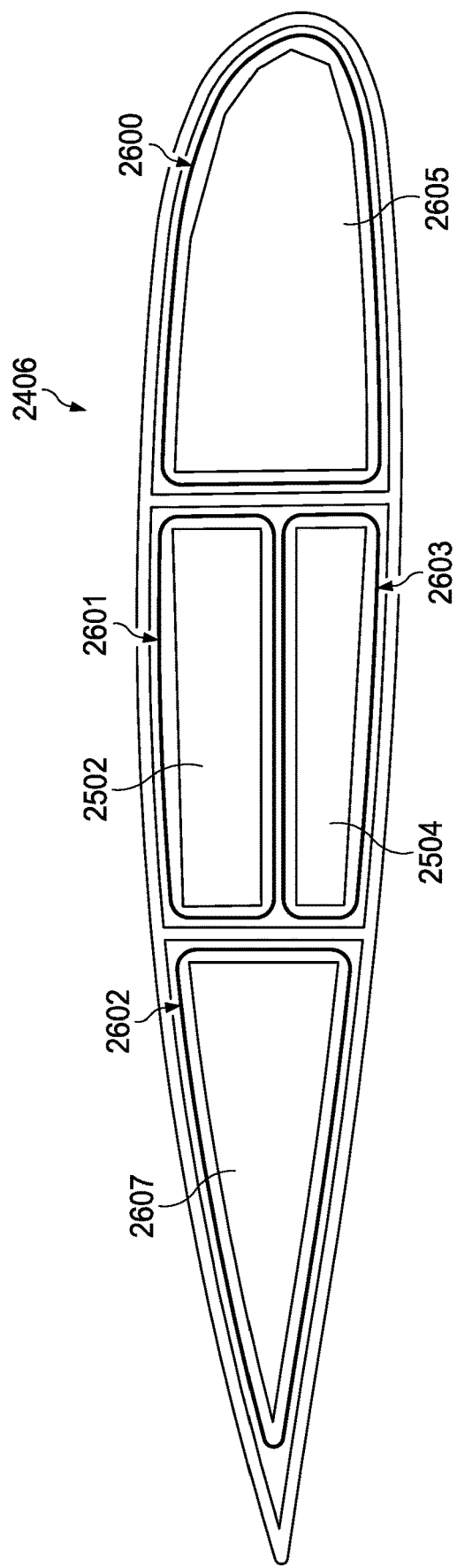
FIG. 26 is an illustration of a cross-sectional view of a root region of a composite winglet, during manufacture in accordance with an illustrative embodiment.

In FIG. 26, an illustration of a cross section of a root region of a composite winglet during manufacture is depicted in accordance with an illustrative embodiment. In this illustrative example, a more-detailed view of root region 2406 of composite winglet 2400 is seen in the direction of view lines 26-26 in FIG. 24.

As illustrated, bag 2601, bag 2603, bag 2600 and bag 2602 form channels in root region 2406 of composite winglet 2400. In particular, bag 2600 forms the leading edge of root region 2406, while bag 2602 forms the trailing edge of root region 2406. Bag 2601 is shown around spacer 2502. Bag 2603 is shown around spacer 2504. Bag 2600 is shown around bag carrier 2605. Bag 2602 is shown around bag carrier 2607.

After curing composite winglet 2400, all bags and other spacers may be removed from the gaps in composite winglet 2400. Then composite winglet 2400 may be trimmed. In other illustrative examples, composite winglet 2400 may be trimmed prior to removing the bags and other spacers.

Figure 27:
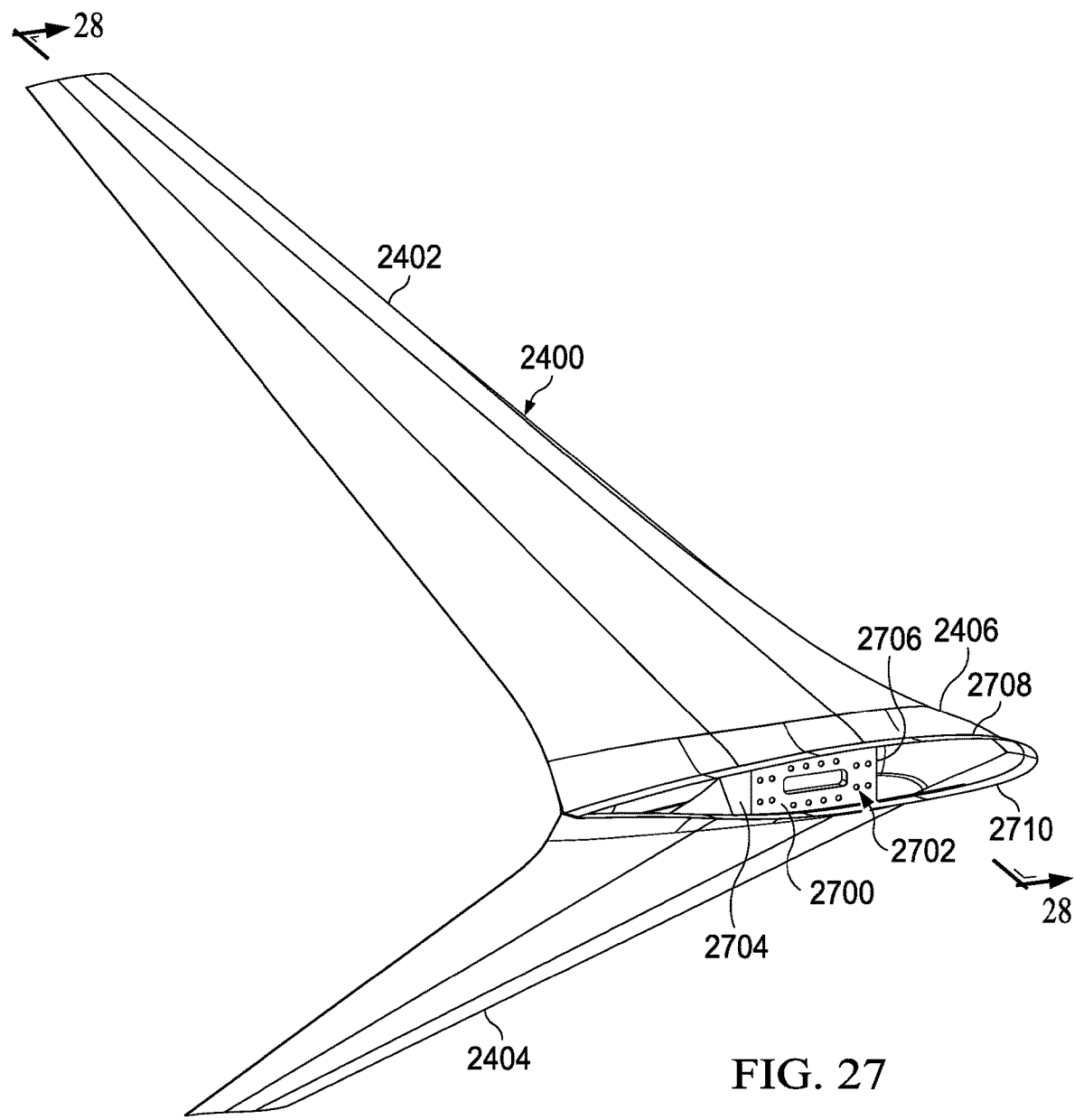
FIG. 27 is an illustration of a composite winglet with an attachment system installed within the composite winglet in accordance with an illustrative embodiment.

Turning now to FIG. 27, an illustration of a composite winglet with an attachment system installed within the composite winglet is depicted in accordance with an illustrative embodiment. In this illustrative example, attachment system 2700 has been installed within root region 2406 of composite winglet 2400.

As illustrated, number of fasteners 2702 is used to secure attachment system 2700 to root region 2406 of composite winglet 2400. In particular, number of fasteners 2702 may secure attachment system 2700 to at least one of support 2704, support 2706, upper surface 2708, or lower surface 2710 of root region 2406 of composite winglet 2400.

Figure 28:
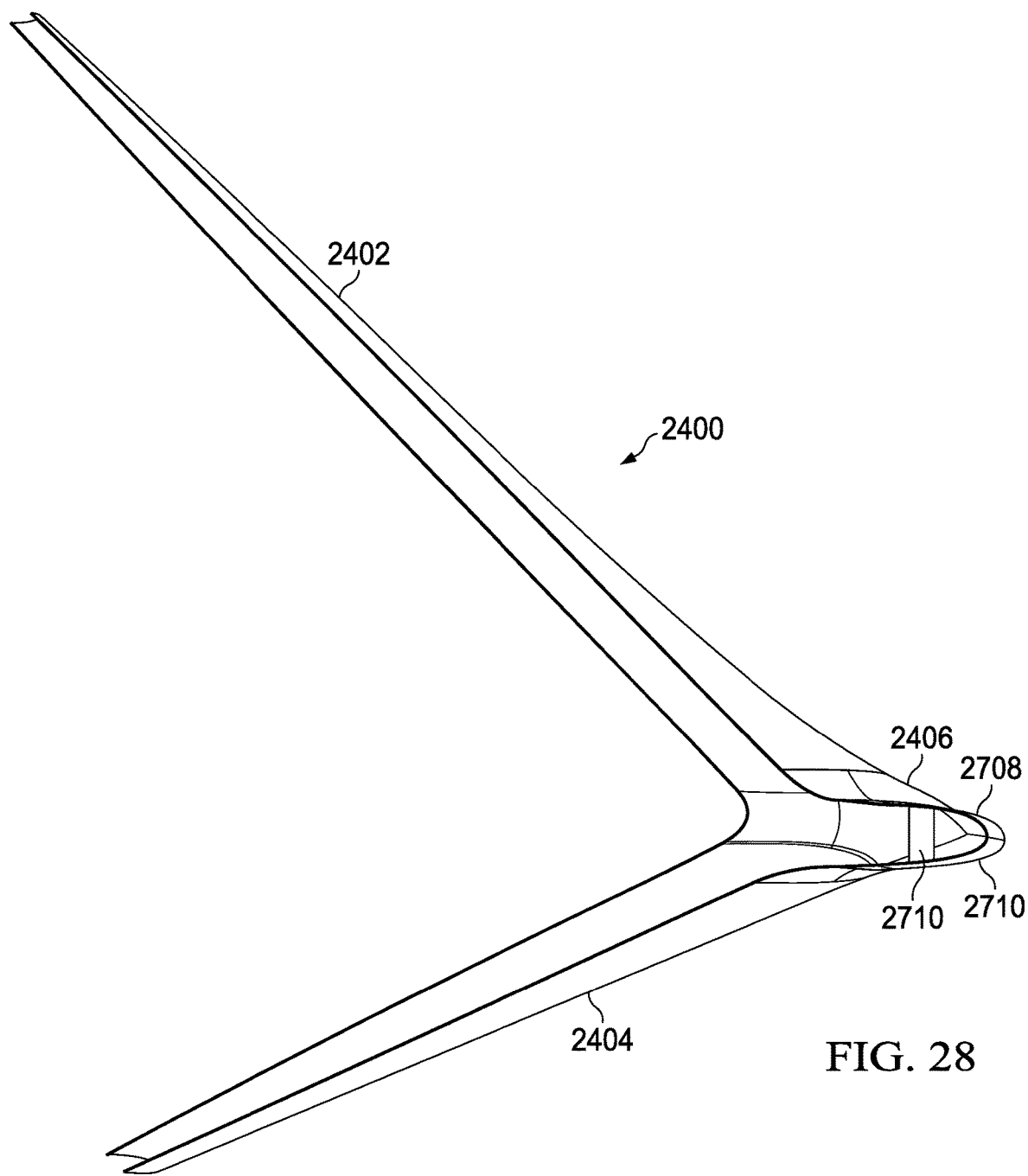
FIG. 28 is an illustration of a cross-sectional view of a composite winglet with an attachment system installed within the composite winglet in accordance with an illustrative embodiment.

Referring now to FIG. 28, an illustration of a cross-sectional view of a composite winglet with an attachment system installed within the composite winglet is depicted in accordance with an illustrative embodiment. In the depicted example, a cross-sectional view of composite winglet 2400 with attachment system 2700 taken along the view lines 28-28 in FIG. 27 is shown.

As depicted, attachment system 2700 does not extend within upper blade 2402 or lower blade 2404 of composite winglet 2400. In this manner, upper blade 2402 and lower blade 2404 may be thinner than blades in some currently used winglets that need an attachment system that extends within the upper and lower blades of the winglet.

The different components shown in FIGS. 6-28 may be illustrative examples of how components shown in block form in FIGS. 2-5 can be implemented as physical structures. Additionally, some of the components in FIGS. 6-28 may be combined with components in FIGS. 2-5, used with components in FIGS. 2-5, or a combination of the two.

Figure 29:
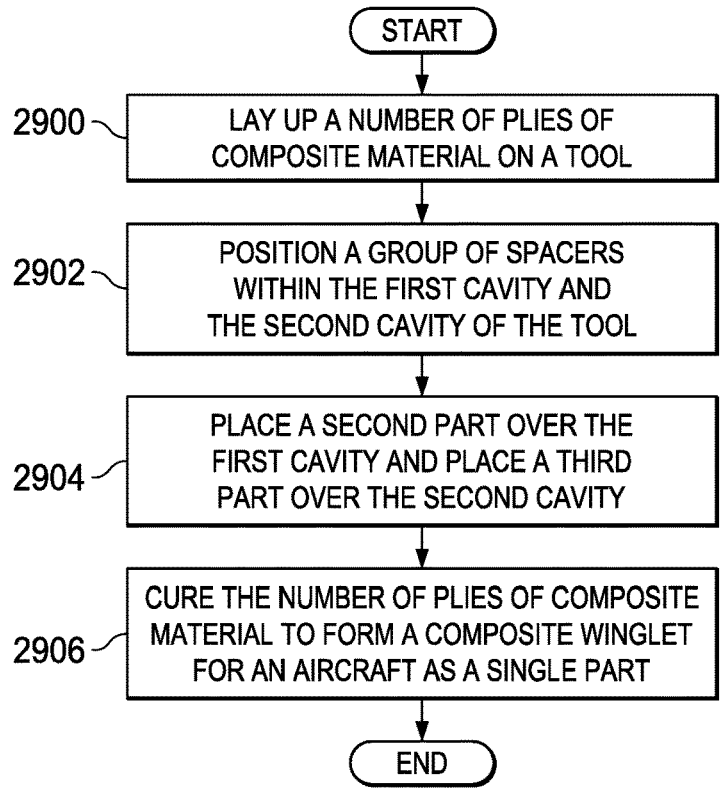
FIG. 29 is an illustration of a flowchart of a process for forming a composite winglet in accordance with an illustrative embodiment.

With reference now to FIG. 29, an illustration of a flowchart of a process for forming a composite winglet is depicted in accordance with an illustrative embodiment. The process illustrated in FIG. 29 may be implemented in aircraft manufacturing environment 200 in FIG. 2. One or more of the different operations may be implemented using one or more components in aircraft manufacturing environment 200 for aircraft 202 in FIG. 2.

The process begins by laying up a number of plies of composite material on a tool (operation 2900). In this illustrative example, the tool comprises a first part including and upper portion with a first cavity and a lower portion with a second cavity. The lower portion is positioned at an angle to the upper portion and connected to the upper portion at a transition region. The tool further comprises a second part configured to be placed over the first cavity of the upper portion and a third part configured to be placed over the second cavity of the lower portion.

Next, a group of spacers is positioned within the first cavity and the second cavity of the tool (operation 2902). The group of spacers is configured to form a number of chambers within the composite winglet.

Thereafter, a second part is placed over the first cavity and a third part is placed over the second cavity (operation 2904). Placing the second part over the first cavity and the third part over the second cavity seals the tool.

The number of plies of composite material is then cured to form a composite winglet for an aircraft as a single part (operation 2906), with the process terminating thereafter. During the curing process, a vacuum may be applied to the number of plies of composite material and the tool. The number of plies of composite material also may be heated to a desired temperature.

In some illustrative examples, curing may occur in a different manner. For instance, the number of plies of composite material may not be pre-impregnated with resin. In this case, resin may need to be infused into the number of plies of composite material prior to or during curing. In other illustrative examples, the composite winglet may be formed using techniques such as a room temperature cure, resin transfer molding (RTM), or other suitable curing techniques.

In some illustrative examples, a number of radius fillers may be placed at a co-cured joint between at least one of the outboard skin or the inboard skin of the composite winglet or the spar. In other illustrative examples, a lightning strip may be positioned within the tool prior to curing the number of plies of composite material such that the number of plies of composite material and the lightning strip are co-cured.

Figure 30:
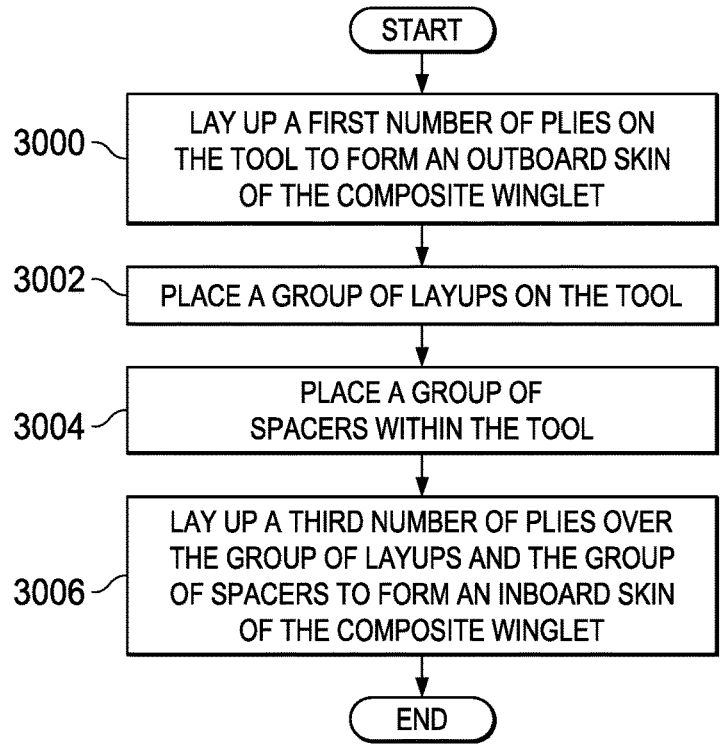
FIG. 30 is an illustration of a flowchart of a process for laying up a number of plies of composite material in accordance with an illustrative embodiment.

Turning next to FIG. 30, an illustration of a flowchart of a process for laying up a number of plies of composite material is depicted in accordance with an illustrative embodiment. The process described with reference to FIG. 30 may be implemented in operation 2900 in FIG. 29.

The process begins by laying up a first number of plies on the tool to form an outboard skin of the composite winglet (operation 3000). Next, a group of layups is placed on the tool (operation 3002). In this illustrative example, the group of layups includes a spacer covered with a second number of plies to form a spar.

Thereafter, a group of spacers is placed within the tool (operation 3004). The process then lays up a third number of plies over the group of layups and the group of spacers to form an inboard skin of the composite winglet (operation 3006), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 31:
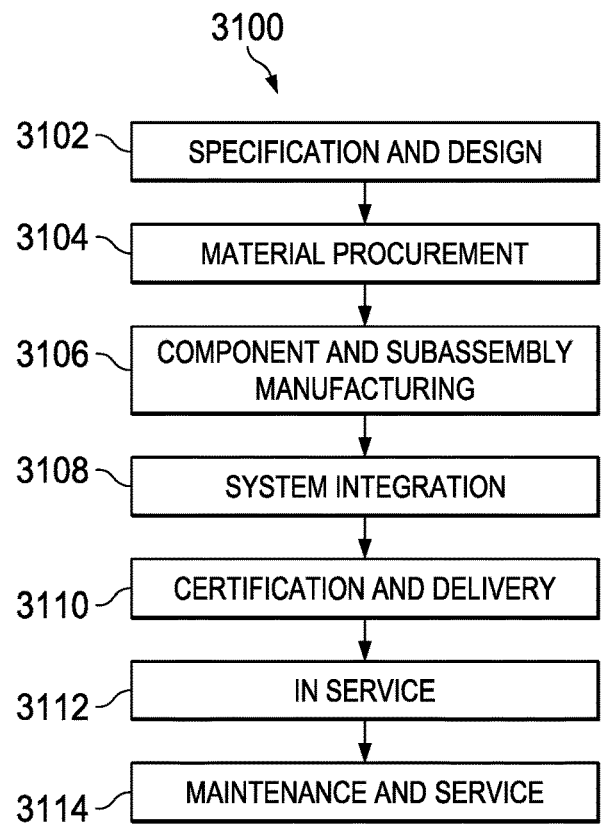
FIG. 31 is an illustration of a block diagram of an aircraft manufacturing and service method in accordance with an illustrative embodiment.
Figure 32:
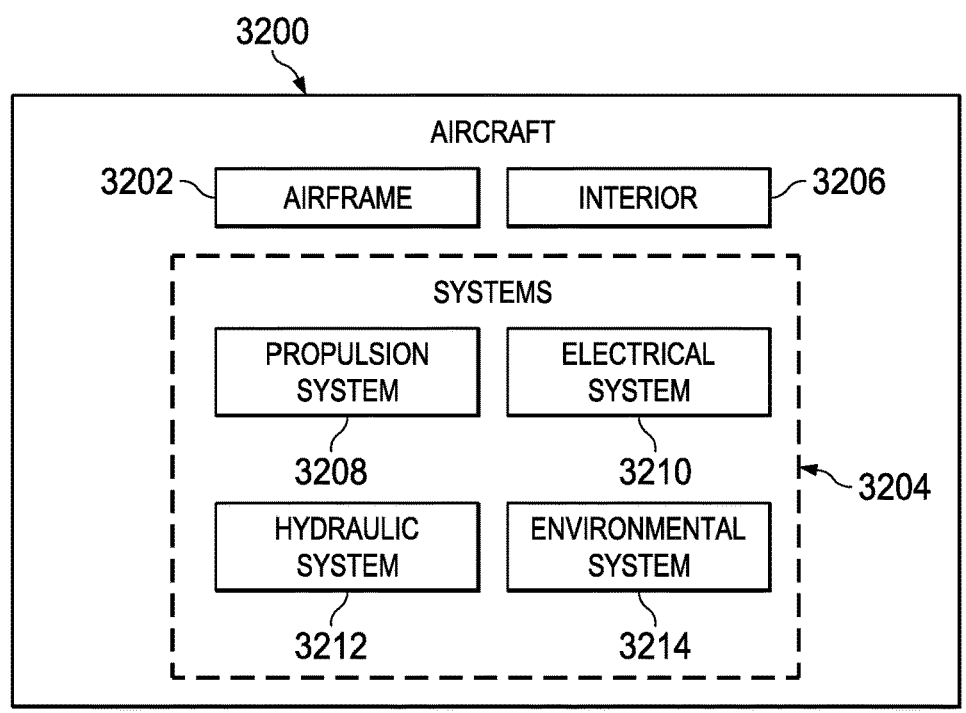
FIG. 32 is an illustration of a block diagram of an aircraft in accordance with an illustrative embodiment.

Illustrative embodiments of the present disclosure may be described in the context of aircraft manufacturing and service method 3100 as shown in FIG. 31 and aircraft 3200 as shown in FIG. 32. Turning first to FIG. 31, an illustration of a block diagram of an aircraft manufacturing and service method is depicted in accordance with an illustrative embodiment. During pre-production, aircraft manufacturing and service method 3100 may include specification and design 3102 of aircraft 3200 in FIG. 32 and material procurement 3104.

During production, component and subassembly manufacturing 3106 and system integration 3108 of aircraft 3200 in FIG. 32 takes place. Thereafter, aircraft 3200 in FIG. 32 may go through certification and delivery 3110 in order to be placed in service 3112. While in service 3112 by a customer, aircraft 3200 in FIG. 32 is scheduled for routine maintenance and service 3114, which may include modification, reconfiguration, refurbishment, and other maintenance or service.

Each of the processes of aircraft manufacturing and service method 3100 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, or suppliers; and an operator may be an airline, a leasing company, a military entity, a service organization, and so on.

With reference now to FIG. 32, an illustration of a block diagram of an aircraft is depicted in which an illustrative embodiment may be implemented. In this example, aircraft 3200 is produced by aircraft manufacturing and service method 3100 in FIG. 31 and may include airframe 3202 with plurality of systems 3204 and interior 3206. Examples of systems 3204 include one or more of propulsion system 3208, electrical system 3210, hydraulic system 3212, and environmental system 3214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3100 in FIG. 31. In one illustrative example, components or subassemblies produced in component and subassembly manufacturing 3106 in FIG. 31 may be fabricated or manufactured in a manner similar to components or subassemblies produced while aircraft 3200 is in service 3112 in FIG. 31. As yet another example, one or more apparatus embodiments, method embodiments, or a combination thereof may be utilized during production stages, such as component and subassembly manufacturing 3106 and system integration 3108 in FIG. 31. One or more apparatus embodiments, method embodiments, or a combination thereof may be utilized while aircraft 3200 is in service 3112 and/or during maintenance and service 3114 in FIG. 31. The use of a number of different illustrative embodiments may substantially expedite the assembly of and/or reduce the cost of aircraft 3200.

In particular, composite winglet 208 from FIG. 2 may be formed and installed during any of the stages of aircraft manufacturing and service method 3100. For example, without limitation, composite winglet 208 may be formed during subassembly manufacturing 3106. In other illustrative examples, composite winglet 208 may be installed during system integration 3108, routine maintenance and service 3114, or some other stage of aircraft manufacturing and service method 3100.

Thus, the illustrative embodiments provide a method, apparatus, and tool for forming a composite winglet for an aircraft. Composite winglet 208 comprises first blade 300, second blade 302, and root region 304. First blade 300 includes first leading edge 308 and first trailing edge 310. Second blade 302 includes second leading edge 314 and second trailing edge 316. Second blade 302 is positioned at an angle to first blade 300. Root region 304 is co-cured with first blade 300 and second blade 302 to form composite winglet 208. Root region 304 is configured to receive attachment system 214 for attaching composite winglet 208 to wing 212 of aircraft 202.

With the use of an illustrative embodiment, a composite winglet may be formed more quickly than using currently available systems. For instance, instead of manufacturing many parts and assembling them together, a composite winglet may be formed using a single tool to create a single composite piece. Forming the composite winglet in one piece decreases the time and cost of manufacturing and assembling winglets for aircraft. Additionally, forming the winglet with composite materials decreases the weight of the winglet for aircraft.

Further, with the use of an illustrative embodiment, a desired level of structural integrity may be achieved. For example, because fewer fasteners are used to attach the root region of the composite winglet to the wing of an aircraft, the composite material of the blades of the composite winglet maintain their strength. Moreover, the smooth surface of the blades results in increased aerodynamic performance as compared to some currently used systems.

In addition, composite winglets formed with the use of an illustrative embodiment may accommodate thinner blades than some currently manufactured winglets. For instance, because the attachment system for the composite winglet only extends within the root region of the composite winglet, as opposed to the blades, the blades of the winglet may be made thinner and more aerodynamic than before. As a result, fuel efficiency for the aircraft may be increased.

The illustrative embodiments also provide a novel implementation for forming composite structures and extracting spacers from these composite structures. For instance, materials selected for spacers used to form chambers within the composite structure are selected to be flexible and to be extracted from the composite structure without causing undesired inconsistencies in the composite structure. For instance, foam may be used for bag carriers within the composite winglet. These foam bag carriers may be easily extracted from the composite winglet without resulting in undesired inconsistencies that increase the manufacturing or maintenance time of the aircraft.

With the use of an illustrative embodiment, a complex geometry for a composite winglet may be formed. In particular, two blades joint at a root region having a smooth skin provides a desired level of aerodynamic performance, decreased weight, and ease of assembly on a wing of the aircraft.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Thus, above described embodiments depict at least a composite winglet for an aircraft that includes a first blade including a first leading edge and a first trailing edge; a second blade including a second leading edge and a second trailing edge, wherein the second blade is positioned at an angle to the first blade. The composite winglet also includes a root region co-cured with the first blade and the second blade to form the composite winglet, wherein the root region is configured to receive an attachment system for attaching the composite winglet to a wing of the aircraft. The composite winglet includes the first blade as an upper blade of the composite winglet and the second blade as a lower blade of the composite winglet, such that the root region receives the attachment system in a channel of the root region and is secured to the attachment system using at least one of an adhesive, a weld, a bond, or a number of fasteners. The composite winglet of may also include at least one of the first trailing edge or the second trailing edge physically associated with a lightning strip, wherein the lightning strip is co-cured with the composite winglet when the composite winglet is cured. The composite winglet may include at least one of a carbon fiber reinforced polymer, fiberglass, aramid fiber, and nylon.

Embodiments presented above also describe a tool for forming a composite winglet. The tool includes: a first part including an upper portion with a first cavity and a lower portion with a second cavity, wherein the lower portion is arranged at an angle to the upper portion and connected to the upper portion at a transition region; a second part configured to be placed over the first cavity of the upper portion; and a third part configured to be placed over the second cavity of the lower portion, wherein the first part, the second part, and the third part are configured to receive a number of plies of composite material to form a composite winglet for an aircraft.

The tool includes the upper portion of the first part configured to form an upper blade of the composite winglet and the lower portion of the first part configured to form a lower blade of the composite winglet. The tool is formed of a material selected from at least one of a metal, a metal alloy, wood, foam, steel, poly(methyl methacrylate), aluminum, nickel, or an aluminum-nickel alloy.

The tool includes a leading edge and a trailing edge opposite the leading edge, wherein a parting line is positioned along the leading edge of the tool. The tool also includes a gap in the trailing edge of the tool.

Additionally described above is a method for forming the composite winglet for an aircraft. The method includes: laying up a number of plies of composite material on a tool, wherein the tool comprises a first part including an upper portion with a first cavity and a lower portion with a second cavity, wherein the lower portion is positioned at an angle to the upper portion and connected to the upper portion at a transition region; a second part configured to be placed over the first cavity of the upper portion; and a third part configured to be placed over the second cavity of the lower portion; positioning a group of spacers within the first cavity and the second cavity of the tool, wherein the group of spacers are configured to form a number of chambers within the composite winglet; placing the second part over the first cavity and the third part over the second cavity; and curing the number of plies of composite material to form the composite winglet for the aircraft as a single part.

The method for forming the composite winglet for an aircraft also includes curing the number of plies of composite material for the aircraft as the single part. Curing the number of plies as a single part includes: applying a vacuum to the number of plies of composite material and the tool; and heating the number of plies of composite material and the tool to a desired temperature. Placing the second part over the first cavity and placing the third part over the second cavity seals the tool.

The method may also include positioning a lightning strip within the tool prior to curing the number of plies of composite material such that the number of plies of composite material and the lightning strip are co-cured. The group of spacers may be selected from at least one of a caul plate, a bag, a bag carrier, or a mandrel.

Laying up the number of plies of composite material on the tool includes: laying up a first number of plies on the tool to form an outboard skin of the composite winglet; placing a group of layups on the tool, the group of layups including a spacer covered with a second number of plies to form a spar; placing the group of spacers within the tool; and laying up a third number of plies over the group of layups and the group of spacers to form an inboard skin of the composite winglet.

The method for forming the composite winglet for an aircraft may also include: placing a number of radius fillers between at least one of the outboard skin or the inboard skin of the composite winglet and the spar. The method of may include the number of plies of composite material including at least one of: a carbon fiber reinforced polymer, fiberglass, aramid fiber, and nylon. The number of first number of plies and the second number of plies are may each include two plies of carbon fiber reinforced polymer material. The method may also include positioning a lightning strip within the tool prior to curing the number of plies of composite material such that the number of plies of composite material and the lightning strip are co-cured.

Thus, described above are embodiments that provide a technical effect for a novel construction of a bi-furcated composite wingtip that replaces construction of a bifurcated wingtip that requires many parts fastened together and instead forms a one-piece, fastener-less, bifurcated, composite wingtip. An example of a bifurcated wingtip that requires many parts to be assembled together are previous productions of a bifurcated wingtip that include the B737 MAX Advanced Technology aircraft, as discussed at least on the "The Boeing 737 Technical Site" (available at: www.b737.org.uk/index.htm) in June of 2012. Composite composition of the one-piece winglet may not only include fibers and resin, but may exclude metal components.

Unlike the novel process and manufacture of the bifurcated wingtip described herein, previous productions of the bifurcated wingtip on the B737 MAX Advanced Technology aircraft required at least an assembled collection of over 9 major pieces, at least 8 additional pieces, and hundreds of fasteners to connect those pieces. The major pieces in the bifurcated B737 MAX AT winglet produced prior to the novel process and manufacture described herein, include at least: closeout ribs, transition and bifurcation fairings, a root fitting, and fitting splices.

One of ordinary skill in the art understands that all of the above mentioned pieces, their inherent weight, and drag resultant from the additional weight and/or disturbances to laminar flows caused by non-continuous assembled parts and protrusions due at least to fasteners and/or assembling features, are eliminated by the one-piece, continuous surface of the bifurcated wingtip manufactured by the process described herein. Thus the embodiments herein describe a bifurcated winglet that is formed of composite material as a unitary structure, such that at least no fasteners, attached fairing components, and/or splicing components are needed or used for construction of the bifurcated one-piece composite winglet. Hence, such elements are devoid in the process creating the unitary bifurcated winglet resulting therefrom.

In addition to embodiments described above, an embodiment may include a configuration that incorporates an inboard section co-cured to an outboard section to form for a one-piece bifurcated winglet and a root section thereof, with each section co-cured (joined) at both a leading edge and a trailing edge of the root section and of each blade of the bifurcated winglet.

Figure 33:
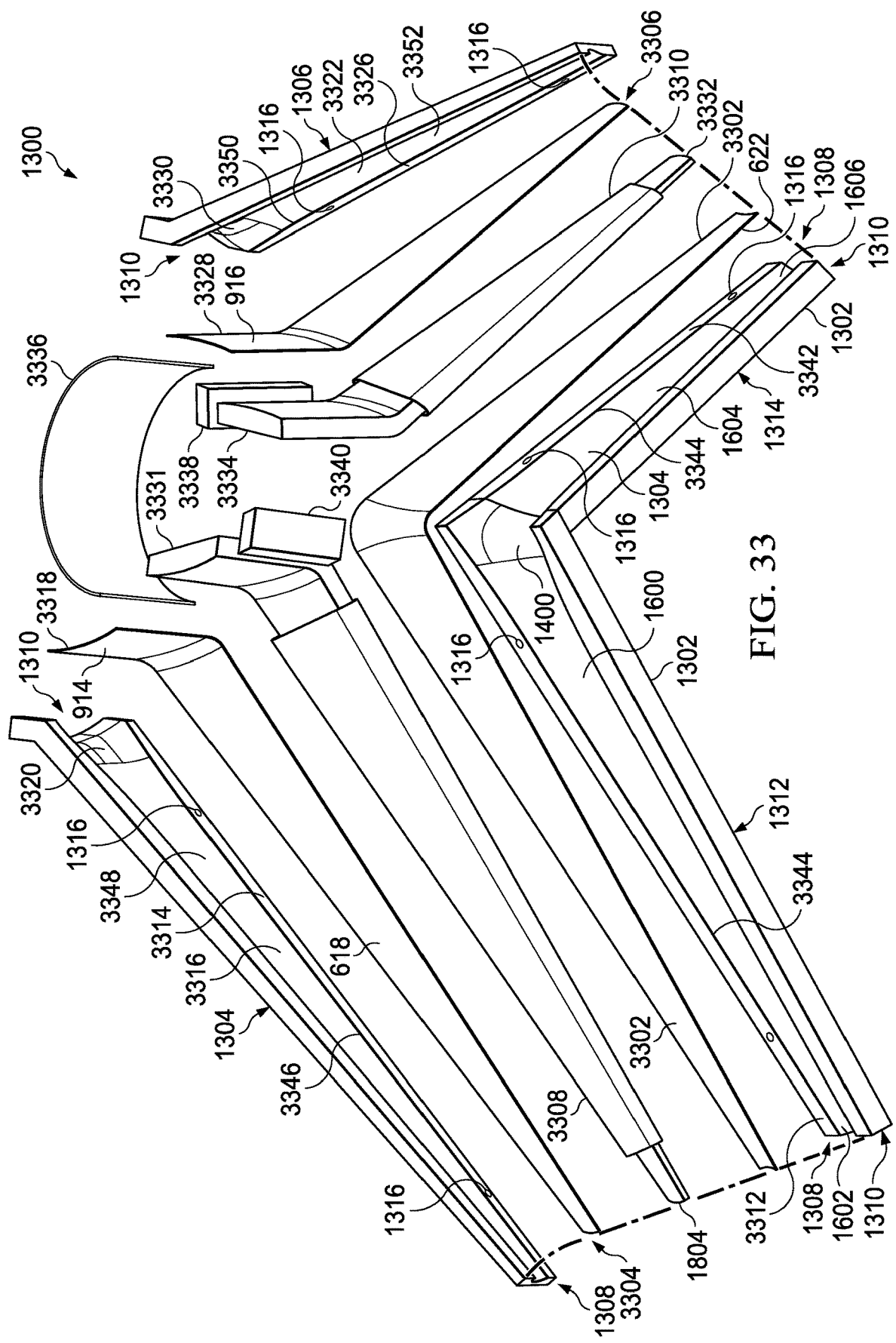
FIG. 33 is an illustration of an exploded view of a layup within a tool that forms a bifurcated composite winglet in accordance with an illustrative embodiment.

Looking now at FIG. 33, FIG. 33 is an illustration of an exploded view of a layup within a tool that forms a composite winglet for a left wing in accordance with an illustrative embodiment. In an embodiment, FIG. 33 shows the layup using tool 1300. The layup includes ply-set 3302.

Ply-set 3302 is laid up on inner surface 1600 of cavity 1602 of upper portion 1312 and on inner surface 1604 of cavity 1602 of lower portion 1314 of tool 1300 to form an outboard structure, and an outboard skin thereof, of both upper blade 602 with outboard skin 616 and lower blade 604 with outboard skin 622 of composite winglet 600, as shown above in FIG. 6. Upper blade 602 outboard skin 616 is shaped in and by cavity 1602 of first part 1302 of tool 1300. Lower blade 604 outboard skin 622 is shaped in and by cavity 1606 of first part 1302 of tool 1300.

Cavity 1602 is designed and formed to provide a desired aerodynamic shape to outboard skin 616 of upper blade 602, and a desired thickness to upper blade 602. Cavity 1606 is designed and formed to provide a desired aerodynamic shape to outboard skin 622 and a desired thickness to lower blade 604.

As will be described in further detail in FIG. 34, ply-set 3302 may contain a set of ply layers of various lengths and compositions, which are all co-cured with ply-set 3304, ply-set 3306, ply-set 3308, and ply-set 3310 to form composite winglet 600 as a unified bifurcated winglet with a single continuous skin that contains opening 620, and opening 626, as well as root region 606, as shown in FIG. 6. Herein, the term co-cured indicates the action of co-curing and also indicates two parts being in a bonded condition, connected and/or fastened together in a co-cured state.

Opening 620, and opening 626 allow for attachment of cap 910 and cap 912 respectively, as shown above in FIG. 9. Root region 606 contains channel 906, as shown in FIG. 9. As described above for FIG. 9, channel 906 is configured to receive attachment system 908 to attach composite winglet 600 to wing 212 of aircraft 202, as shown in FIG. 2.

In contrast to first number of plies 1712 and second number of plies 1714 shown in by FIG. 17, ply-set 3302 does not terminate at transition region 1400 of tool 1300, and the embodiment shown in FIG. 33 does not include first number of plies 1712 and second number of plies 1714. As shown for the embodiment of FIG. 33, ply-set 3302 is continuous from within cavity 1602 and across transition region 1400 of tool 1300 and lays up within cavity 1606 of first part 1302 of tool 1300.

Thus, ply-set 3302 forms an outboard structure for composite winglet 600, that forms a single continuous outboard surface extending from upper blade 602 that continues through outboard portion 324 of root region 606 and that continues through lower blade 604 of bifurcated composite winglet 600. In other words, outboard skin 616 and outboard skin 622 are laid up as a single continuous skin that includes outboard portion 324 of root region 606, all formed from ply-set 3302.

Ply-set 3302 is laid up into cavity 1602 and cavity 1606 and trimmed along leading edge 1308 of first part 1302 of tool 1300, such that ply-set 3302 lies within cavity 1602 and cavity 1606, so as to rise up to edge 3344, where inner surface 1600 of cavity 1602 meets sealing plate 3312 portion of leading edge 1308 of first part 1302 of tool 1300, but not onto sealing plate 3312. It is helpful to notice that in FIG. 16, first part 1302 of tool 1300 is shown with leading edge 1308 closest to the viewer, whereas in contrast, FIG. 33 shows first part 1302 with trailing edge 1310 closest to the viewer.

In contrast, at least one ply in ply-set 3302 may extend out over the trailing edge 1310 of first part 1302 of tool 1300. Hence, at least one ply of ply-set 3302 may extend through gap 424, as shown in FIG. 4, in trailing edge 1310 of first part 1302 of tool 1300.

Ply-set 3304 forms an inboard structure and inboard skin 618 of upper blade 602. As will be described in further detail in FIG. 36, ply-set 3304 may contain a set of ply layers of various lengths and compositions, which are all co-cured with ply-set 3302, ply-set 3306, ply-set 3308, and ply-set 3310 to form composite winglet 600 as a unified bifurcated winglet with a single continuous skin.

Ply-set 3304 is laid up into cavity 3316 within second part 1304 of tool 1300 and trimmed along leading edge 1308 of second part 1304 of tool 1300, such that ply-set 3304 lies within cavity 3316, so as to rise up up to edge 3346, where inner surface 3348 of cavity 3316 meets sealing plate 3314 portion of leading edge 1308 of second part 1304 of tool 1300, but does not overlap onto sealing plate 3314.

In contrast, at least one ply in ply-set 3304 may extend out over the trailing edge 1310 of second part 1304 of tool 1300. Hence, at least one ply of ply-set 3304 may extend through gap 424, as shown above in FIG. 4, in trailing edge 1310 of second part 1304 of tool 1300.

Additionally, a root portion 3318 of ply-set 3304 can be seen to extend through and beyond root region end 3320 of second part 1304, that forms a part of gap 1318 shown in FIG. 13. Root portion 3318 of ply-set 3304 will conform to shape of gap 1318 of second part 1304 such that, when co-cured, root portion 3318 of ply-set 3304 forms upper skin 914, as shown above in FIG. 9, of root region 606 of composite winglet 600, as shown above in FIG. 6. Upper skin 914 serves as the surface and structure of the portion of root region 606 on the upper blade 602 side of root region 606.

Ply-set 3306 is laid up in cavity 3322 to form an inboard structure and inboard skin 624 of lower blade 604. As will be described in further detail in FIG. 36 and FIG. 37, ply-set 3306 may contain a set of ply layers of various lengths and compositions, which are all co-cured with ply-set 3302, ply-set 3304, ply-set 3308, and ply-set 3310 to form composite winglet 600 as a unified bifurcated winglet with a single continuous skin that contains opening 620, and opening 626, as well as root region 606, as shown above in FIG. 6. Opening 620, and opening 626 allow for attachment of cap 910 and cap 912 respectively, as shown in FIG. 9. Root region 606 contains channel 906, as shown in FIG. 9.

Ply-set 3306 is set into cavity 3322 within third part 1306 of tool 1300 and trimmed along edge 3350, where sealing plate 3326 of leading edge 1308 of third part 1306 of tool 1300 meets inner surface 3352 of cavity 3322, such that ply-set 3306 lies within cavity 3322, so as to rise up to but not to overlap edge 3350 above the cavity 3322 inner surface 1600 onto sealing plate 3326.

In contrast, at least one ply in ply-set 3306 may extend out over the trailing edge 1310 of third part 1306 of tool 1300. Hence, at least one ply of ply-set 3306 may extend through gap 424, as shown above in FIG. 4, in trailing edge 1310 of third part 1306 of tool 1300.

Additionally, a root portion 3328 of ply-set 3306 can be seen to extend through and beyond root region end 3330 of third part 1306 that forms a part of gap 1318 shown in FIG. 13. Root portion 3328 of ply-set 3306 will conform to shape of root region end 3330 of third part 1306 such that, when cured, root portion 3328 of ply-set 3306 forms lower skin 916 of root region 606 of composite winglet 600. Lower skin 916 serves as the surface and structure of the portion of root region 606 on the lower blade 604 side of root region 606.

Between ply-set 3302 and ply-set 3304, lies ply-set 3308. Ply-set 3308 is supported by spacer 1804 (an end of which is also shown as spacer 2502 in FIG. 26) and, when co-cured to ply-set 3302 and ply-set 3304, ply-set 3308 forms spar 900 within upper blade 602. In this illustrative example, ply-set 3308 may be an example of one implementation of third number of plies 1802 as shown in FIG. 18.

In an illustrative embodiment as shown in FIG. 33, ply-set 3308 may not cover the entirety of spacer 1804. Portion 3331 of spacer 1804 may be uncovered by ply-set 3308, and may extend up through root region end 3320 of second part 1304, to assist in forming gap 1318 in root region 606 of composite winglet 600. After co-curing, spacer 1804 may be removed from within ply-set 3308. Portion 3331 may be a continuous extension of spacer 1804, or may be a segmented continuation of spacer 1804 as depicted by spacer 2502 with spacer 2501 in FIG. 25.

Similarly, between ply-set 3302 and ply-set 3306, lies ply-set 3310. Ply-set 3310 is supported by portion 3334 of spacer 3332 and, when co-cured to ply-set 3302 and ply-set 3304, ply-set 3310 forms spar 902 within lower blade 604. After co-curing, portion 3334 may be removed from within ply-set 3310. Portion 3334 may be a continuous extension of spacer 3332, or may be a segmented continuation of spacer 3332 as depicted by spacer 2504 with spacer 2503 in FIG. 25.

As shown, ply-set 3310 may not cover the entirety of spacer 3332. Portion 3334 of spacer 3332 may be uncovered by ply-set 3310, and may extend up through root region end 3330 of third part 1306, to assist in forming gap 1318 in root region 606 in composite winglet 600. Portion 3334 abuts portion 3331, when second part 1304 and third part 1306 are fastened to first part 1302.

Before second part 1304 and third part 1306 are fastened onto first part 1302, ply-set 3336 is laid up around both portion 3331 and portion 3334. After only one of second part 1304 and third part 1306 are fastened onto first part 1302, caul plate 3338 may be placed in gap 1318 along a side of ply-set 3336 that faces leading edge 1308, such that a side of ply-set 3336 that faces leading edge 1308 forms, during co-curing, into support 2706 as shown in FIG. 27.

Similarly, after only one of second part 1304 and third part 1306 are fastened onto first part 1302, caul plate 3340 may be placed in gap 1318 along a side of ply-set 3336 that faces trailing edge 1310, such that a side of ply-set 3336 that faces trailing edge 1310 forms, during co-curing, into support 2704 as shown in FIG. 27. Caul plate 3338 and caul plate 3340 may each be shaped as desired to form ply-set 3336 into support 2704 and support 2706 that each comprise shapes desired for attachment of composite winglet 600 to attachment system 908. As previously described, attachment system 908 is used to attach composite winglet 600 to wing 212.

Sealing plate 3312 of leading edge 1308 of first part 1302 is the portion of leading edge 1308 of first part 1302 that meets and conforms to sealing plate 3314 portion of leading edge 1308 of second part 1304. When sealing plate 3312 and sealing plate 3314 are fastened together via fastener system (422 as shown in FIG. 4, but not shown in FIG. 33) through openings 1316, cavity 1606 is sealed all along leading edge 1308 such that, during co-curing, ply-set 3302 co-cures to ply-set 3304 without seeping between sealing plate 3312 and 3314, such that a continuous seamless and unitary leading edge 1308 is formed for upper blade 602 for composite winglet 600.

Similarly, sealing plate 3342 of leading edge 1308 of first part 1302 is the portion of leading edge 1308 of first part 1302 that meets and conforms to sealing plate 3326 portion of leading edge 1308 of third part 1306. When sealing plate 3342 and sealing plate 3326 are fastened together, via fastener system (422 as shown in FIG. 4, but not shown in FIG. 33) through openings 1316, cavity 1606 is sealed all along leading edge 1308 such that, during co-curing, ply-set 3302 co-cures to ply-set 3306 without seeping between sealing plate 3342 and 3326, such that a continuous seamless and unitary leading edge is formed for lower blade 604 of composite winglet 600.

When both second part 1304 and third part 1306 are fastened onto first part 1302, ply-set 3304 and ply-set 3306 are pushed against ply-set 3336, and produce the technical effect whereby root region 606 forms with support 2704 and support 2706 (as shown in FIG. 27) formed from ply-set 3336 and integrally co-cured to upper skin 914 (formed from ply-set 3304) of root region 606 and to lower skin 916 (formed from ply-set 3306) of root region 606 as integral portions of composite winglet 600 configured as a one-piece manufacture.

Figure 34:
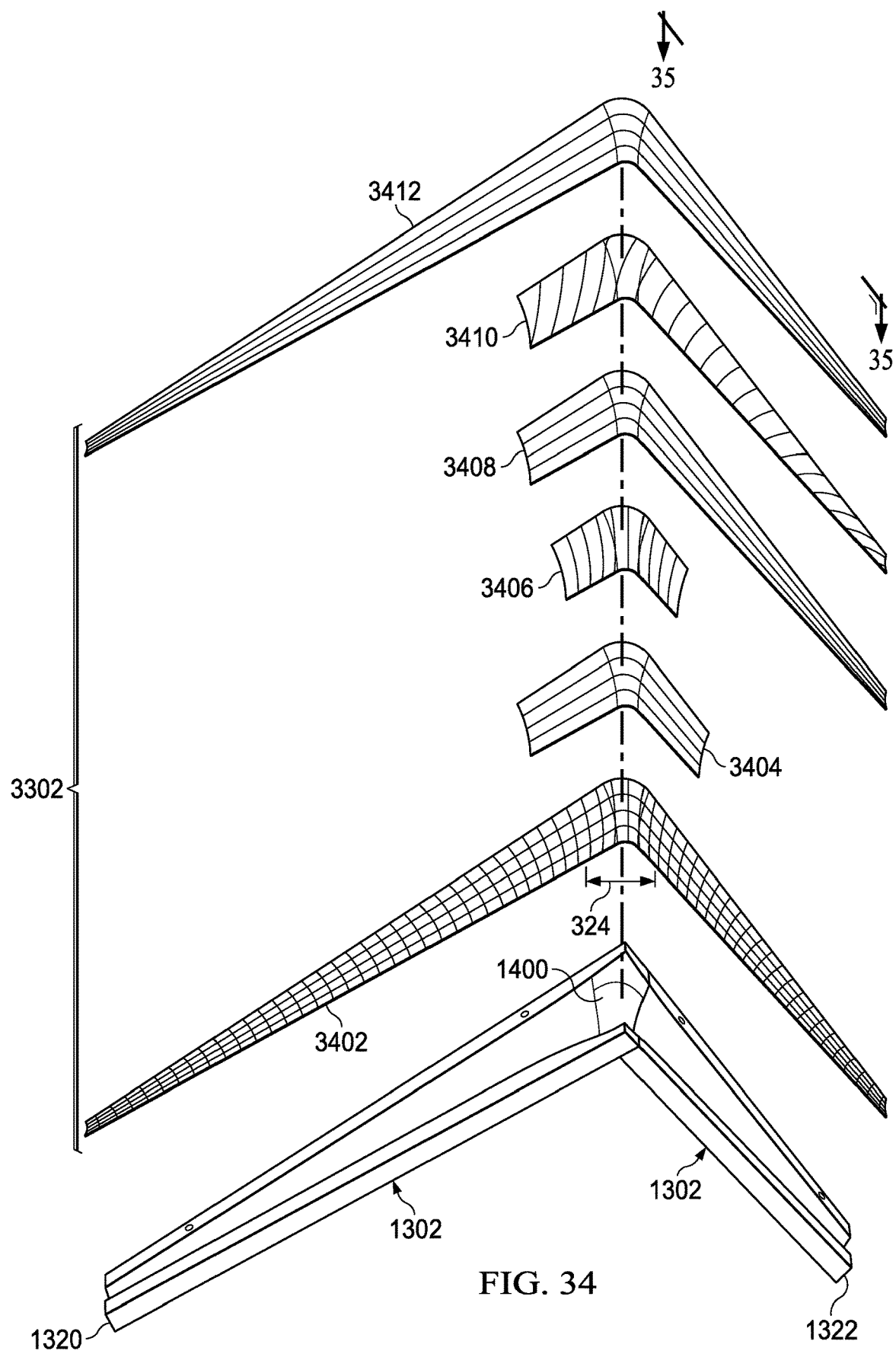
FIG. 34 is an illustration of an exploded view of a layup of a ply-set for an outboard skin of a bifurcated composite winglet in accordance with an illustrative embodiment.

Looking now at FIG. 34, FIG. 34 is an illustration of an exploded view of a layup of a ply-set for an outboard skin of a composite winglet in accordance with an illustrative embodiment. The embodiment of FIG. 34 recognizes and takes into account, without limitation, that a load on a particular aero surface may be roughly proportional to an area of aero surface outboard, toward a tip, from the particular aero surface. So as you move down a blade on a winglet towards a root of the winglet, the loading on each portion of the blade closer to the root may increase. Thus, as a general rule, less structural reinforcement or support may be required closer to the tip than the root of a wing or winglet.

Therefore forming a winglet using plies sufficient to carry loads at a root that are continuous all the way through the tip of the winglet would make the winglet heavier and more expensive than it needs to be. Consequently, a desired level of aerodynamic performance, cost savings, or manufacturing efficiency may not be realized. Accordingly, the embodiment teaches cutting plies into smaller shapes and only co-curing them at locations where they will be needed to handle anticipated applied loads.

The embodiment of FIG. 34 recognizes and takes into account that upper blade 602 and lower blade 604 may experience, without limitation, different loads, strains, and/or stresses from each other. The embodiment of FIG. 34 recognizes and takes into account that some portions of any one blade may experience, without limitation, different loads, strains, and/or stresses that differ from loads, strains, and/or stresses upon other portions of the same one blade.

Reference to loads may include, without limitation, a load due to gravity, an aerodynamic load, a bending load, and a load due to airflow onto a blade from adjacent wing 212. Without limitation, the aerodynamic load may result from airflow across the blade from the leading edge to the trailing edge. Without limitation, a bending load may be due to aircraft movement about, a pitch, or a yaw access, and/or any combination thereof. Without limitation, airflows and loads across and onto bifurcated composite winglet 600 may be due to pressure differentials between a top surface of wing 212 and bottom surface of wing 212.

Accordingly, ply-set 3302 may contain one or more plies. Each ply within ply-set 3302 may be reinforced with a fiber, a weave, or other components tailored to optimize the response and/or a performance of each portion of unitary bifurcated composite winglet 600 for specific stress, strain, and/or loads anticipated for, and/or experienced by varying portions of composite winglet 600.

As a non-limiting example, the embodiments described herein take into account and recognize that while portions of upper blade 602 may be in compression during flight, portions of lower blade 604 may be in tension during flight. Likewise, without limitation upper skin 914 on root region 606 may be in compression while lower skin 916 on root region 606 may be in tension.

Accordingly, within any particular ply-set, without limitation, a number of plies in the particular ply-set may vary along various portions of the particular ply-set. Each ply within each ply-set may have a length or a width that varies from another ply within the ply-set.

Further, without limitation, a material in a first ply within the particular ply-set may vary from a second material in a second ply within the particular ply-set. Additionally, without limitation, an orientation of a fiber and/or weave of fibers within a first ply within the particular ply-set may vary from a second material in a second ply within the particular ply-set. An individual ply within a particular ply-set may have an area or a thickness that varies from other plies within the ply-set, or from the area of the particular ply-set as a whole.

Hence, in FIG. 34, ply-set 3302 is shown above first part 1302 of tool 1300 with an exploded view of ply layers within ply-set 3302 before layup and co-curing. As mentioned above, in an illustrative embodiment, ply-set 3302 may include only one ply layer such as without limitation, outer ply 3402 or outer ply 3412. However, the embodiment of FIG. 34 includes additional plies in ply-set 3302. Outboard portion 324 of root region 606 may be reinforced with underlying ply 3404, ply 3406, ply 3408, and/or ply 3410. Any of ply 3404, ply 3406, ply 3408, and/or ply 3410 may be omitted, and/or additional ply layers may be added between ply 3402 and ply 3412 in forming ply-set 3302.

Likewise, where lower blade 604 may need additional ply layers as compared to upper blade 602, ply 3404, ply 3406, ply 3408, and/or ply 3410 may not extend across the full length of first part 1302 of tool 1300. Without limitation, portions of lower blade 604 may require more plies than upper blade 602. As shown at least by ply 3404 and ply 3406, some plies within ply-set 3302 may not extend fully to tip 1322 of lower portion 1314 of first part 1302 of tool 1300. Further, each ply within ply-set 3302 may have a fiber reinforcement that is tailored for the each ply based upon different loads, strains, and/or stresses (which may differ from loads, strains, and/or stresses upon other plies within ply-set 3302) in order to provide at least a desired, without limitation: reliability, durability, flexibility, stiffness, aerodynamic, load, stress, and/or strain, performance from each ply and for ply-set 3302 and thus, for each portion of an outboard structure and surface of composite winglet 600.

Different fiber reinforcements may include different fiber materials, lengths, thicknesses, and/or orientations in one ply as compared to another ply, as shown by example, without limitation, between ply 3404 and 3406, and/or between ply 3408, ply 3410, and ply 3412. Weaved reinforcement, without limitation, as fibers, may also be incorporated into one or more plies, as shown by example without limitation, in ply 3402.

Figure 35:
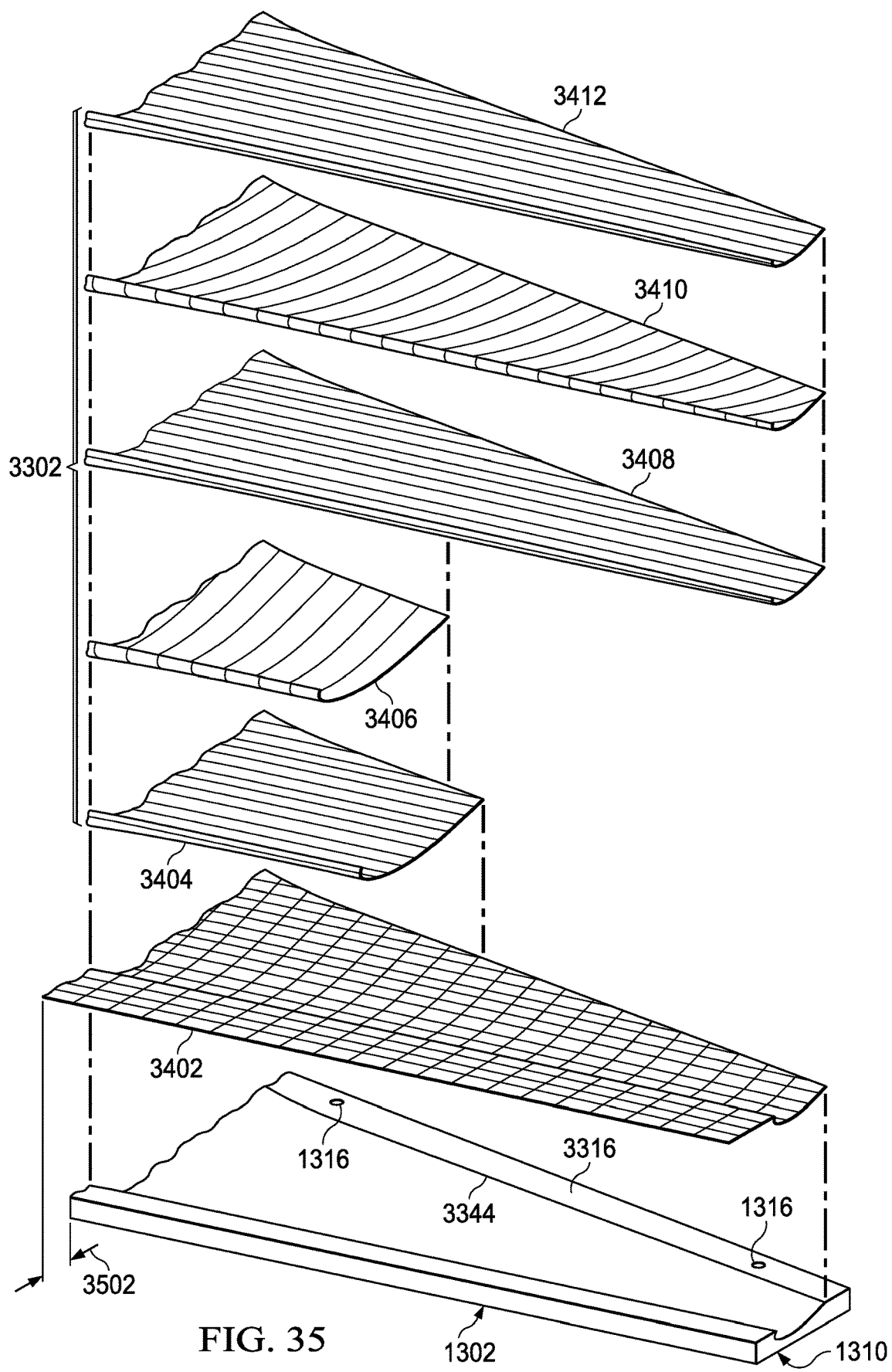
FIG. 35 is an illustration of an exploded view of a layup of a ply-set for an outboard skin of a bifurcated composite winglet in accordance with an illustrative embodiment.

Looking now at FIG. 35, FIG. 35 is an illustration of an exploded view of a layup of a ply-set for an outboard skin of a composite winglet in accordance with an illustrative embodiment. Specifically, FIG. 35 shows a perspective view of a cutaway, of the right side only from FIG. 34, of ply-set 3302 over first part 1302 of tool 1300. The cutaway view of FIG. 35 is not intended to show that individual plies within a ply-set or that only a portion of first part 1302 would be used for curing some portions of ply-set 3302 separate from all plies of ply-set 3302 using all of first part 1302. Rather, FIG. 35 intends to emphasize that widths of individual plies within ply-set 3302 may also be tailored based upon desired characteristics for different portions of composite winglet 600.

FIG. 35 also emphasizes that unlike sealing plate 3342 and sealing plate 3326 that seal against each other when first part 1302 is fastened to third part 1306 and contains ply-set 3302 inside tool 1300, trailing edge 1310 of first part 1302 does not seal with trailing edge 1310 of third part 1306. Hence, FIG. 35 shows ply-set 3302 over first part 1302 of tool 1300 with ply 3402 extending beyond trailing edge 1310 of first part 1302 so that ply 3402 will extend through and out of gap 424 between trailing edge 1310 of first part 1302 and trailing edge 1310 of third part 1306. In another illustrative embodiment, any other plies in ply-set 3302 may be chosen to extend over trailing edge 1310 of first part 1302 in place of ply 3402.

Further, dependent upon requirements for trailing edge 614 of lower blade 604 as shown in FIG. 6, gap 424 may be sized by a shape formed for trailing edge 1310 of first part 1302 and a shape formed for trailing edge 1310 of third part 1306 that allows more than just one ply to extend through gap 424. Hence, although FIG. 35 shows only ply 3402 extending over trailing edge 1310 of first part 1302 by a distance 3502, depending upon requirements specified for lower blade 604, first part 1302, and third part 1306, any number of plies in ply-set 3302 may extend over trailing edge 1310 of first part 1302.

Figure 36:
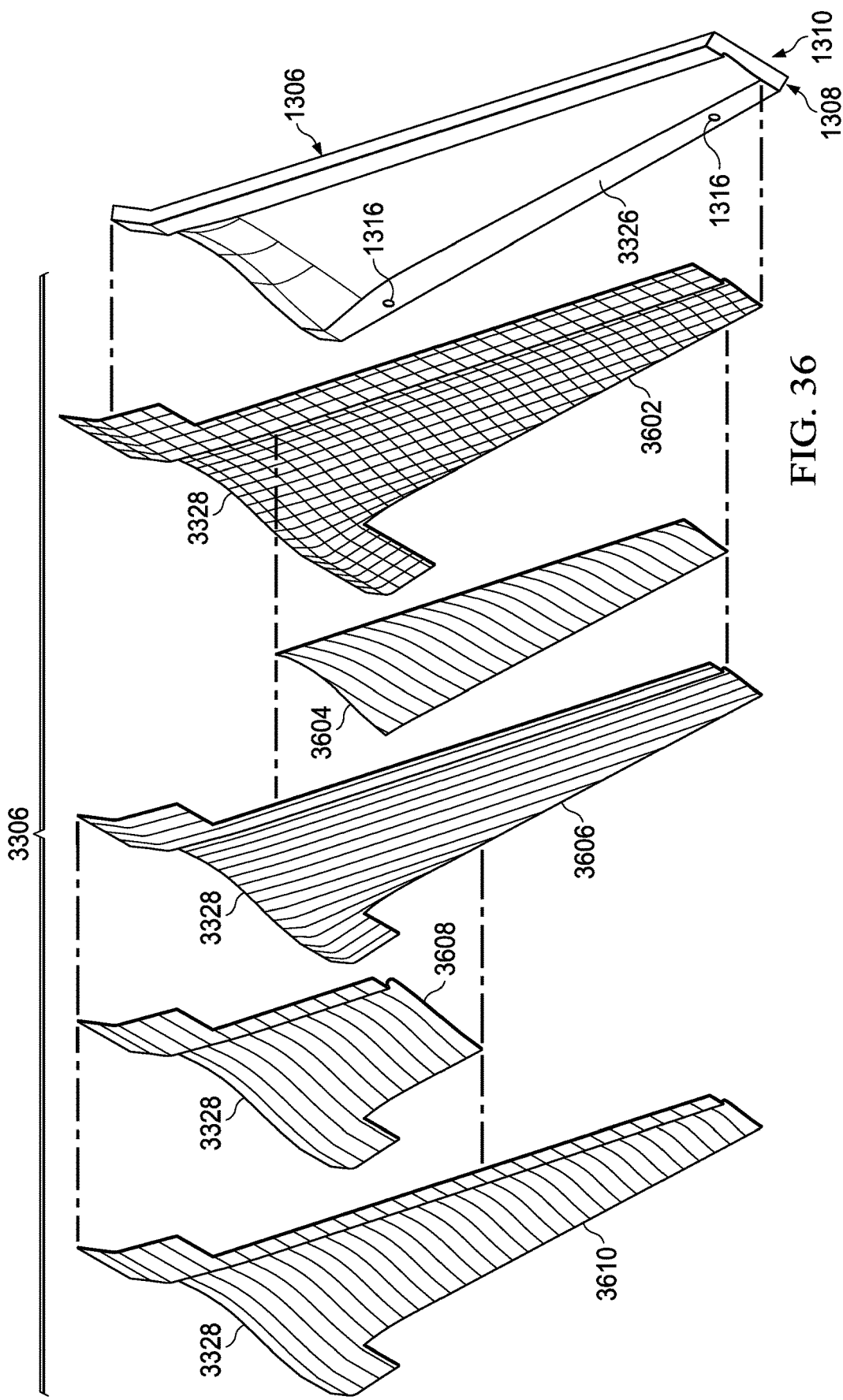
FIG. 36 is an illustration of an exploded view of a layup of a ply-set for an inboard skin of a lower blade, and lower skin of a root region, for a bifurcated composite winglet in accordance with an illustrative embodiment.

With reference now to FIG. 36, FIG. 36 is an illustration of an exploded view of a layup of a ply-set for an inboard skin of a lower blade, and lower skin of a root region, for a bifurcated composite winglet in accordance with an illustrative embodiment. Similar to descriptions for ply-set 3302 in FIG. 35, an embodiment of ply-set 3306 may contain only ply 3602, or may contain multiple layers of plies as shown in FIG. 36.

Similar to descriptions for ply-set 3302 in FIG. 35, each ply in ply-set 3306 may be uniquely tailored in size, material, and orientation in order to provide at least a desired, without limitation: reliability, durability, flexibility, stiffness, aerodynamic, load, stress, and/or strain, performance for each individual ply within and for ply-set 3306 and thus for each portion of an inboard structure, surface of lower blade 604, and root region 606, including lower skin 916, of composite winglet 600. Different fiber reinforcements may include different fiber materials, lengths, thickness, and/or orientation in one ply as compared to another ply, as shown by example without limitation, between ply 3604 and 3606, and/or between ply 3608, and ply 3610. Weaved reinforcement, without limitation, as fibers, may also be incorporated into one or more plies, as shown by example without limitation, in ply 3602.

Unlike ply-set 3302, ply-set 3306 includes root portion 3328 that is shaped by: root region end 3330 of third part 1306, portion 3324 of spacer 3332, caul plate 3338, and caul plate 3340, and co-cured to form lower skin 916 of root region 606. Additionally, each ply in root portion 3328 of ply-set 3306 may be tailored for anticipated and/or experienced loads, strains, and or stresses in lower skin 916 of root region 606. Accordingly, ply-set 3306 may contain more than one ply in root portion 3328, as shown by ply 3606, ply 3608, and ply 3810 in addition to ply 3602. In an illustrative embodiment, as shown by ply 3604, some plies within ply-set 3306 may not include root portion 3328, or extend along a full length or full width of third part 1306 of tool 1300.

Not shown, but similar to FIG. 36, ply-set 3304 with root portion 3318 may contain more than one ply, and each ply may be uniquely tailored in size, material, and orientation in order to provide at least a desired, without limitation: reliability, durability, flexibility, stiffness, aerodynamic, load, stress, and/or strain, performance for ply-set 3304 and thus, for each portion of an inboard structure and surface of upper blade 602, and root region 606, including upper skin 914, of composite winglet 600.

Figure 37:
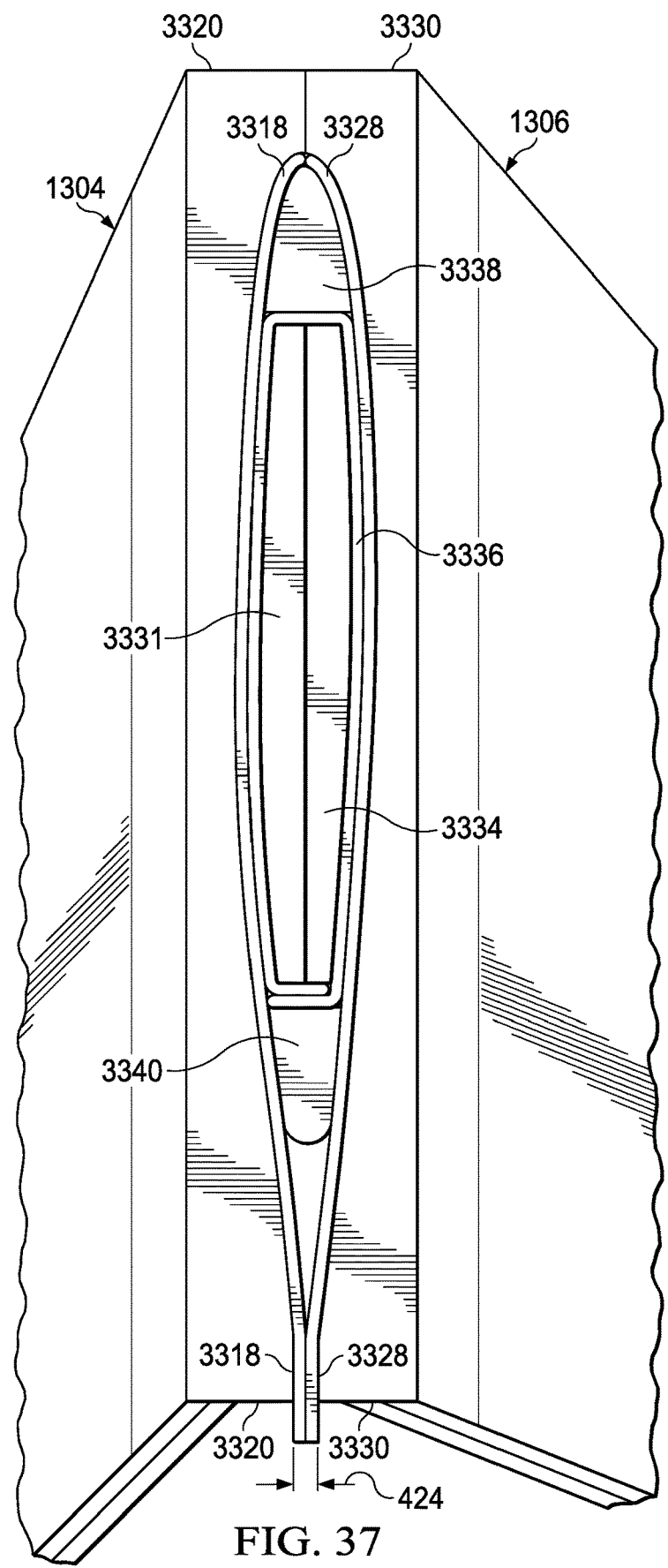
FIG. 37 is an illustration of a view into a root region of a bifurcated composite winglet during layup prior to co-curing in accordance with an illustrative embodiment.

With reference now to FIG. 37, FIG. 37 is an illustration of a view into a root region of a bifurcated composite winglet during layup prior to co-curing in accordance with an illustrative embodiment. More specifically, FIG. 37 shows portion 3331 of spacer 1804 held against portion 3334 of spacer 3332 via ply-set 3336. Ply-set 3336 may overlap a portion of itself, as shown, adjacent to caul plate 3340 in FIG. 37. Alternatively, ply-set 3336 may meet end-to-end and co-cure into a unified sheet that encompasses portion 3331 of spacer 1804 and portion 3334 of spacer 3332, or may overlap itself in varied amounts up to completely overlapping itself a number of times.

As with ply-set 3302, ply-set 3304, and/or ply-set 3306, ply-set 3336 may contain more than one ply, and each ply may be uniquely tailored in size, material, and orientation in order to provide a desired, reliability, durability, flexibility, stiffness, aerodynamic, load, stress, and/or strain, performance for each ply within and for ply-set 3336 as a whole, and thus for each portion of root region 606, including support 2704 and support 2706 in gap 1318, of composite winglet 600.

Caul plate 3338 may be placed along a side of ply-set 3336 that faces leading edge 1308, such that a side of ply-set 3336 that faces leading edge 1308 forms, during co-curing, into support 2706 as shown in FIG. 27. Caul plate 3340 may be placed along a side of ply-set 3336 that faces trailing edge 1310, such that a side of ply-set 3336 that faces trailing edge 1310 forms, during co-curing, into support 2704 as shown in FIG. 27. After co-curing, caul plate 3338, caul plate 3340, portion 3331, and portion 3334 are removed from formed root region 606.

Although not detailed in the figures, ply-set 3308 in upper blade 602, and ply-set 3310 in lower blade 604 of bifurcated composite winglet 600 may each, similar to descriptions for ply-set 3302, ply-set 3304, ply-set 3306, and/or ply-set 3336, contain more than one ply, and each ply may be uniquely tailored in size, material, and orientation in order to provide a desired reliability, durability, flexibility, stiffness, aerodynamic, load, stress, and/or strain, performance for ply-set 3308 in upper blade 602, and ply-set 3310 in lower blade 604 respectively, and thus for spar 900 within upper blade 602 and spar 902 within lower blade 604 (as shown at least in FIG. 9) of composite winglet 600.

Root region end 3320 of second part 1304 of tool 1300 is shown forming root portion 3318 of ply-set 3304 against portion 3331, caul plate 3338, and caul plate 3340 with at least one ply of ply-set 3304 exiting root region end 3320 at trailing edge 1310 via gap 424. Likewise, root region end 3330 of third part 1306 of tool 1300 is shown forming root portion 3328 of ply-set 3306 against portion 3334, caul plate 3338, and caul plate 3340 with at least one ply of ply-set 3306 exiting root region end 3330 at trailing edge 1310 via gap 424.

Hence, while leading edge 1308 of root portion 3318 of ply-set 3304 contacts leading edge 1308 of root portion 3328 of ply-set 3306 end-to-end and co-cures into a unified seamless leading edge 1308 for root region 606, trailing edge 1310 of root portion 3318 of ply-set 3304 contacts trailing edge 1310 of root portion 3328 of ply-set 3306, such that trailing edge 1310 of root region 606 may be formed in a manner similar to that shown for number of plies of composite material 2306 in FIG. 23.

Figure 38:
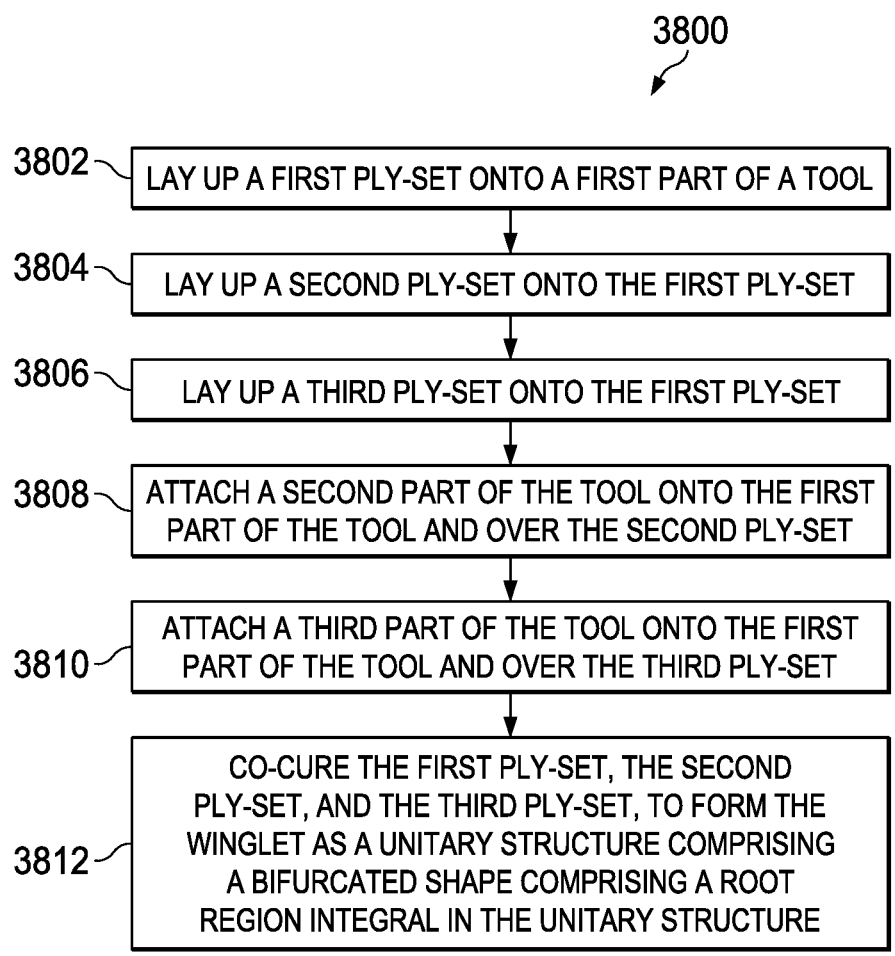
FIG. 38 is an illustration of a flowchart of a process for forming a winglet for a tip of a wing in accordance with an illustrative embodiment.

With reference now to FIG. 38, FIG. 38 is an illustration of a flowchart of a process for making a winglet for a tip of a wing, depicted in accordance with an illustrative embodiment. More specifically, process 3800 for making a winglet for a tip of a wing may begin by laying up a first ply-set onto a first part of a tool (operation 3802). Process 3800 may continue via laying up a second ply-set onto the first ply-set (operation 3804), and laying up a third ply-set onto the first ply-set (operation 3806).

Process 3800 may continue via attaching a second part of the tool onto the first part of the tool and over the second ply-set (operation 3808). Process 3800 may include attaching a third part of the tool onto the first part of the tool and over the third ply-set (operation 3810). Process 3800 may end by co-curing the first ply-set, the second ply-set, and the third ply-set, to form the winglet as a unitary structure comprising a bifurcated shape comprising a root region integral in the unitary structure (operation 3812).

The steps of process 3800 may further include the root region including a first support and a second support. The first support and the second support may be shaped for attaching the winglet to the tip of the wing via attaching an attachment system to the first support and the second support. Shaping the first support and the second support may include placing a first caul plate and a second caul plate adjacent to a fourth ply-sheet between the second ply-set and the third ply-set during a co-curing of all ply-sets.

Process 3800 may also include forming a trailing edge of the root region via co-curing at least one ply in the second ply-set to at least one ply in the third ply-set in a gap between a trailing edge of the second part and the third part of the tool.

Additionally, the unitary structure may be formed devoid of fasteners, any attached fairing component, or any attached splicing component. Further, the winglet may be formed devoid of any metallic components.

Still further, process 3800 may include the first ply-set including more ply layers in a portion of the first ply-set that forms an outboard portion of the root region and a lower blade of the winglet, than a number of ply layers in a portion of the first ply-set that forms an upper blade of the winglet. Thus, in forming each ply-set, a number of ply layers may be tailored to optimize the response and/or a performance of each portion of unitary bifurcated composite winglet 600 for specific stress, strain, and/or loads anticipated for, and/or experienced by varying portions of composite winglet 600.

Further, each ply within each ply-set may be formed with a fiber reinforcement that is tailored for that ply based upon different loads, strains, and/or stresses that differ from loads, strains, and/or stresses upon other plies within the particular ply-set, in order to provide at least a desired, without limitation: reliability, durability, flexibility, stiffness, aerodynamic, load, stress, and/or strain, performance for the particular ply-set and thus for each portion of composite winglet 600 formed by the particular ply-set. Different fiber reinforcement may include different fiber materials, lengths, thickness, and/or orientations in one ply as compared to another ply, as shown by the illustrative embodiments described above. Weaved reinforcement, without limitation, as fibers, may also be incorporated into one or more plies, in any particular ply-set used in forming composite winglet 600, as shown by example without limitation, in ply 3402 above in FIG. 34.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

What is claimed is:

1. A manufacture that comprises a winglet that comprises a unitary bifurcated structure that comprises three ply-sets co-cured to comprise a root region integral to the unitary bifurcated structure and configured for attachment onto a tip of a wing such that an outboard portion of: the root region, an upper blade of the winglet, and a lower blade of the winglet, each comprise a first ply-set of the three ply-sets such that the outboard portion of the root region and the lower blade of the winglet each comprises more ply layers than a number of ply layers in a portion of the first ply-set that forms the outboard portion of the upper blade of the winglet.

2. The manufacture of claim 1, further comprising the winglet being devoid of fasteners.

3. The manufacture of claim 1, further comprising the winglet being devoid of any attached fairing component.

4. The manufacture of claim 1, further comprising the winglet being devoid of any attached splicing component.

5. The manufacture of claim 1, further comprising the winglet being devoid of any metallic components.

6. The manufacture of claim 1, further comprising an inboard portion of the upper blade of the winglet and an upper skin of the root region that each comprise a second ply-set of the three ply-sets.

7. The manufacture of claim 1, further comprising an inboard portion of a lower upper blade of the winglet and a lower skin of the root region that each comprise a third ply-set of the three ply-sets.

8. The manufacture of claim 1, further comprising a trailing edge of the root region of the winglet comprising at least one ply from a ply-set, of the three ply-sets, that forms the upper blade of the winglet and at least one ply from a ply-set, of the three ply-sets, that forms the lower blade of the winglet.

9. A process for making a winglet for a tip of a wing, the process comprising:
    laying up a first ply-set onto a first part of a tool that molds an outboard portion of: a root region, an upper blade of the winglet, and a lower blade of the winglet, such that the outboard portion of the root region and the lower blade of the winglet each comprises more ply layers than a number of ply layers in a portion of the first ply-set that forms the outboard portion of the upper blade of the winglet;
    laying up a second ply-set onto the first ply-set;
    laying up a third ply-set onto the first ply-set;
    attaching a second part of the tool onto the first part of the tool and over the second ply-set;
    attaching a third part of the tool onto the first part of the tool and over the third ply-set; and
    co-curing the first ply-set, the second ply-set, and the third ply-set, to form the winglet as a unitary structure comprising a bifurcated shape comprising a root region integral in the unitary structure.

10. The process of claim 9, further comprising forming a trailing edge of the root region via co-curing at least one ply in the second ply-set to at least one ply in the third ply-set in a gap between a trailing edge of the second part and the third part of the tool.

11. The process of claim 9, further comprising the unitary structure being devoid of fasteners, any attached fairing component, and any attached splicing component.

12. The process of claim 9, further comprising the winglet being devoid of any metallic components.

13. The process of claim 9, further comprising the first ply-set comprising more ply layers in a portion of the first ply-set that forms an outboard portion of the root region and the lower blade of the winglet, than a number of ply layers in a portion of the first ply-set that forms the upper blade of the winglet.

14. The process of claim 9, further comprising the root region comprising a first support and a second support.

15. The process of claim 14, further comprising shaping the first support and the second support for attaching the winglet to the tip of the wing via attaching an attachment system to the first support and the second support.

16. The process of claim 15, further comprising shaping the first support and the second support via placing a first caul plate and a second caul plate adjacent to a fourth ply-sheet between the second ply-set and the third ply-set during a co-curing of all ply-sets.

17. A manufacture that comprises a winglet that comprises three ply-sets co-cured together in a bifurcated configuration that comprises:
    a first continuous surface that comprises:
        an outboard surface of an upper blade;
        an outboard portion of a root region; and
        an outboard surface of a lower blade, and comprises a first ply-set of the three ply-sets;
    a second continuous surface that forms an inboard surface of the upper blade and an upper skin of the root region and comprises a second ply-set of the three ply-sets;
    a third continuous surface that forms an inboard surface of the lower blade and a lower skin of the root region and comprises a third ply-set of the three ply-sets;
    the root region, integral in the bifurcated configuration and configured:

to match a shape of an airfoil of a tip of a wing;

comprising two supports that comprise an additional ply-set shaped to receive an attachment system; and comprising a trailing edge that comprises at least one ply from the second ply-set and at least one ply from the third ply-set co-cured together.

18. The manufacture of claim 17, further comprising, a first spar co-cured within the upper blade and a second spar co-cured with the lower blade, such that the first spar and the second spar are co-cured to the additional ply-set.

19. The manufacture of claim 17, wherein the outboard portion of the root region and the lower blade of the winglet each comprises more ply layers than a number of ply layers in a portion of the first ply-set that forms the outboard portion of the upper blade of the winglet.

20. The manufacture of claim 17, wherein the outboard portion of the root region and the lower blade of the winglet each comprises at least two more ply layers than a number of ply layers in a portion of the first ply-set that forms the outboard portion of the upper blade of the winglet.

* * * * *